(12) United States Patent
Volin

(10) Patent No.: US 11,910,889 B2
(45) Date of Patent: Feb. 27, 2024

(54) METHOD OF MANUFACTURING AND USING A MULTI-FUNCTION AND MULTI-ORIENTATION CARAPACE SYSTEM

(71) Applicant: Dee Volin, Gresham, OR (US)

(72) Inventor: Dee Volin, Gresham, OR (US)

(*) Notice: Subject to any disclaimer, the term of this patent is extended or adjusted under 35 U.S.C. 154(b) by 731 days.

(21) Appl. No.: 17/106,151

(22) Filed: Nov. 29, 2020

(65) Prior Publication Data

US 2021/0169187 A1 Jun. 10, 2021

Related U.S. Application Data

(60) Provisional application No. 62/945,045, filed on Dec. 6, 2019.

(51) Int. Cl.
| | | |
|---|---|---|
| *A45B 23/00* | (2006.01) | |
| *A01D 46/24* | (2006.01) | |
| *A45B 25/18* | (2006.01) | |
| *A63B 59/20* | (2015.01) | |
| *D05B 93/00* | (2006.01) | |
| *A63B 47/00* | (2006.01) | |
| *B60J 7/10* | (2006.01) | |
| *G03B 21/56* | (2006.01) | |

(52) U.S. Cl.
CPC ............ *A45B 23/00* (2013.01); *A01D 46/243* (2013.01); *A45B 25/18* (2013.01); *D05B 93/00* (2013.01); *A45B 2023/0031* (2013.01); *A63B 47/00* (2013.01); *A63B 59/20* (2015.10); *B60J 7/102* (2013.01); *G03B 21/56* (2013.01)

(58) Field of Classification Search
CPC .. A45B 23/00; A45B 25/18; A45B 2023/0031
See application file for complete search history.

(56) References Cited

U.S. PATENT DOCUMENTS

| | | | |
|---|---|---|---|
| 816,186 A * | 3/1906 | Roberts ................. | A01D 46/26 56/329 |
| 2,039,987 A * | 5/1936 | Goldman ............... | A45B 25/18 139/428 |
| 3,664,156 A | 5/1972 | Betts | |
| (Continued) | | | |

*Primary Examiner* — Robert Canfield

(57) ABSTRACT

A method of manufacturing and using a five-device-in-one multi-function and multi-orientation carapace system comprises the steps of: Sewing at least one first three-dimensional contour-conforming carapace dome panel and at least one second three-dimensional contour-conforming carapace dome panel together such that at least one water-directing ball-directing fruit-directing dome-bisecting transverse seam and at least one water-directing-and-ejecting ball-directing-and-ejecting fruit-directing-and-ejecting cross-cutting seam are formed; Attaching the at least one first and the at least one second three-dimensional contour-conforming carapace dome panels to the interchangeable splines, respectively; Attaching the at least one first and the at least one second outer edges of the at least one first and the least one second three-dimensional contour-conforming carapace dome panels to the spline ends of the interchangeable splines, respectively; Adjusting the angle of the carapace-supporting angled arm; and Locking the carapace-tilting-and-multi-orienting snap-locking handle to the multi-height-adjustable carapace stanchion.

20 Claims, 67 Drawing Sheets

(56) References Cited

U.S. PATENT DOCUMENTS

| | | | | |
|---|---|---|---|---|
| 3,779,185 | A | 11/1973 | Reeves | |
| 3,793,968 | A | 2/1974 | Beazley | |
| 4,155,317 | A | 5/1979 | Enomoto | |
| 4,276,033 | A * | 6/1981 | Krovina | F03D 13/25 416/240 |
| 4,401,137 | A | 8/1983 | Cannon | |
| 4,590,871 | A | 5/1986 | Granville | |
| 4,711,260 | A * | 12/1987 | Wiens | A63B 63/00 473/195 |
| 4,846,085 | A | 7/1989 | Ishibashi | |
| 5,015,220 | A | 5/1991 | Legge | |
| 5,020,559 | A | 5/1991 | Lai | |
| 5,123,616 | A * | 6/1992 | Buckley | B64D 17/10 244/145 |
| 5,218,981 | A | 5/1993 | Lai | |
| 5,337,507 | A | 7/1994 | Oyama | |
| 5,488,966 | A | 2/1996 | Baldwin | |
| 5,806,546 | A | 9/1998 | Ni | |
| 5,885,679 | A | 3/1999 | Yasue | |
| 6,083,114 | A * | 7/2000 | Bailey | A63B 57/357 473/196 |
| 6,431,221 | B1 | 8/2002 | Wrigley | |
| 6,655,175 | B1 | 12/2003 | Okamoto | |
| 6,658,900 | B2 | 12/2003 | Okamoto | |
| 6,712,100 | B2 | 3/2004 | Yook | |
| 6,997,126 | B2 | 2/2006 | Murley | |
| 7,029,555 | B2 | 4/2006 | Yamanaka | |
| 7,455,743 | B2 | 11/2008 | Kramer | |
| 7,797,967 | B2 | 9/2010 | Shirasaki | |
| 8,104,492 | B2 * | 1/2012 | Dan | A45B 25/14 135/21 |
| 8,127,701 | B2 | 3/2012 | Harward | |
| 8,597,468 | B2 * | 12/2013 | Ryan | D21F 7/08 162/900 |
| 9,051,753 | B1 * | 6/2015 | Zamirpour | E04H 15/58 |
| 9,758,928 | B2 | 9/2017 | Cartabbia | |
| 9,863,100 | B2 | 1/2018 | Lewis | |
| 10,112,739 | B2 | 10/2018 | Dunlap | |
| 10,179,975 | B2 | 1/2019 | Botelho | |
| 10,260,185 | B2 | 4/2019 | McMaster | |
| 11,096,458 | B1 * | 8/2021 | Volin | B60K 8/00 |
| 11,399,603 | B1 * | 8/2022 | Volin | A01D 46/243 |
| 2002/0129847 | A1 * | 9/2002 | Ma | A45B 23/00 135/21 |
| 2002/0172792 | A1 | 11/2002 | Jarvis | |
| 2005/0088836 | A1 * | 4/2005 | Lowe | G03B 15/06 362/18 |
| 2009/0090425 | A1 | 4/2009 | Hawes | |
| 2015/0059815 | A1 * | 3/2015 | Xiong | A45B 23/00 135/20.1 |
| 2015/0068566 | A1 * | 3/2015 | Ma | A45B 23/00 135/20.1 |
| 2019/0082803 | A1 * | 3/2019 | Lv | A45B 25/02 |
| 2021/0301550 | A1 * | 9/2021 | Volin | E04H 15/28 |

\* cited by examiner

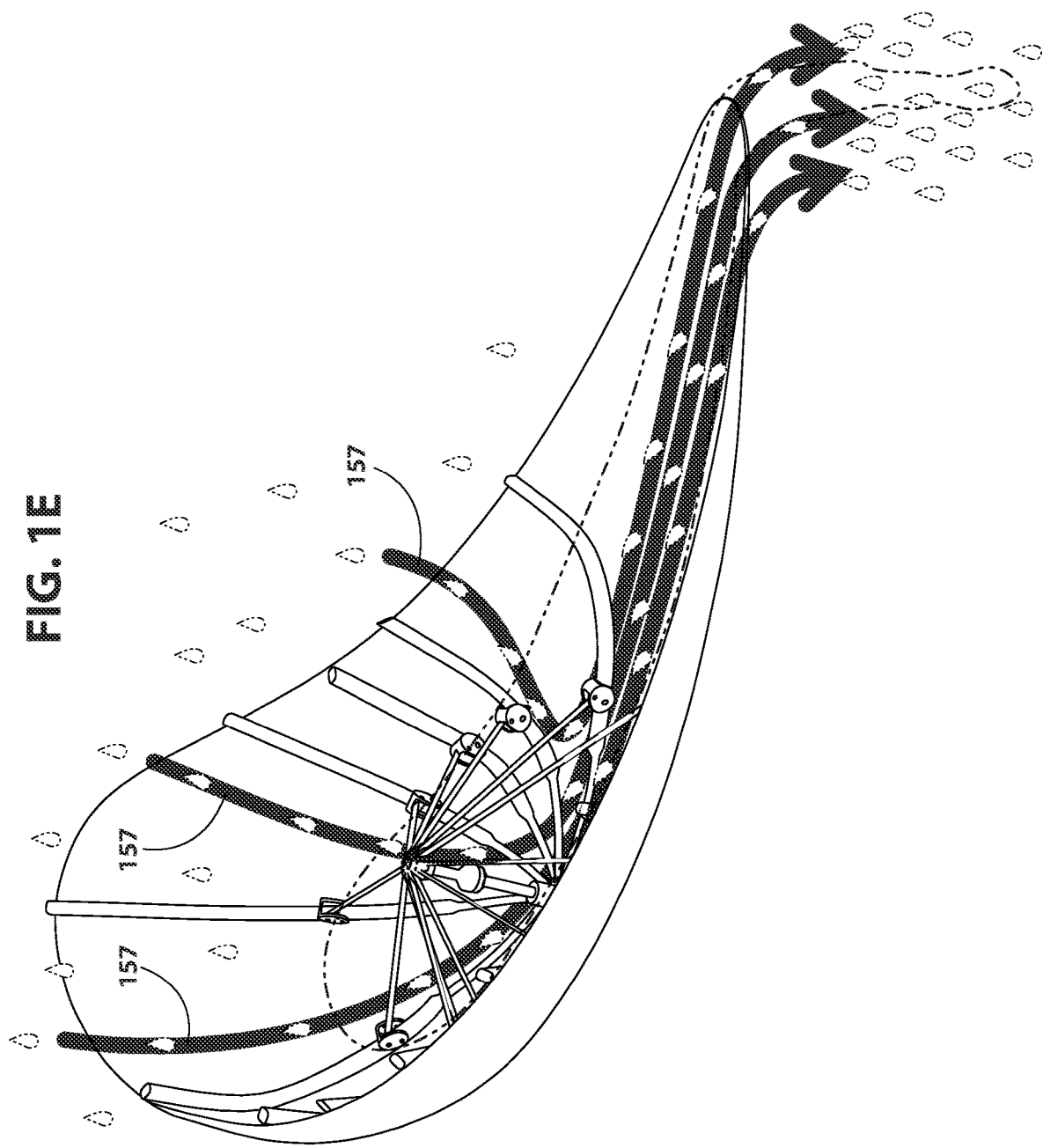

the original FIG. 1F on drawing sheet number 6 displays CROWN DISC 122

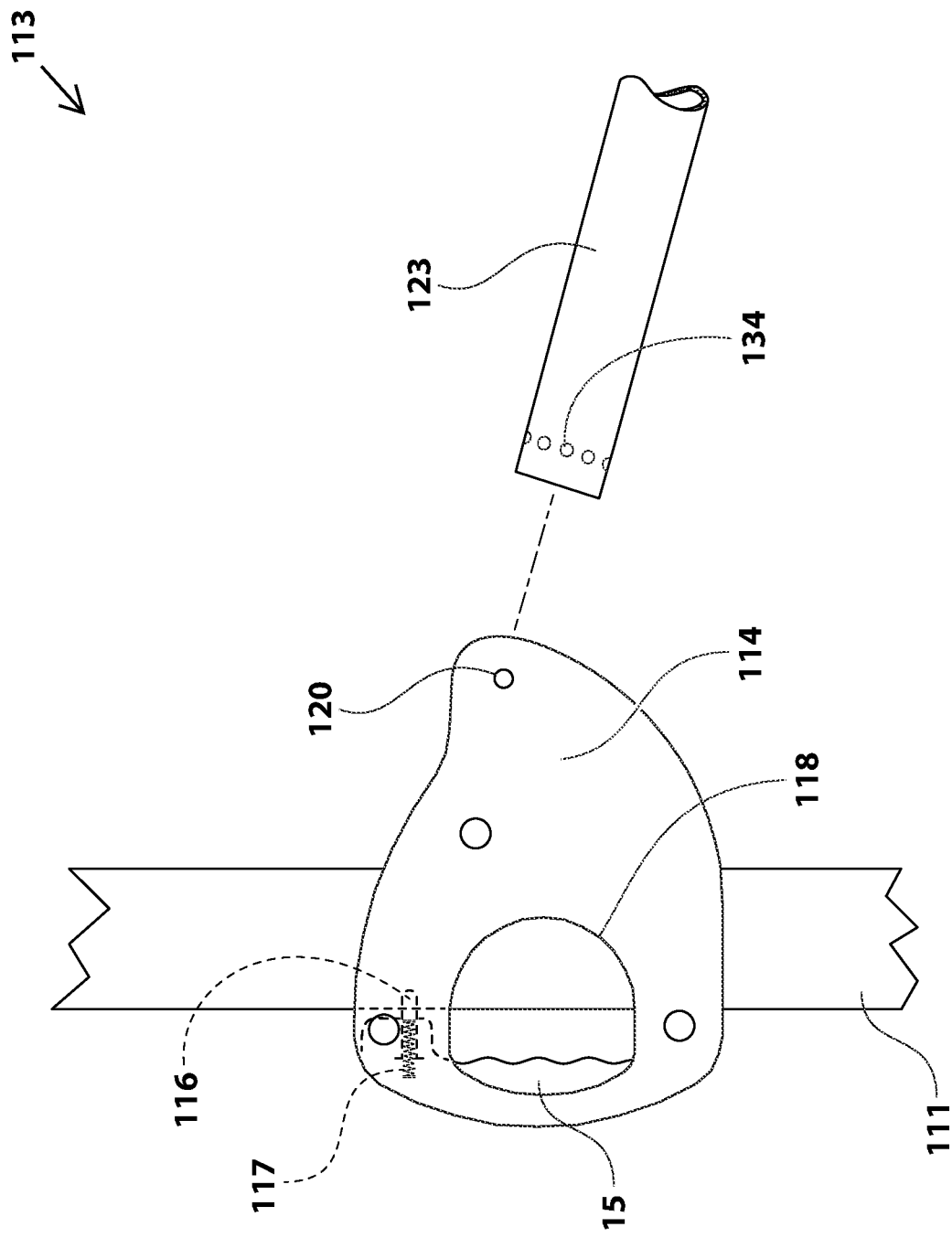

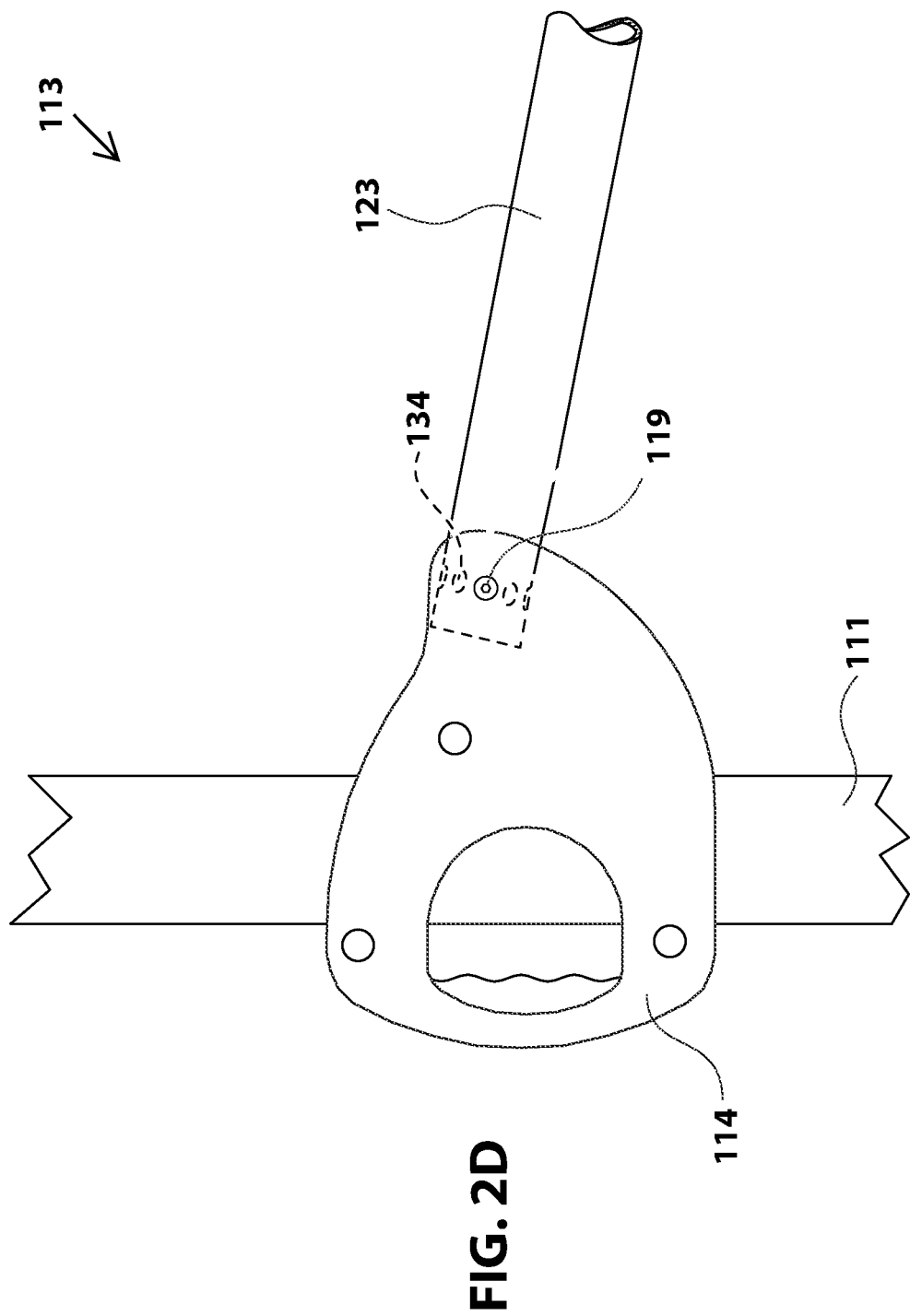

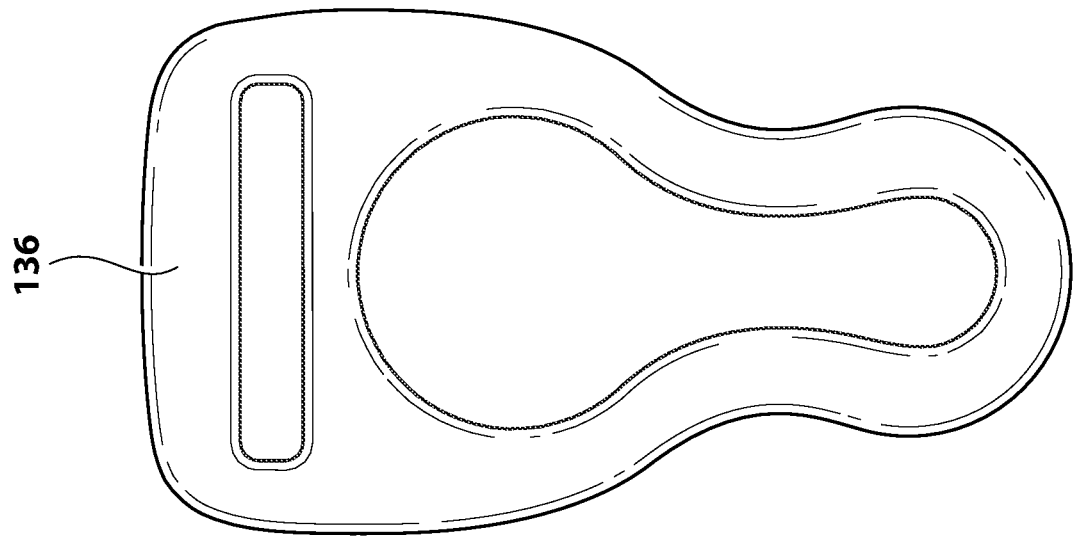
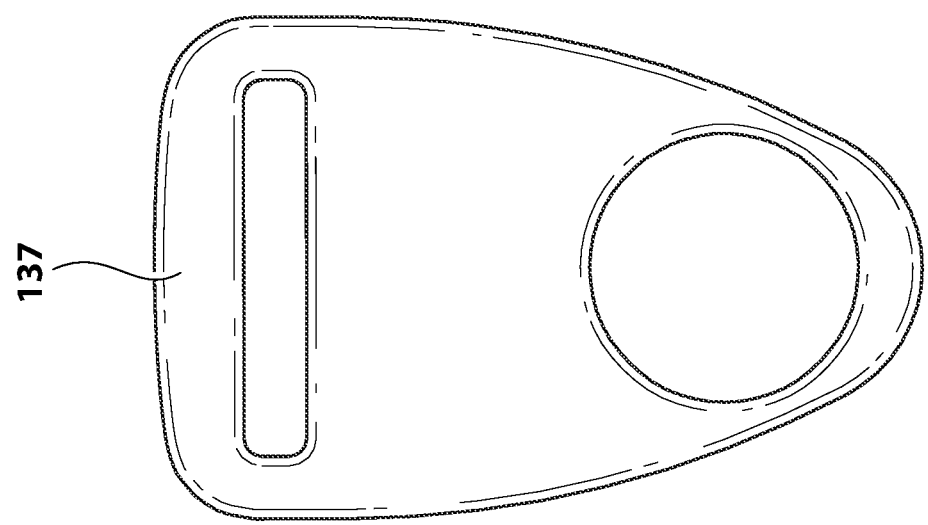
FIG. 4A

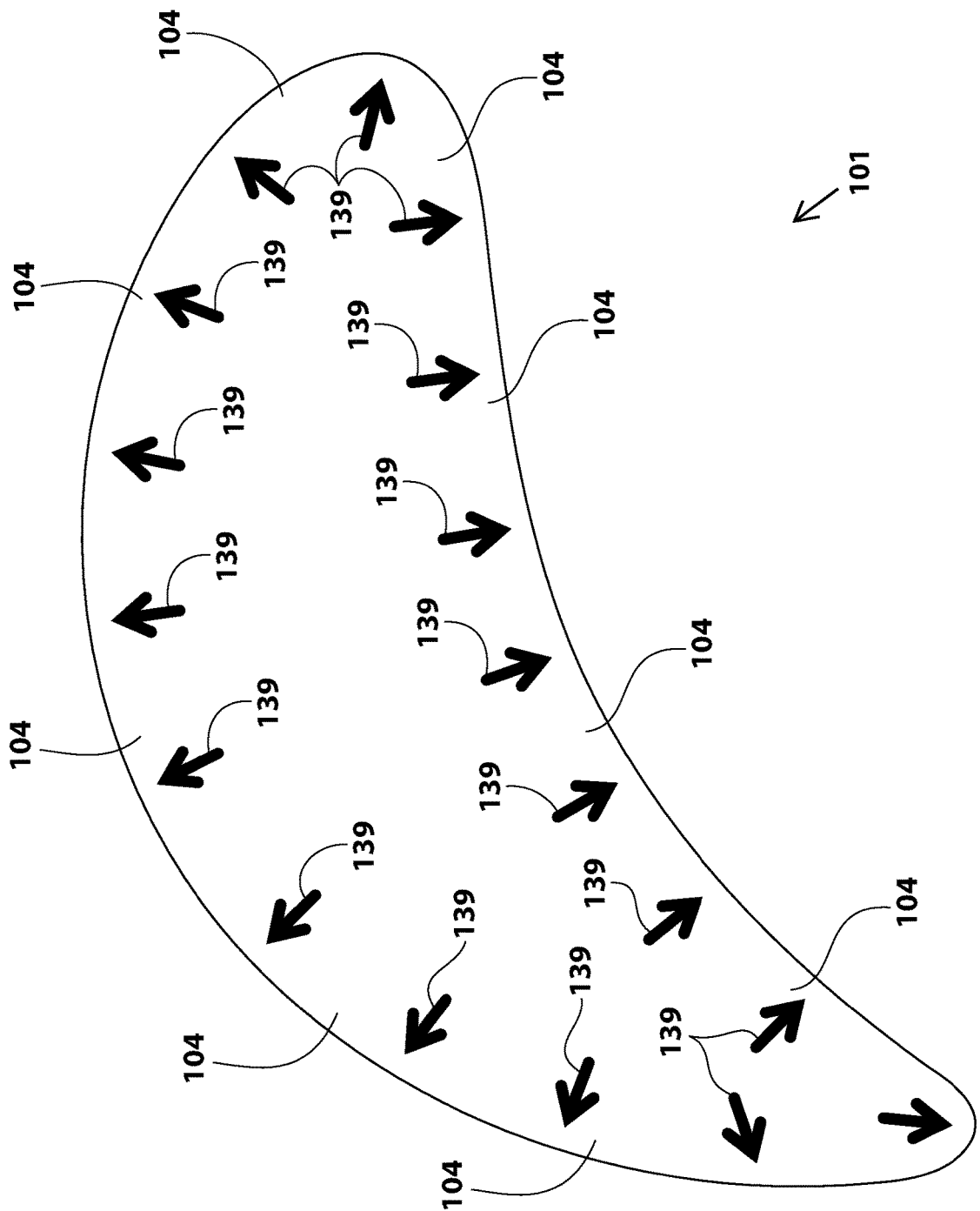

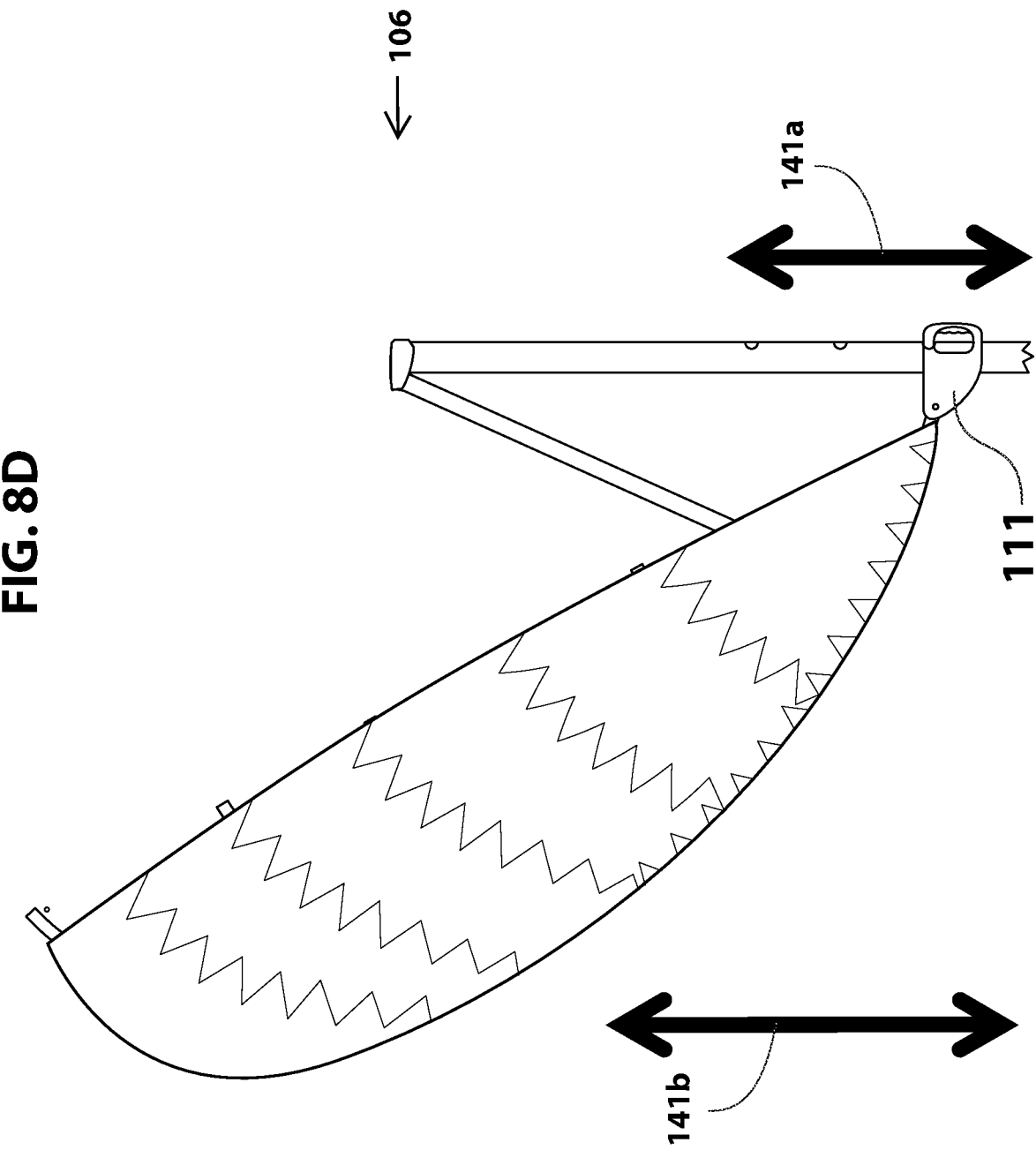

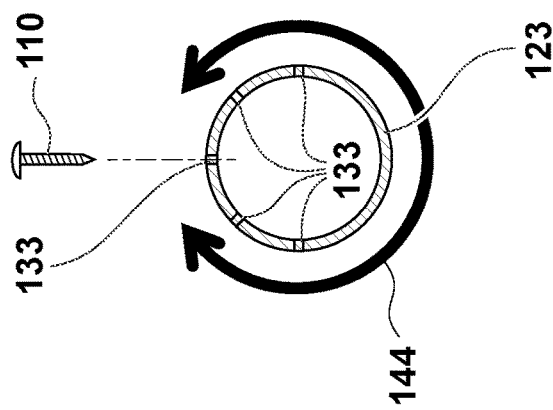
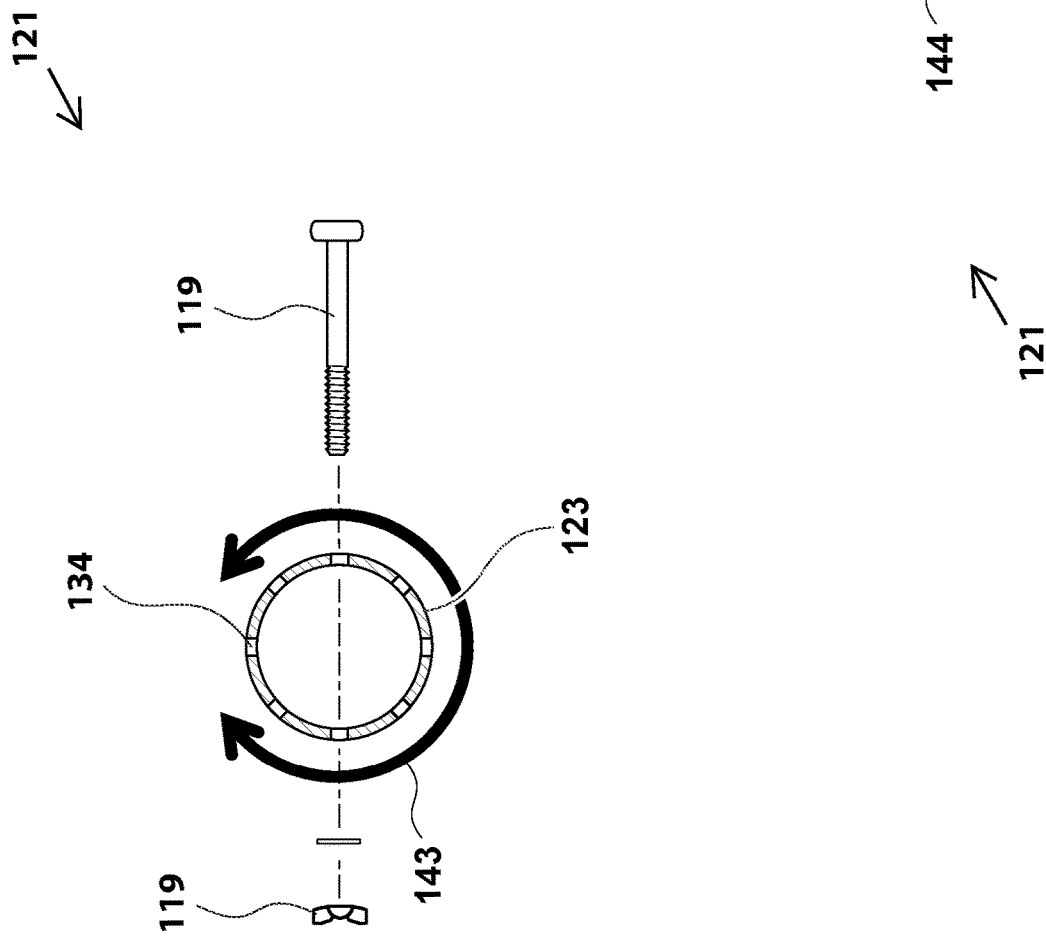

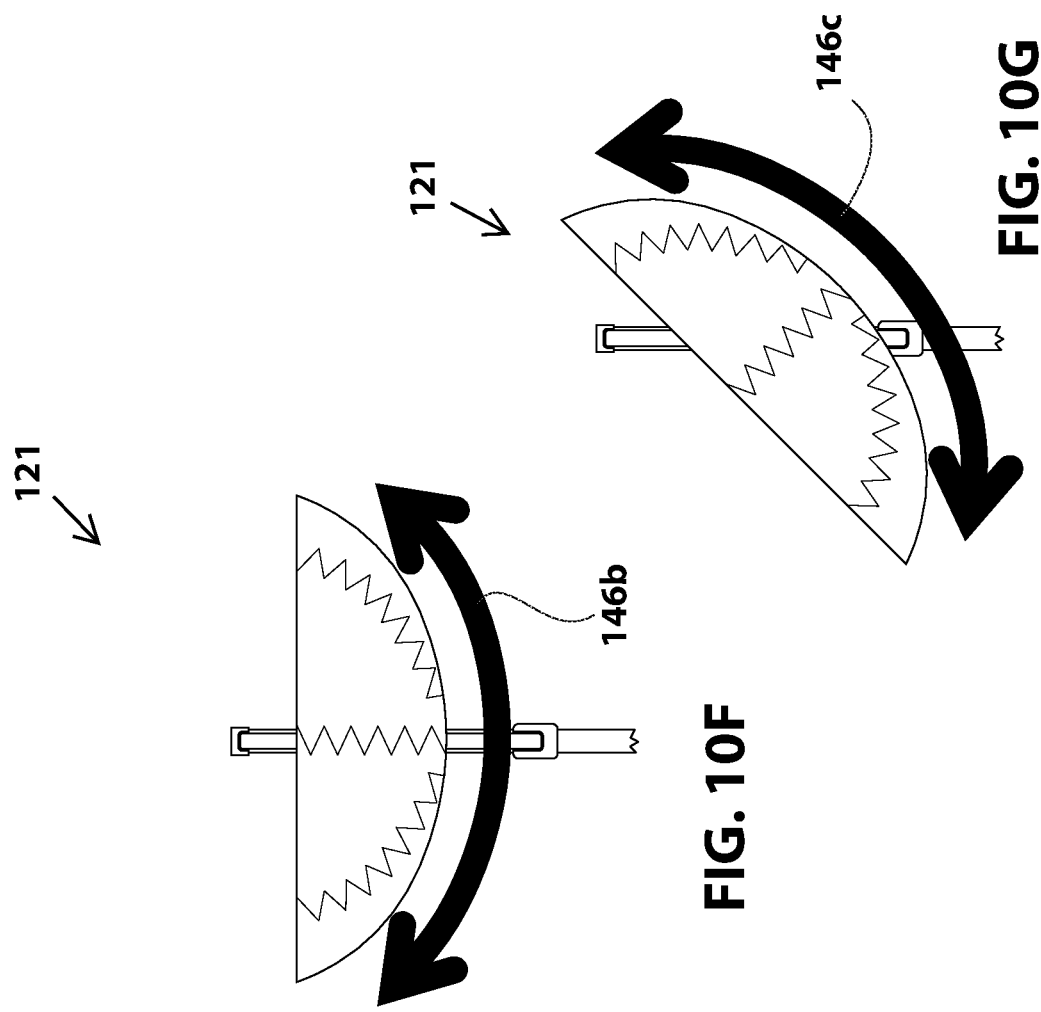
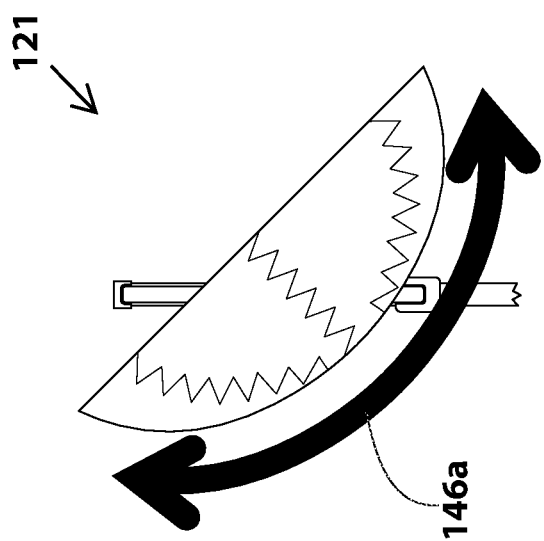

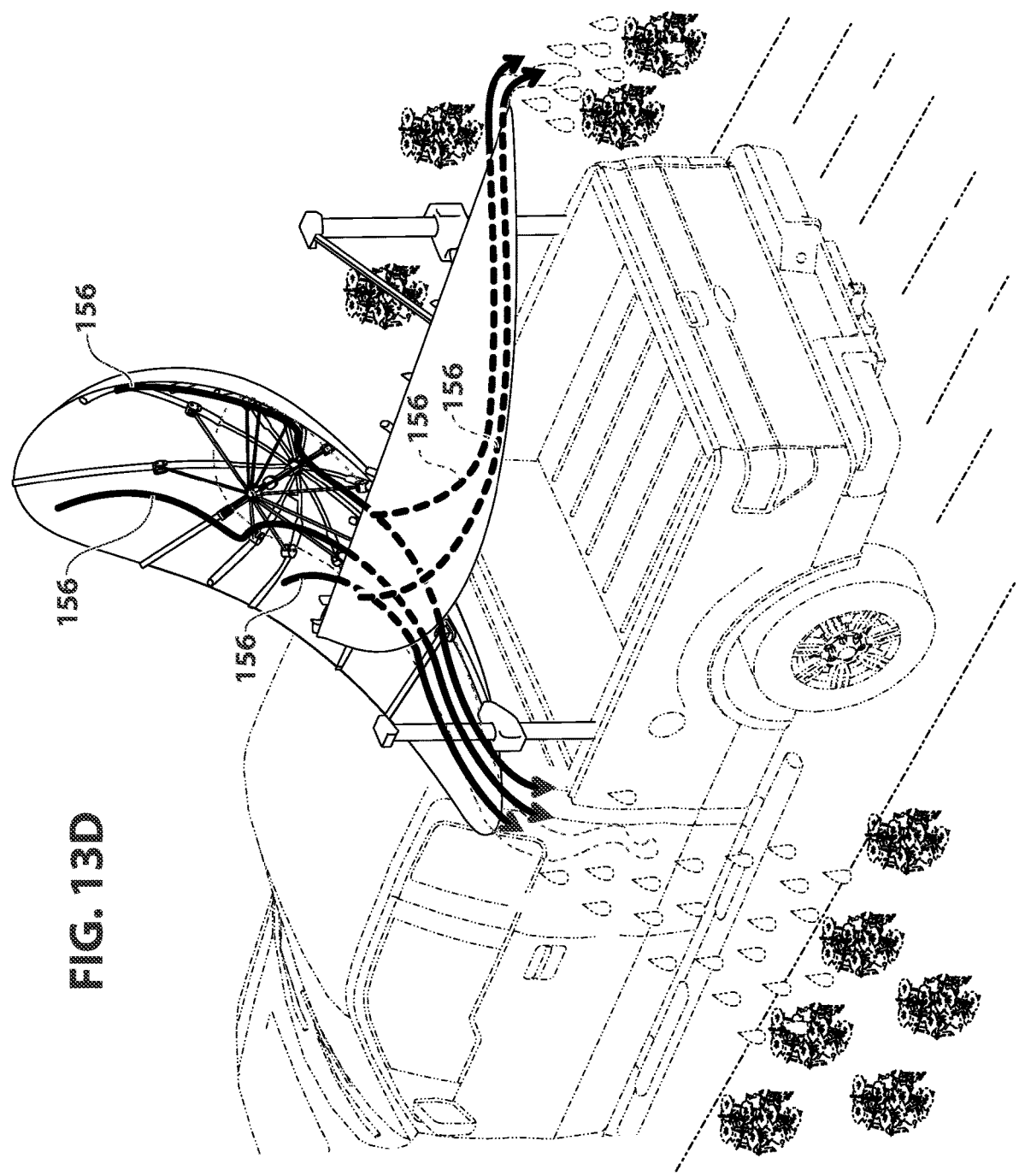

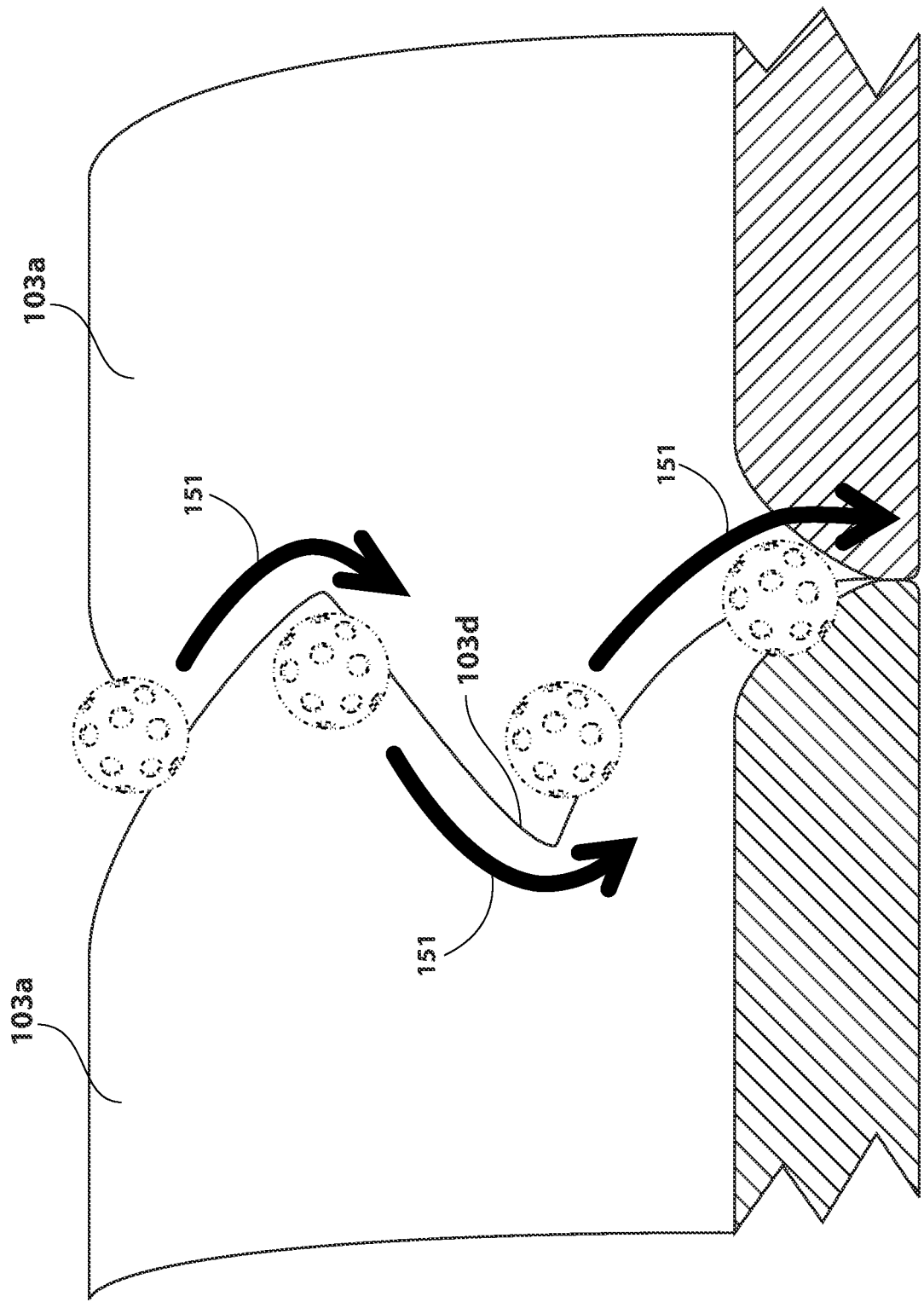

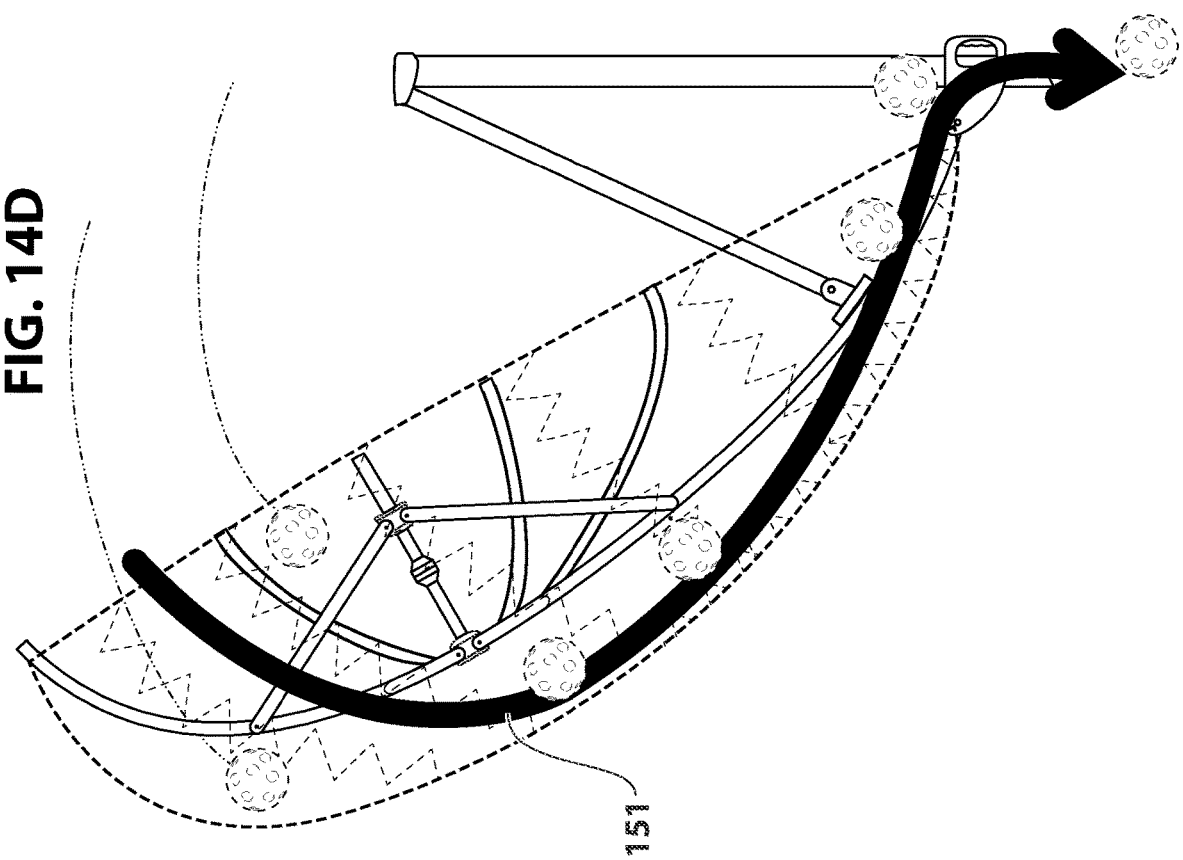

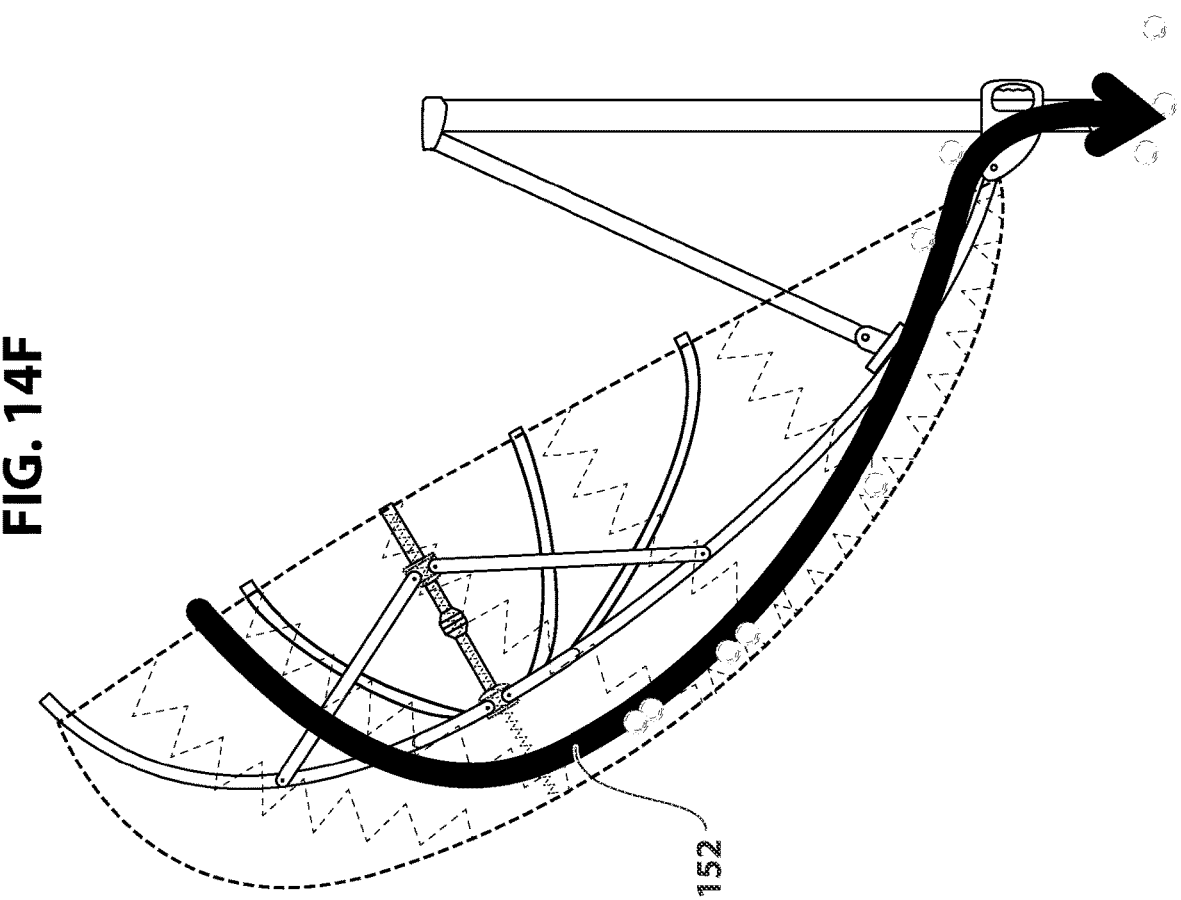

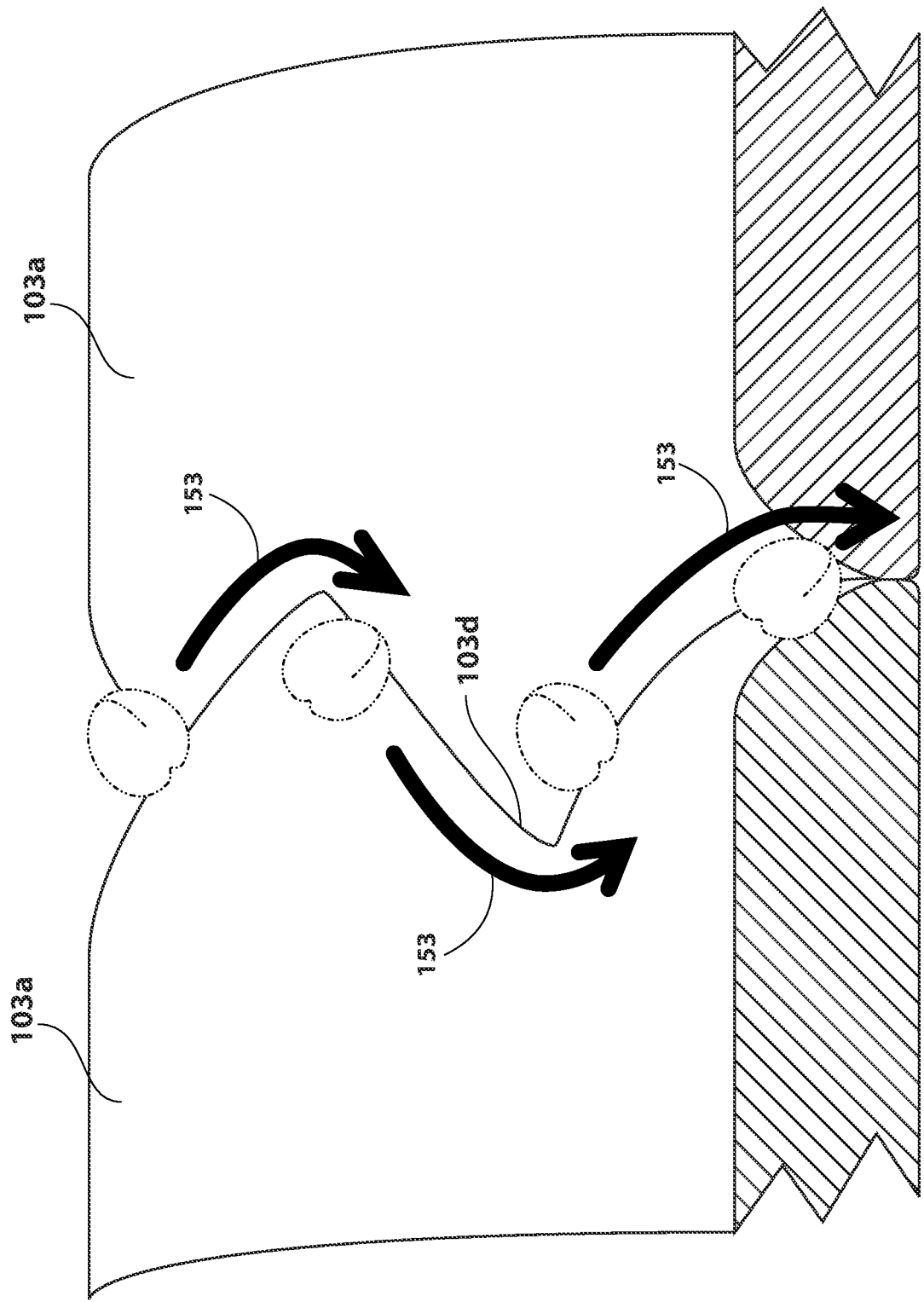

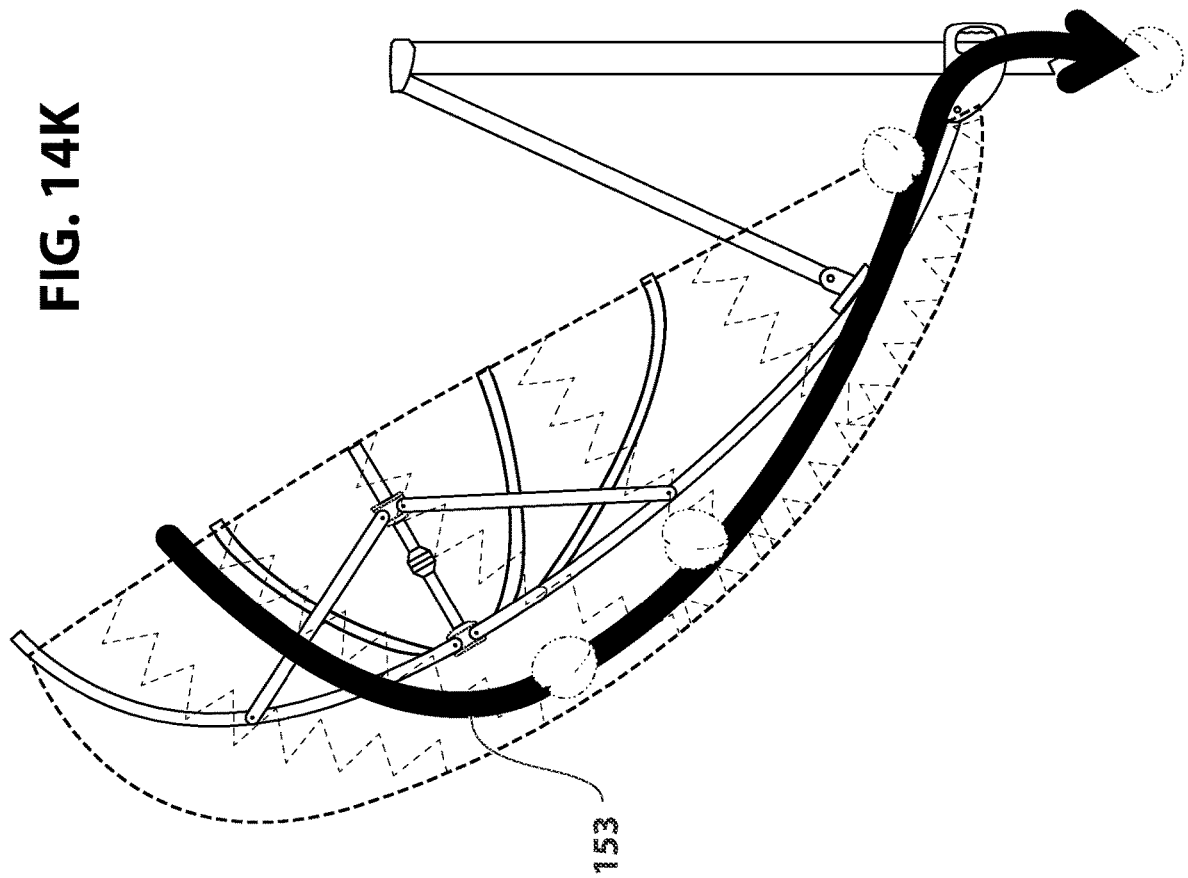

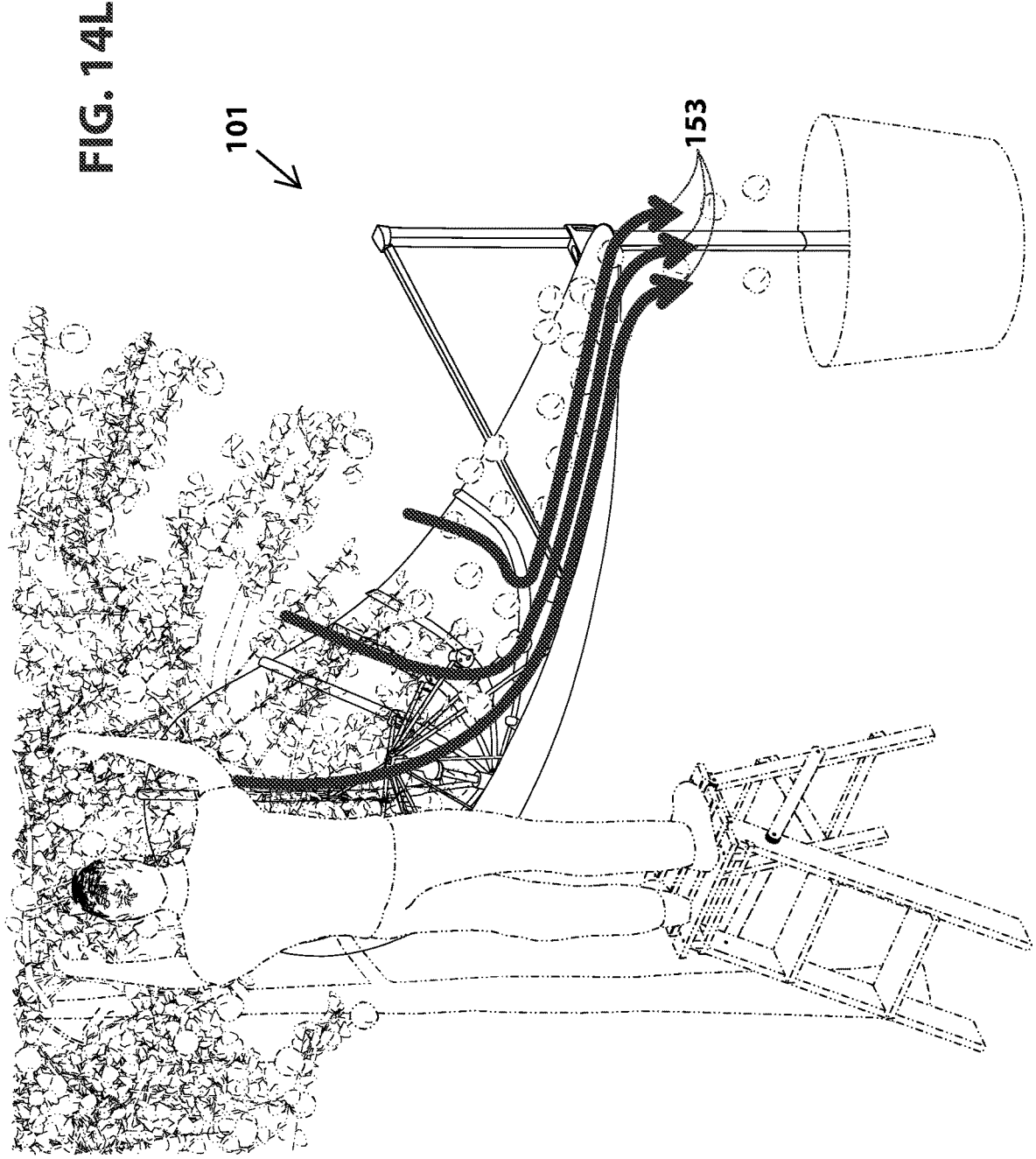

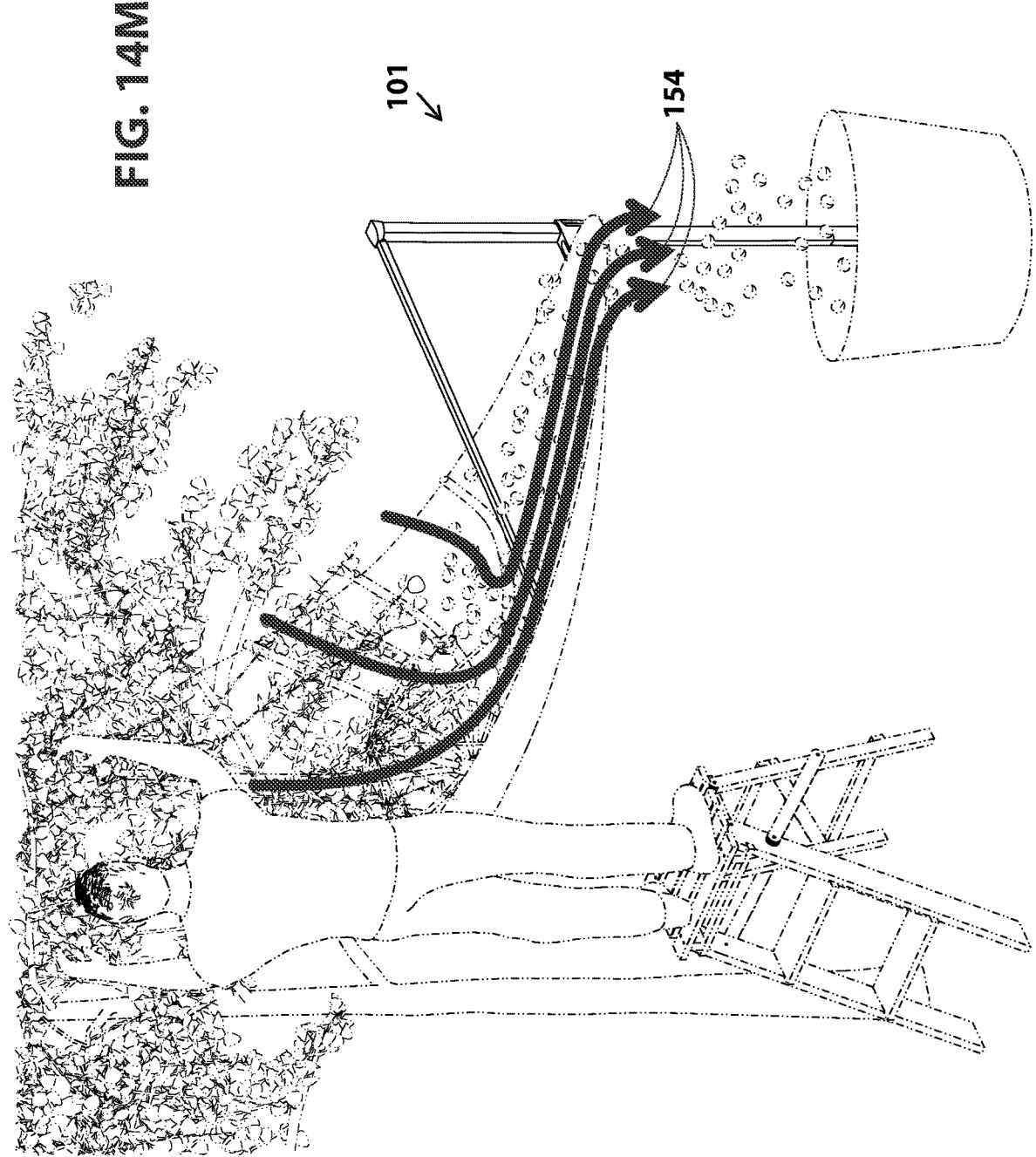

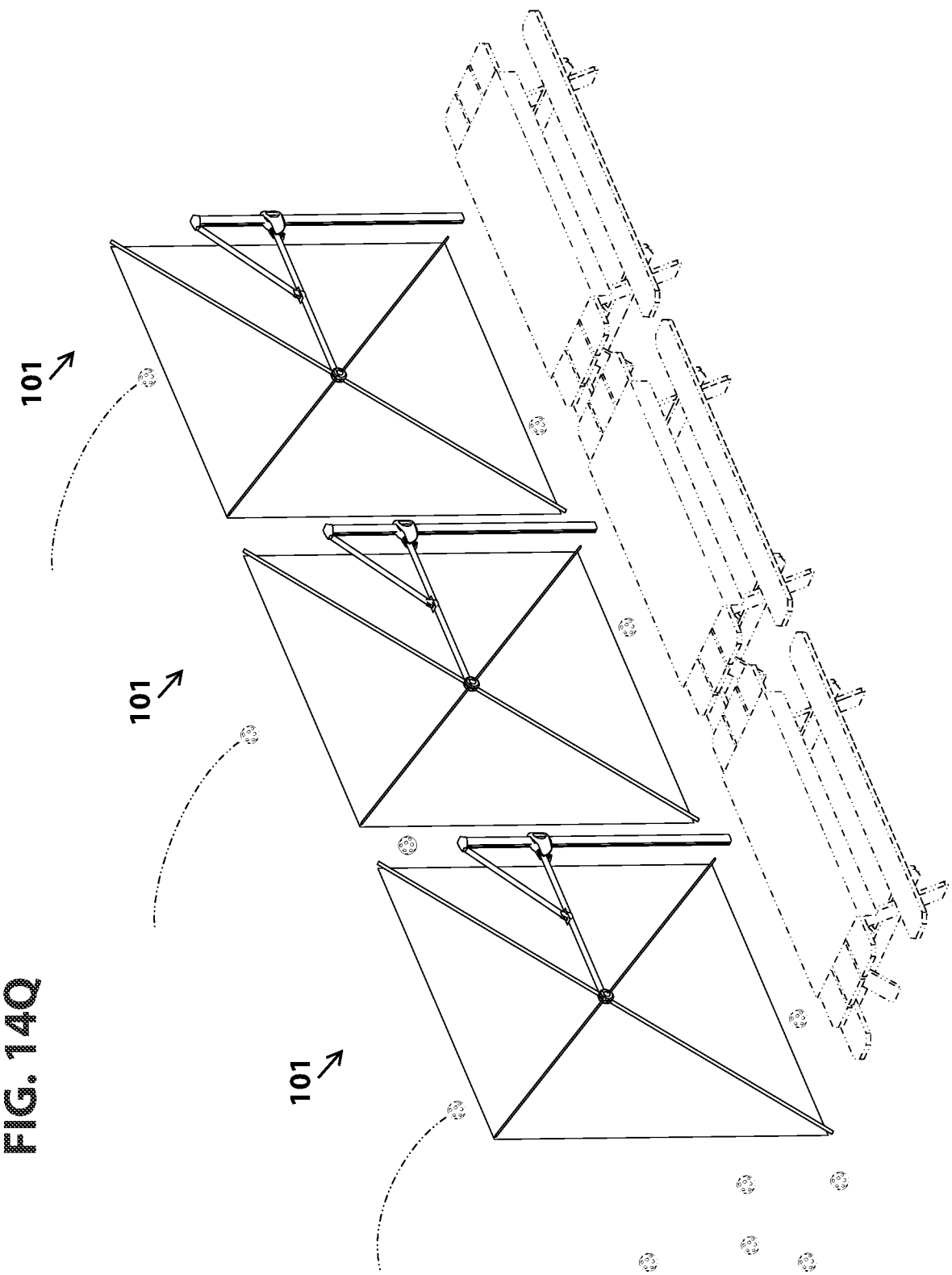

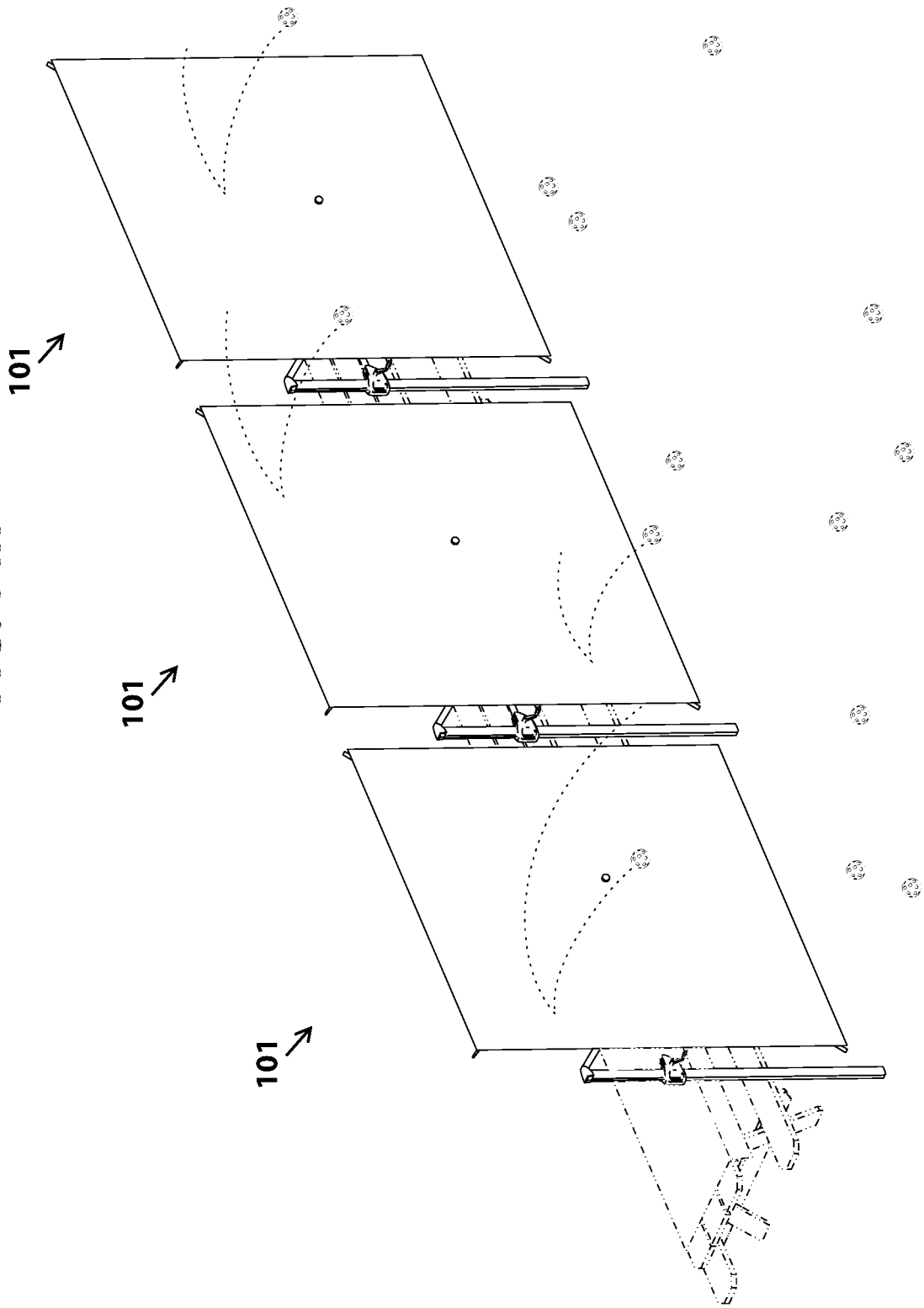

METHOD OF MANUFACTURING AND USING A MULTI-FUNCTION AND MULTI-ORIENTATION CARAPACE SYSTEM

1. FIELD OF THE INVENTION

The present invention relates to a method of carapace manufacturing, which is cheap to produce, is easy to ship as one unit, requires no assembly, and can be quickly and easily be unfolded. Particularly, the present invention relates to a method of manufacturing and using a five-device-in-one multi-function multi-orientation interchangeable reversible cantilever-stanchion carapace system (having three-hundred-and-sixty-degree-orientational spline-interchangeable carapace system, multi-height-adjustable and spline-supporting stanchion system, carapace-sliding-and-tilting multi-orienting snap-locking handle system, and multi-orientation interchangeable-spline system), which comprises:

1) Three-hundred-and-sixty-degree-orientational spline-interchangeable carapace system,
2) Multi-height-adjustable and spline-supporting stanchion system,
3) Carapace-sliding-and-tilting multi-orienting snap-locking handle system, and
4) Three-hundred-and-sixty-degree-orientational interchangeable-spline system.

2. DESCRIPTION OF THE PRIOR ART

A number of methods of manufacturing carapace have been introduced.

U.S. Pat. No. 2,039,987 issued 1936 May 5, to Harry Goldman, demonstrates an umbrella having a covering of chemicalized silk of extreme thinness and fineness, which is semi-transparent, smooth, tough, glossy and water-repellant. In the use of such material for umbrellas, it may be necessary to make provision for the reinforcement of the material at the points where it is secured to the caps which are fitted to the ends of the umbrella ribs in order to prevent fraying or tearing of the material and to reinforce against wear by contact with the rib surfaces at these points.

U.S. Pat. No. 3,664,156 issued 1972 May 23, to Max W. Betts, and Frank Robinson, demonstrates a blank for manufacture of a knitted sleeve garment comprises front and rear upper body portions each constituted by a piece of flat fabric and having side edges joined, on the knitting machine, to shoulder regions of the sleeves, the said shoulder regions having extensions arranged to be joined to upper edges of the said front and rear upper body portions. A method of knitting such a blank is also described.

U.S. Pat. No. 3,779,185 issued 1973 Nov. 6, to Allan C. Reeves, demonstrates a unitary folded beverage container having a peak or gable top and a tear strip to provide a straw hole. The tear strip is formed by spaced apart score lines on an outer side of a top gable forming wall and the straw hole is formed by a closed score line formed on an inner side of the same wall, at a position beneath and between the outer spaced apart score lines. The score lines are cut to a substantial overlapping depth (viz., 40 to 75 percent of the wall thickness) from opposite sides of the gable forming wall. Upon pulling the tear strip, a layer of material between the spaced apart score lines separates from the gable wall together with the entire thickness of the wall contained within the inner closed score line. With regard to manufacture, the means to form the straw hole is easily incorporated into the container blank without necessitating any change in the overall manufacturing process.

U.S. Pat. No. 3,793,968 issued 1974 Feb. 26, to Aubrey G. Beazley, demonstrates a device for transferring, joining and sewing a pair of fabric workpieces, disclosed wherein one workpiece is held by suitable vacuum means and transferred into contact with the second workpiece whereupon the workpieces are clamped to a movable sewing table which advances the workpieces as a sewing machine forms a line of stitch joining the two workpieces together.

U.S. Pat. No. 4,155,317 issued 1979 May 22, to Fumitake Enomoto, demonstrates a method for sewing together fabric pieces which comprises the steps of sewing elastic cord-like core material such as polyethylene cord along the edge portions of two or more fabric pieces, automatically engaging the edge portions of the fabric pieces with each other by guiding the sewn core material, and sewing together the engaged edge portions to render an assembly of fabric pieces adapted for use as a cover; and a machine for sewing together fabric pieces which is provided with a core material-guiding mechanism for clamping core materials previously sewn to the edge portions of two or more fabric pieces being sewn together, thereby engaging the edge portions with each other.

U.S. Pat. No. 4,401,137 issued 1983 Aug. 30, to Frederick W. Cannon, demonstrates a forming fabric for papermaking machines being produced by weaving a conventional fabric with warp yarns extending from each of two ends. A selected number of extended warps are cut with each having an adjacent extending warp. Loops are formed with the extending warps and the ends of extending warps are rewoven through provided fills to a position near the cut warps and leaving ends of the warps projecting from the surface of the fabric. The loops are interlaced and a join pin inserted. The projecting ends are pulled to collapse the loops about the join pin.

U.S. Pat. No. 4,590,871 issued 1986 May 27, to John M. Granville, demonstrates an automatic main seam feeding and folding device which has an automatic feeding and folding die which folds two adjacent edges of fabric to form a fell seam and feeds the fabric seam to a sewing machine while maintaining the proper tension and edge alignment. The feeding and folding die folds the adjacent fabric edges from an initial zero degrees of fold to a final overlapping interlocking 180 degree fold to form a main seam and includes tractor dogs along the right and left sides of the die block to continuously feed the fabric material. The tractor dogs push the material along the outside of a straight solid die block with the fabric edges to be folded moving within a slot which encloses and contains the fabric spatially. The feeding and folding die is made sufficiently long to enable the two fabric edges to be gradually folded from a parallel planar flat position at the die mouth to a 180 degree, one inch interlocking four layer folded fell seam configuration at the die terminus or nose.

U.S. Pat. No. 4,846,085 issued 1989 Jul. 11, to Tatsuhiro Ishibashi, and Yutaka Masushige, and Shotaro Kai, demonstrates a method for automatically linking corresponding knitted loops of two knitted fabric pieces, and an apparatus for implementing the method, wherein each knitted loop to be pierced in two knitted fabric pieces is pierced by a piercing needle, respectively, and the knitted loop in one knitted fabric piece held by the piercing needle of one knitted loops selecting and piercing device is transferred to a corresponding piercing needle already holding a corresponding knitted loop of another knitted fabric piece, and the two corresponding knitted loops are sewn by a sewing needle.

U.S. Pat. No. 5,015,220 issued 1991 May 14, to Robert W. Legge, and Jr. William O. Hocking, demonstrates an endless work fabric having a loop seam construction and a method of manufacture thereof is disclosed, wherein the fabric is used as a papermaker felt, a papermaker dryer fabric, a forming wire, or filter fabric. An endless belt formed of a preselected material preferably having longitudinally extending yarns included therein is collapsed upon itself to form folded ends that are stripped to expose end loops. The loops as formed in the ends of the fabric are intermeshed to define a transversely extending channel through which a pintle member is extended for joining the two ends of the folded fabric to define the endless work fabric.

U.S. Pat. No. 5,020,559 issued 1991 May 4, to Chenmin Lai, demonstrates the construction of an umbrella cover is provided wherein the periphery of the umbrella cover cloth is arranged to provide straight meshes. The umbrella cover construction can accommodate umbrella ribs which are arranged in either equal or unequal intervals therebetween. The construction of the cover cloth is arranged with the radially extending umbrella ribs disposed on the bias of the cloth and coupled to peripheral portions thereof, having straight edges extending therefrom which are substantially either parallel or orthogonal to the warp or weft of the cloth. Thus, the umbrella cover can be formed of a single piece of material, upon which a decorative pattern can easily be printed thereon, while still allowing the umbrella cover to be stretched, when the umbrella is opened, to form a curved surface.

U.S. Pat. No. 5,218,981 issued 1993 May 15, to Chen M. Lai, demonstrates an umbrella provided devoid of an axis connecting line. The umbrella includes a primary blank member on which a pattern can be printed without consideration of the arrangement of the meshes and several triangular supplementary blank members attached about the periphery of the primary blank member. The meshes of the supplementary blank members are arranged to be perpendicular to or parallel to the outer periphery of the completed umbrella cover for providing structural integrity to the umbrella construction.

U.S. Pat. No. 5,337,507 issued 1994 Jul. 16, to Mitsuyoshi Oyama, and Tomoyoshi Tsurufuji, demonstrates a handle for fishing rods which extends on the tubular body 10 of the fishing rod, and includes a hand-held portion 16 corresponding to the exposed part 10P of the tubular body and having bridges extending off the exposed part along the side surfaces thereof. The handle is reduced in weight, it is easy for a fishing person to hold the handle by his hand, the hand holding the handle is less likely to slip thereon, and the person can feel the bite of a fish well.

U.S. Pat. No. 5,488,966 issued 1996 Feb. 6, to Blair F. Baldwin, and Russell G. Dobrowski, and Arthur L. Arledge, demonstrates an umbrella canopy which includes a single sheet of web material formed in a closed configuration and having a periphery, said single sheet of web material having a bowed configuration, said single sheet of web material having at least one radially oriented tuck therein which applies a circumferential force on said single sheet of web material to form said single sheet of web material into said bowed configuration, each said tuck extending radially outwardly to said periphery.

U.S. Pat. No. 5,806,546 issued 1998 Sep. 15, to Fong-Ming Ni, demonstrates a method of eliminating corrugation in central umbrella cover, being made of a plain weave cloth, in which the weft has no stretchability, while the warp has a slight stretchability; before the umbrella cloth being cut into an umbrella cover, the umbrella cover and the main rib are set a different angle of ten degrees; the tail end of the main ribs and the sewing points of the umbrella cloth are not fallen on the parallel line of the warp or the weft; from the sewing points to the central part of the ribs, there are different length so as to balance the tension of various stretch points; the edge of the umbrella cover is cut out and sewed properly so as to provide suitable corrugation-proof.

U.S. Pat. No. 5,885,679 issued 1999 Mar. 23, to Masaharu Yasue, and Masami Kamiya, demonstrates an improved joining structure for a waterproof fabric composed of a base fabric with a soft (elastomeric) resin film adhered thereon is provided. The joining structure is formed in a welt seam in which a hot-melt resin adhesive layer is interposed as a part of intermediate layers of the structure. The joining structure has properties of (1) bond strength .gtoreq.25 kg/25 cm width, (2) bending stiffness .ltoreq.20 gf.multidot.cm.sup.2/ cm and (3) water resistance after rubbing 1,000 times according to Scott shape method .gtoreq.800 mm H.sub.2 O. The joining structure can be formed by a method including joining the waterproof fabrics to form a welt seam with a hot melt resin layer put between and following that applying a high-frequency welding to the welt seam portion at a condition with an insulating elastic sheet interposed between the welt seam portion and electrode means to cause the hot-melt resin to be melted.

U.S. Pat. No. 6,431,221 issued 2002 Aug. 13, to David Wrigley, demonstrates a woven fabric comprises cross-machine direction weft yarns, and an array of interwoven warp yarns, the warp yarns being woven in the machine direction in alternating groups of relatively narrow yarns and relatively wide yarns. The narrow yarns are looped around a respective last weft yarn and back woven, whilst the wider yarns are extended to form inter-digitable loops for engagement of a pintle wire.

U.S. Pat. No. 6,655,175 issued 2003 Dec. 2, to Kazuyoshi Okamoto, demonstrates a first knitted fabric, a second knitted fabric and a third knitted fabric are knitted, with the first knitted fabric sandwiched between the second and third knitted fabrics, and the first knitted fabric is joined to the second and third knitted fabrics by loops in final courses of the second and third knitted fabrics being sequentially overlapped with loops at ends of the first knitted fabric from a side thereof closer to the first knitted fabric, processing from one end thereof toward the other end thereof, the knitting wherein with the second knitted fabric and the third knitted fabric separately retained on front and back needle beds, the first knitted fabric and the third knitted fabric are shifted toward the second knitted fabric by racking; the first knitted fabric is changed over between the front and back needle beds and a loop of the first knitted fabric at an end thereof on the second knitted fabric side and a loop of the second knitted fabric at a side end thereof are overlapped with each other and a loop of the third knitted fabric at a side end thereof and a loop of the first knitted fabric at an end thereof on the third knitted fabric side are overlapped with each other; and then a yarn is fed to the first knitted fabric to form next course loops therein is repeatedly performed. This can provide a decreased number of times for the loop to be transferred between the front and back needle beds, as compared with the conventional method according to which the knitted fabrics can be allowed to be close to each other so as to be joined together solely by changing over the knitted fabrics between the front and back needle beds by transferring loops therebetween.

U.S. Pat. No. 6,658,900 issued 2003 Dec. 9, to Kazuyoshi Okamoto, demonstrates a method for knitting and joining together at least two tubular fabrics by using a flat knitting machine. The method includes a step of laying loops of a final course in a joining region of a first tubular fabric, which comprise a number of wale and are located at a side end portion thereof, and loops of a final course in a joining region of a second tubular fabric are laid over each other such that the loops located at a near side from a boundary between a front knitted fabric part and a back-knitted fabric part are combined with each other and the loops located at a far side are combined with each other, thereby a machi is formed at a joining point of the tubular fabrics. The method also includes a step of knitting an integrated tubular fabric continuously from the joined tubular fabric.

U.S. Pat. No. 6,712,100 issued 2004 Mar. 30, to Steven S. Yook, and Phillip R. Elkins, demonstrates an on-machine-seamable papermaker's fabric includes a base fabric having seaming loops at its widthwise edges for joining the papermaker's fabric into endless form on a paper machine. The seam formed when the seaming loops are interdigitated and joined to one another with a pintle is covered with a strip of flow-resistant material, or, where the base fabric is a laminated structure having a top layer and a bottom layer, strips of flow-resistant material are placed between the top and bottom layers adjacent to the seam. The flow-resistant material provides the seam region with permeabilities to air and water substantially identical to those of the rest of the papermaker's fabric. At least one layer of staple fiber batt is entangled through the base fabric and flow-resistant material.

U.S. Pat. No. 6,997,126 issued 2006 Feb. 14, to Kimberly Murley, demonstrates a process for joining adjacent panels of plural layered upholstery, including the steps of adjacently positioning first and second panels, each having an offset backing and exterior layers, and substantially aligning longitudinal peripheries of the first and second panels. Stitching the panels together along a first stitching line positioned inboard of the longitudinal peripheries and substantially parallel thereto, and stitching portions of the first and second panels outboard of the first stitching line to an inboard portion of one or more of the panels along at least a second stitching line. In a preferred embodiment, the exterior layer in the first panel is offset laterally relative to the backing layer in an inboard direction, wherein the lateral offset imparts a substantially regular contour to portions of the exterior layer proximate the first stitching line and inboard thereof.

U.S. Pat. No. 7,029,555 issued 2006 Apr. 18, to Hiroshi Yamanaka, and Tatsuya Fujimura, demonstrates a diagonally joined cylindrical fabric in the form of a cylindrical endless fabric is obtained by shifting ends of facing wefts of a non-endless fabric leftward or rightward and joining together the ends of the wefts to thereby form a joining portion inclined relative to an axis of a cylinder. The cylindrical fabric comprises a weave pattern in which warp passes over continuous two or more wefts, then passes under a less number of wefts, the joining portion at ends of the fabric formed into an endless cylindrical shape is inclined relative to the axis at 25.degree. to 5.degree. The surface of the cylindrical fabric is formed with crimps that are longer in a face length direction than in a circumferential direction.

U.S. Pat. No. 7,455,743 issued 2008 Nov. 25, to Paul F. Kramer, and Gaston MacMillan, demonstrates a method of forming a stitchless, adhesively bonded seam involves placing a first strip of adhesive between the outside surface of first and second sheets of material along an edge of the second sheet. At least a portion of a second strip of adhesive is positioned against a first portion of the inside surface of the second sheet along the edge thereof. The second sheet of material is folded such that a second portion of the inside surface overlies the second strip of adhesive. In some embodiments the first and second strips of adhesive are replaced by a single longitudinally folded strip of adhesive. Energy may be applied, via an ultrasonic seam bonding machine or other means, to activate the adhesive. Seams made according to the disclosed methods may be used for garments, sports articles, and other items made of fabric or other sheet material.

U.S. Pat. No. 7,797,967 issued 2010 Sep. 21, to Fumio Shirasaki, and Koichi Oida, demonstrates a warp knitting fabric, excellent in a dimension stability and a shape stability or the like and preferably used for underpants or panty, or a shirt or the like, including: tube-shaped fabric parts that form articles in a predetermined pattern; marginal fabric portions that are knitted simultaneously with said fabric parts, and to be eventually cut therefrom; and bridging portions formed by knitting at a predetermined interval in wale direction, each of which connects a fringe of said fabric part onto the marginal fabric portion contiguous to the fringe; and wherein the bridging portions are formed by knitting to have a dimension of 2-20 courses in the wale direction, at an interval of 2-50 courses.

U.S. Pat. No. 8,127,701 issued 2012 Mar. 6, to Randy Harward, demonstrates a fabric joining method and system for attaching a first piece of fabric having synthetic content to a second piece of fabric having synthetic content. The method includes welding the first piece of fabric to the second piece of fabric at a seam and sewing the first piece of fabric to the second piece of fabric using a stitch that crosses the welded seam. An example method includes ultrasonically welding a first piece of fleece fabric to a second piece of fleece fabric followed by stitching along and across the welded seam completely through the fabric layers using a zig-zag stitch. The system includes a first piece of fabric, a second piece of fabric fused to the first piece of fabric at a welded seam, and a thread stitched across the welded seam.

U.S. Pat. No. 8,597,468 issued 2013 Dec. 3, to Matthew Ryan, and Susanne Klaschka, demonstrates a joining process for an endless or seamed press fabric, the joining process including the step of providing a woven base fabric having a plurality of monofilament yarns including warp yarns extending in a machine direction and weft yarns extending in a cross machine direction, the woven base fabric being cut along one of the weft yarns and having two opposing ends and two side edges. A predetermined number of the weft yarns are removed along each of the two opposing ends to free a plurality of cut ends of the warp yarns, fringing the ends. The plurality of free cut ends of the two opposing ends are interdigitated with each other and the cut ends opposing and adjoining one another are heat bonded to define a joint area.

U.S. Pat. No. 9,758,928 issued 2017 Sep. 12, to Giovanni Cartabbia, demonstrates a simplified method for making an impermeable joining on three-layer or bi-layer fabric materials, either with or without a complex construction on a joining side thereof, and being preliminarily joined by a stitching or ultrasound joining arrangement, wherein the method comprises only two method steps, a first joining step of joining two fabric material panels and a second impermeabilizing step carried out by cauterizing and sealing a strip element, and being performed by a single machine in a single operation thereof.

U.S. Pat. No. 9,863,100 issued 2018 Jan. 9, to Delaney Lewis, and Jose Urrutia, and Michael Ayers, demonstrates a method for covering a site with synthetic turf includes laying down a first elongate strip of synthetic turf, laying down a second elongate strip of synthetic turf, with the second elongate strip of synthetic turf is laid down substantially adjacent to the first elongate strip of synthetic turf in a manner such that a portion of the second elongate strip partially overlays a portion of the first elongate strip forming a lap joint. The method also includes the step of applying heat and/or pressure to weld the first elongate strip of synthetic turf to the second elongate strip of synthetic turf along the lap joint.

U.S. Pat. No. 10,112,739 issued 2018 Oct. 30, to Clifford Dunlap, and Daniel R. Schnaars, and Lori Kardos, and Raj an Patel, demonstrates a method of producing flexible polypropylene fabric bags with heat fused seams comprising providing fabric pieces, wherein each fabric piece has a coated side and an uncoated side; positioning fabric pieces so that a coated side of one fabric piece faces a coated side of another fabric piece; selecting an area of fabric to be joined for forming a seam or joint; applying heat to the area to be joined that is less than the melting point of the fabrics, for forming one or more seams or joints and wherein the heat fused seams or joints of a resulting polypropylene bag retains at least 85% of the fabric strength without using sewing machines.

U.S. Pat. No. 10,179,975 issued 2019 Jan. 15, to Joseph P. Botelho, and Victor P. Laskorski, and James P. Mastin, and Jennifer L. Rademan, demonstrates the ultrasonic welding of industrial fabrics. Specifically, the invention relates to methods for ultrasonically welding the seam area of industrial fabrics using a textured horn and/or anvil. The fabric edges are overlapped as woven or one or both edges can have some warp or weft yarns raveled out. The method involves ultrasonically bonding the overlapped fabric edges, reducing the caliper of the two stacked edges to match the body caliper of the fabric itself. The bonded area can then be perforated using laser or other mechanical means to produce a seam having the same woven texture and permeability (air and/or water) as the body of the fabric.

U.S. Pat. No. 10,260,185 issued 2019 Apr. 16, to Kenny McMaster, and Walter Wheater, demonstrates an anti-puckering apparatus for forming, on a work piece, a line of stitching substantially free from puckering is disclosed. The apparatus includes a removable base which is added to a sewing machine bed surface proximate to a needle and a stitch formation zone. The apparatus also includes a carrier mounted on, and moveable relative to, the base and an endless row of flexible filamentary elements carried by the carrier. The carrier progressively moves subsets of filamentary elements into and out of a stitch formation zone during the formation of a line of stitching. The filamentary elements are presented across a stitch formation zone in advance of an intended line of stitching at an oblique angle relative to a sewing machine bed surface.

U.S. Patent No 20020172792 issued 2002 Nov. 21, to Christine W. Jarvis, and Robert E. Bennett, and Brian Frederick, demonstrates a method for joining two or more substrates with a seam is provided. The seam is formed with a thermoplastic tape that is capable of forming an adhesive bond and a physical bond with a substrate. For instance, in one embodiment, the thermoplastic tape is formed from a polyurethane film. In addition, the seam can be utilized in a flat configuration or folded into a variety of different shapes, such as in a z-shaped configuration. As a result of the present invention, it has been discovered that a seam can be formed to have improved strength without substantially sacrificing the desired functional properties of the substrate materials.

U.S. Patent No 20090090425 issued 2009 Apr. 9, to John M. Hawes, and David S. Rougvie, demonstrates a laminated on-machine-seamable industrial fabric made from a flat woven full width base fabric layer wherein the base fabric layer is folded inwardly and flattened to produce a fabric with seaming loops disposed at the two widthwise edges.

Disadvantages of the Prior Art

The prior art have failed to solve many problems associated with method of carapace manufacturing, as follows:
1) No prior art mention or disclose any method of carapace manufacturing, having at least one water-directing ball-directing fruit-directing dome-bisecting transverse seam 103c.

Therefore, the prior art of method of carapace manufacturing:
  a) Cannot converge rain water therein,
    to repeatedly change the direction of rain water to decelerate the flowing speed of rain water to reduce water splash to avoid damaging vegetables in the directions of arrows 156 and 157
    (see FIG. 1B, FIG. 1C, FIG. 13A, FIG. 13B, and FIG. 13C);
  b) Cannot converge harvested fruits therein,
    to repeatedly change the direction of harvested fruits to decelerate the rolling speed of harvested fruits to reduce fruit bruises to avoid throwing away fruits
    in the direction of arrow 153
    (see FIG. 14H, FIG. 14I, FIG. 14J, FIG. 14K, and FIG. 14L);
  c) Cannot converge harvested nuts therein,
    to repeatedly change the direction of harvested nuts to decelerate the rolling speed of harvested fruits to reduce nut bruises to avoid throwing away nuts
    in the direction of arrow 154
    (see FIG. 14F and FIG. 14G);
  d) Cannot converge catched balls therein,
    to repeatedly change the direction of catched balls to decelerate the rolling speed of catched balls to reduce ball damages to avoid throwing away balls
    in the directions of arrows 151 and 152
    (see FIG. 14A, FIG. 14B, FIG. 14C, FIG. 14D, and FIG. 14E);
  e) Cannot direct collected water away from patios and balconies
    to keep property and occupants dry
    in the directions of arrow 158
    (see FIG. 13E, FIG. 13F, FIG. 13G, and FIG. 13H);
  f) Cannot distribute collected water onto crops when attached to the utility holes of a pickup truck
    to keep crops irrigated
    in the directions of arrow 156
    (see FIG. 13A, FIG. 13B, FIG. 13C, and FIG. 13D);
  g) Cannot direct collected fruit to a storage container
    to easily gather harvested fruit
    in the directions of arrow 153
    (see FIG. 14H, FIG. 14I, FIG. 14J, FIGS. 14K, and 14L);
  h) Cannot direct collected nuts to a storage container
    to easily gather harvested nuts
    in the direction of arrow 154
    (see FIG. 14M);

i) Cannot direct collected whiffle balls to a storage container
to easily gather whiffle balls
in the direction of arrow 151
(see FIG. 14A, FIG. 14B, FIG. 14C, FIG. 14D, and FIG. 14E);
j) Cannot direct collected golf balls to a storage container
to easily gather golf balls
in the direction of arrow 152
(see FIGS. 14F and 14G); and
k) Cannot securely connect at least one first three-dimensional-contour-conforming carapace dome panel 103*a* to at least one second three-dimensional-contour-conforming carapace dome panel 103*b*
(see FIG. 7B).

2) No prior art mention or disclose any method of carapace manufacturing, having at least one water-directing-and-ejecting ball-directing-and-ejecting fruit-directing-and-ejecting cross-cutting seam 103*d*.
Therefore, the prior art of method of carapace manufacturing:
a) Cannot converge rain water therein,
to repeatedly change the direction of rain water to decelerate the flowing speed of rain water to reduce water splash to avoid damaging vegetables
in the directions of arrows 156 and 157
(see FIG. 1B, FIG. 1C, FIG. 13A, FIG. 13B, and FIG. 13C);
b) Cannot converge harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and FIG. 14L);
c) Cannot converge harvested nuts therein,
to repeatedly change the direction of harvested nuts to decelerate the rolling speed of harvested fruits to reduce nut bruises to avoid throwing away nuts
in the direction of arrow 154
(see FIG. 14F and FIG. 14G);
d) Cannot converge catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);
e) Cannot direct collected water away from patios and balconies
to keep property and occupants dry
in the direction of arrow 158
(see FIG. 13E, FIG. 13F, FIG. 13G, and FIG. 13H);
f) Cannot distribute collected water onto crops when attached to the utility holes of a pickup truck
to keep crops irrigated
in the direction of arrow 156
(see FIG. 13A, FIG. 13B, FIG. 13C, and FIG. 13D);
g) Cannot direct collected fruit to a storage container
to easily gather harvested fruit
in the direction of arrow 153
(see FIG. 14H, FIG. 14I, FIG. 14J, FIGS. 14K, and 14L);
h) Cannot direct collected nuts to a storage container
to easily gather harvested nuts
in the direction of arrow 154
(see FIG. 14M);
i) Cannot direct collected whiffle balls to a storage container
to easily gather whiffle balls
in the direction of arrow 151
(see FIGS. 13A and 13B);
j) Cannot direct collected golf balls to a storage container
to easily gather golf balls
in the direction of arrow 152
(see FIGS. 14F and 14G); and
k) Cannot securely connect at least one first three-dimensional-contour-conforming carapace dome panel 103*a* to at least one second three-dimensional-contour-conforming carapace dome panel 103*b*
(see FIG. 7B).

3) No prior art mention or disclose any method of carapace manufacturing, having three-hundred-and-sixty-degree-orientational-spline-interchangeable carapace 102. Therefore, the prior art of method of carapace manufacturing:
a) Cannot cover the perimeter of three-hundred-and-sixty-degree-orientational interchangeable-spline system 121
in the direction of arrow 139
(see FIG. 5, FIG. 6, FIG. 7B, FIG. 7C, and FIG. 8A);
b) Cannot require a single cut only during manufacturing process, to save labor
(see FIG. 7B);
c) Cannot require a single cut only during manufacturing process, to save machinery and tooling cost;
d) Cannot require a single cut only during manufacturing process, to save time
(see FIG. 6 and FIG. 7B);
e) Cannot require no stitching during manufacturing process, to save labor
(see FIG. 6, and FIG. 7B);
f) Cannot require no stitching during manufacturing process, to save time;
g) Cannot provide means to tighten three-hundred-and-sixty-degree-orientational-spline-interchangeable carapace 102 on interchangeable splines 123 being attaching by carapace-perimeter-securing screws 105
in the direction of arrow 139
(see FIG. 5, FIG. 6, and FIG. 8A);
h) Cannot conform three-hundred-and-sixty-degree-orientational-spline-interchangeable carapace 102 to the shape of three-hundred-and-sixty-degree-orientational interchangeable-spline system 121; and
i) Cannot provide means to tighten three-hundred-and-sixty-degree-orientational-spline-interchangeable carapace 102 on interchangeable splines 123.

4) No prior art mention or disclose any method of carapace manufacturing, having three-hundred-and-sixty-degree-orientational-spline-interchangeable carapace 102. Therefore, the prior art of method of carapace manufacturing:

a) Cannot act as a cistern for irrigation
(see FIG. 14B and FIG. 14C);
b) Cannot act as a water-diverting gutter
(see FIG. 14D and FIG. 14E);
c) Cannot act as a falling-fruit-catching device
(see FIG. 13E and FIG. 13F);
d) Cannot act as a falling-nut catching device
(see FIG. 14A);
e) Cannot act as a whiffle ball and/or badminton shuttlecock catching and/or collecting device
(see FIG. 13A and FIG. 13B);
f) Cannot act as a golf-ball-catching, -blocking and/or -collecting device
(see FIG. 13C and FIG. 13D);
g) Cannot act as a free-standing projector screen
(see FIG. 14H);
h) Cannot act as a truck-bed tonneau cover when attached to a utility hole of a truck bed side
to secure items within a truck bed
(see FIG. 14L);
i) Cannot act as a shade cover when attached to a utility hole of a truck bed side to provide shade to occupants
(see FIG. 14G);
j) Cannot act as a whiffle ball and/or badminton shuttlecock blocking and/or deflecting device
(see FIG. 14I and FIG. 14J); and
k) Cannot act as a tow-hitch mountable projector screen
(see FIG. 14K).
5) No prior art mention or disclose any method of carapace manufacturing, having at least one first three-dimensional-contour-conforming carapace dome panel 103a. Therefore, the prior art of method of carapace manufacturing:
a) Cannot cover the perimeter of three-hundred-and-sixty-degree-orientational interchangeable-spline system 121
in the direction of arrow 139
(see FIG. 5, FIG. 6, FIG. 7B, FIG. 7C, and FIG. 8A);
b) Cannot require a single cut only during manufacturing process, to save labor
(see FIG. 7B);
c) Cannot require a single cut only during manufacturing process, to save machinery and tooling cost;
d) Cannot require a single cut only during manufacturing process, to save time
(see FIG. 6 and FIG. 7B);
e) Cannot require no stitching during manufacturing process, to save labor
(see FIG. 6, and FIG. 7B);
f) Cannot require no stitching during manufacturing process, to save machinery and tooling cost
(see FIG. 6, and FIG. 8A);
g) Cannot require no stitching during manufacturing process, to save time;
h) Cannot provide means to tighten three-hundred-and-sixty-degree-orientational-spline-interchangeable carapace 102 on interchangeable splines 123 being attaching by carapace-perimeter-securing screws 105
in the direction of arrow 139
(see FIG. 5, FIG. 6, and FIG. 8A);
i) Cannot conform three-hundred-and-sixty-degree-orientational-spline-interchangeable carapace 102 to the shape of three-hundred-and-sixty-degree-orientational interchangeable-spline system 121; and
j) Cannot provide means to tighten three-hundred-and-sixty-degree-orientational-spline-interchangeable carapace 102 on interchangeable splines 123.
6) No prior art mention or disclose any method of carapace manufacturing, having at least one first three-dimensional-contour-conforming carapace dome panel 103a. Therefore, the prior art of method of carapace manufacturing:
a) Cannot act as a cistern for irrigation
(see FIG. 13D, FIG. 13I, and FIG. 13J);
b) Cannot act as a water-diverting gutter
(see FIG. 13E, FIG. 13F, FIG. 13G, and FIG. 14H);
c) Cannot act as a falling-fruit-catching device
(see FIG. 14H, FIG. 13I, FIG. 13J, FIG. 13K, and FIG. 13L);
d) Cannot act as a falling-nut catching device
(see FIG. 14M);
e) Cannot act as a whiffle ball and/or badminton shuttlecock catching and/or collecting device
(see FIG. 14A, FIG. 14B, FIG. 14C, FIG. 14D, and FIG. 14E); f) Cannot act as a golf-ball-catching, -blocking and/or -collecting device
(see FIG. 14F and FIG. 14G);
g) Cannot act as a free-standing projector screen
(see FIG. 14O and FIG. 14P);
h) Cannot act as a truck-bed tonneau cover when attached to a utility hole of a truck bed side
to secure items within a truck bed
(see FIG. 14T);
i) Cannot act as a shade cover when attached to a utility hole of a truck bed side
to provide shade to occupants
(see FIG. 14N);
j) Cannot act as a whiffle ball and/or badminton shuttlecock blocking and/or deflecting device
(see FIG. 14Q and FIG. 14R); and
k) Cannot act as a tow-hitch mountable projector screen
(see FIG. 14S).
7) No prior art mention or disclose any method of carapace manufacturing, having at least one second three-dimensional-contour-conforming carapace dome panel 103b. Therefore, the prior art of method of carapace manufacturing:
a) Cannot cover the perimeter of three-hundred-and-sixty-degree-orientational interchangeable-spline system 121
in the direction of arrow 139
(see FIG. 5, FIG. 6, FIG. 7B, FIG. 7C, and FIG. 8A);
b) Cannot require a single cut only during manufacturing process, to save labor
(see FIG. 7B);
c) Cannot require a single cut only during manufacturing process, to save machinery and tooling cost;
d) Cannot require a single cut only during manufacturing process, to save time
(see FIG. 6 and FIG. 7B);
e) Cannot require no stitching during manufacturing process, to save labor
(see FIG. 6, and FIG. 7B);
f) Cannot require no stitching during manufacturing process, to save machinery and tooling cost
(see FIG. 6, and FIG. 8A);
g) Cannot require no stitching during manufacturing process, to save time;
h) Cannot provide means to tighten three-hundred-and-sixty-degree-orientational-spline-interchangeable carapace 102 on interchangeable splines 123 being attaching by carapace-perimeter-securing screws 105
in the direction of arrow 139
(see FIG. 5, FIG. 6, and FIG. 8A);
i) Cannot conform three-hundred-and-sixty-degree-orientational-spline-interchangeable carapace 102 to the shape of three-hundred-and-sixty-degree-orientational interchangeable-spline system 121; and
j) Cannot provide means to tighten three-hundred-and-sixty-degree-orientational-spline-interchangeable carapace 102 on interchangeable splines 123.
8) No prior art mention or disclose any method of carapace manufacturing, having at least one second three-dimensional-contour-conforming carapace dome panel 103b. Therefore, the prior art of method of carapace manufacturing:
a) Cannot act as a cistern for irrigation
(see FIG. 13D, FIG. 13I, and FIG. 13J);
b) Cannot act as a water-diverting gutter
(see FIG. 13E, FIG. 13F, FIG. 13G, and FIG. 14H);
c) Cannot act as a falling-fruit-catching device
(see FIG. 14H, FIG. 13I, FIG. 13J, FIG. 13K, and FIG. 13L);
d) Cannot act as a falling-nut catching device
(see FIG. 14M);
e) Cannot act as a whiffle ball and/or badminton shuttlecock catching and/or collecting device
(see FIG. 14A, FIG. 14B, FIG. 14C, FIG. 14D, and FIG. 14E);
f) Cannot act as a golf-ball-catching, -blocking and/or -collecting device
(see FIG. 14F and FIG. 14G);
g) Cannot act as a free-standing projector screen
(see FIG. 14O and FIG. 14P);
h) Cannot act as a truck-bed tonneau cover when attached to a utility hole of a truck bed side
to secure items within a truck bed
(see FIG. 14T);
i) Cannot act as a shade cover when attached to a utility hole of a truck bed side
to provide shade to occupants
(see FIG. 14N);
j) Cannot act as a whiffle ball and/or badminton shuttlecock blocking and/or deflecting device
(see FIG. 14Q and FIG. 14R); and
k) Cannot act as a tow-hitch mountable projector screen
(see FIG. 14S).
9) No prior art mention or disclose any method of carapace manufacturing, having perimeter-contour-conforming carapace edge 104.
Therefore, the prior art of method of carapace manufacturing:
a) Cannot stretch at least one first three-dimensional-contour-conforming carapace dome 103a and at least one second three-dimensional-contour-conforming carapace dome 103b over three-hundred-and-sixty-degree-orientational interchangeable-spline system 121;
b) Cannot cover the perimeter of three-hundred-and-sixty-degree-orientational interchangeable-spline system 121
(see FIG. 6, FIG. 7B, FIG. 7C, and FIG. 8A);
c) Cannot conform three-hundred-and-sixty-degree-orientational-spline-interchangeable carapace 102 to the shape of three-hundred-and-sixty-degree-orientational interchangeable-spline system 121
(see FIG. 6); and d) Cannot provide means to tighten three-hundred-and-sixty-degree-orientational-spline-interchangeable carapace 102 on interchangeable splines 123 being attaching by carapace-perimeter-securing screws 105
(see FIG. 5 and FIG. 6).
10) No prior art mention or disclose any method of carapace manufacturing, having multi-orientational-spline holes 120.
Therefore, the prior art of method of carapace manufacturing:
a) Cannot provide means to insert multi-orientational-spline screw and wing-nut 119 to lock three-hundred-and-sixty-degree-orientational spline-interchangeable carapace system 101 into multiple positions of rotation
in the directions of arrows 142, 143, 144, 145a, 145b, 146a, 146b, and 146c (see FIG. 9A, FIG. 9B, FIG. 10A, FIG. 10C, FIG. 10D, FIG. 10E, FIG. 10F, and FIG. 10G);
b) Cannot provide means to rotate three-hundred-and-sixty-degree-orientational spline-interchangeable carapace system 101 side to side
in the directions of arrows 144, 145a, 145b, 146a, 146b, and 146c
(see FIG. 9A, FIG. 9B, FIG. 10A, FIG. 10B, FIG. 10C, FIG. 10D, FIG. 10E, FIG. 10F, and FIG. 10G);
c) Cannot provide means to lock three-hundred-and-sixty-degree-orientational spline-interchangeable carapace system 101 into multiple positions of rotation
in the directions of arrows 142, 143, 144, 146a, 146b, and 146c (see FIG. 9A, FIG. 9B, FIG. 10A, FIG. 10D, FIG. 10F, and FIG. 10G); and
d) Cannot provide means to hingedly secure multi-orientational-spline screw and wing-nut 119 to multi-orientational-spline holes 120.
11) No prior art mention or disclose any method of carapace manufacturing, having interchangeable splines 123.
Therefore, the prior art of method of carapace manufacturing:
a) Cannot provide support for the preferred shape of three-hundred-and-sixty-degree-orientational-spline-interchangeable carapace 102
in the directions of arrows 139
(see FIG. 5, FIG. 6, FIG. 7B, FIG. 7C, and FIG. 8A);
b) Cannot provide means to collapse the deployed, large shape of three-hundred-and-sixty-degree-orientational spline-interchangeable carapace system 101 for storage
(see FIG. 7b, FIG. 7C, and FIG. 8A);
c) Cannot provide a form for a shape that is desirable for design and aesthetics of three-hundred-and-sixty-degree-orientational spline-interchangeable carapace system 101
(see FIG. 5, FIG. 6, FIG. 7B, FIG. 7C, and FIG. 8A);
d) Cannot provide structural means to support three-hundred-and-sixty-degree-orientational spline-interchangeable carapace system 101 from multiple positions along the outer perimeter;
e) Cannot provide structural means to tilt three-hundred-and-sixty-degree-orientational spline-interchangeable carapace system 101 in multiple degrees from side to side
in the directions of arrows 146a, 146b, and 146c
(see FIG. 10D, FIG. 10E, and FIG. 10F);
f) Cannot provide structural means to swing three-hundred-and-sixty-degree-orientational spline-interchangeable carapace system 101 in multiple degrees horizontally;
in the directions of arrow 145b
(see FIG. 10D); and
g) Cannot provide structural means to support three-hundred-and-sixty-degree-orientational spline-interchangeable carapace system 101 from multiple positions along the outer perimeter.
in the directions of arrows 143, 146a, 146b, 146c, 147, 148, 149, and 150
(see FIG. 11, FIG. 12A, FIG. 12B, and FIG. 12C).
12) No prior art mention or disclose any method of carapace manufacturing, having spline-actuating-and-supporting ribs 131.
Therefore, the prior art of method of carapace manufacturing:
a) Cannot support interchangeable splines 123
in the directions of arrows 143, 146a, 146b, 146c, 147, 148, 149, and 150
(see FIG. 9A, FIG. 10A, FIG. 11, FIG. 12A, FIG. 12B, and FIG. 12C);
b) Cannot provide means to actuate interchangeable splines 123 for deployment and contraction of three-hundred-and-sixty-degree-orientational interchangeable-spline system 121
in the directions of arrows 143, 146a, 147, 148, 149, and 150
(see FIG. 9A, FIG. 10A, FIG. 11C, and FIG. 11D);
c) Cannot provide means to form desirable aesthetic shapes of three-hundred-and-sixty-degree-orientational spline-interchangeable carapace system 101; and
d) Cannot provide geometry to deploy three-hundred-and-sixty-degree-orientational interchangeable-spline system 121 into an erect and locked position.
13) No prior art mention or disclose any method of carapace manufacturing, having multi-spline-interchangeable-hanger-attachment holes 133.
Therefore, the prior art of method of carapace manufacturing:
a) Cannot provide means to screw multi-orientation-spline-supporting hanger 109 to interchangeable splines 123;
b) Cannot provide multiple holes around semi-circumferences of interchangeable splines 123 to mount multi-orientation-spline-supporting hanger 109 thereby allowing multi-orientation-spline-supporting hanger 109 to be selectively positioned in any of multiple positions
in the directions of arrows 143, 145a, 145b, 146a, 146b, 146c, 147, 148, 149, and 150
(see FIG. 9A, FIG. 10A, FIG. 11, FIG. 12A, FIG. 12B, and FIG. 12C);
c) Cannot provide attachment for structural support to vertically tilt three-hundred-and-sixty-degree-orientational spline-interchangeable carapace system 101; and
d) Cannot provide attachment for the suspending of no-sew single-cut three-hundred-and-sixty-degree-orientational spline-interchangeable carapace system 101 from multi-orientation-spline-supporting hanger 109.
14) No prior art mention or disclose any method of carapace manufacturing, having multi-orientational-spline-attachment holes 134.
Therefore, the prior art of method of carapace manufacturing:
a) Cannot provide means to insert multi-orientational-spline screws and wing-nuts 119, thereby securing interchangeable splines 123 to multi-orientational-spline holes 120
in the directions of arrows 143, 145a, 145b, 146a, 146b, 146c, 147, 148, 149, and 150
(see FIG. 9A, FIG. 10A, FIG. 11, FIG. 12A, FIG. 12B, and FIG. 12C);
b) Cannot provide multiple holes around circumferences of interchangeable splines 123, to mount to multi-orientational-spline holes 120, thereby allowing to be selectively secured in any one of multiple vertical positions; and
c) Cannot provide attachment for the suspending of three-hundred-and-sixty-degree-orientational spline-interchangeable carapace system 101 from carapace-tilting-and-multi-orienting snap-locking handle 114
(see FIG. 6, FIG. 7B, and FIG. 8B).

Objects and Advantages of the Invention

The present invention substantially departs from the conventional concepts and methods of the prior art. In doing so, the present invention provides a method of manufacturing and using a five-device-in-one multi-function multi-orientation interchangeable reversible cantilever-stanchion carapace system (having three-hundred-and-sixty-degree-orientational spline-interchangeable carapace system, multi-height-adjustable and spline-supporting stanchion system, carapace-sliding-and-tilting multi-orienting snap-locking handle system, and multi-orientation interchangeable-spline system), having many unique and significant features, functions, and advantages, which overcome all the disadvantages of the prior art, as follows:
1) It is an object of the new invention to provide a method of manufacturing and using a five-device-in-one multi-function multi-orientation interchangeable reversible cantilever-stanchion carapace system, having
at least one water-directing ball-directing fruit-directing dome-bisecting transverse seam 103c.
Therefore, the method of manufacturing and using a five-device-in-one multi-function multi-orientation interchangeable reversible cantilever-stanchion carapace system:
a) Can converge rain water therein,
to repeatedly change the direction of rain water to decelerate the flowing speed of rain water to reduce water splash to avoid damaging vegetables
in the directions of arrows 156 and 157
(see FIG. 1B, FIG. 1C, FIG. 13A, FIG. 13B, and FIG. 13C);
b) Can converge harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and FIG. 14L);

c) Can converge harvested nuts therein,
to repeatedly change the direction of harvested nuts to decelerate the rolling speed of harvested nuts to reduce nut bruises to avoid throwing away nuts
in the direction of arrow 154
(see FIG. 14F and FIG. 14G);
d) Can converge catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);
e) Can direct collected water away from patios and balconies
to keep property and occupants dry
in the direction of arrow 158
(see FIG. 13E, FIG. 13F, FIG. 13G, and FIG. 13H);
f) Can distribute collected water onto crops when attached to the utility holes of a pickup truck
to keep crops irrigated
in the direction of arrow 157
(see FIG. 13A, FIG. 13B, FIG. 13C, and FIG. 13D);
g) Can direct collected fruit to a storage container
to easily gather harvested fruit
in the direction of arrow 153
(see FIG. 14H, FIG. 14I, FIG. 14J, FIGS. 14K, and 14L);
h) Can direct collected nuts to a storage container
to easily gather harvested nuts
in the direction of arrow 154
(see FIG. 14M);
i) Can direct collected whiffle balls to a storage container
to easily gather whiffle balls
in the direction of arrow 151
(see FIG. 14A, FIG. 14B, FIG. 14C, FIG. 14D, and FIG. 14E); and
j) Can direct collected golf balls to a storage container
to easily gather golf balls
in the direction of arrow 152
(see FIGS. 14F and 14G); and
k) Can securely connect at least one first three-dimensional-contour-conforming carapace dome panel 103*a* to at least one second three-dimensional-contour-conforming carapace dome panel 103*b*
(see FIG. 7B).
2) It is an object of the new invention to provide a method of manufacturing and using a five-device-in-one multi-function multi-orientation interchangeable reversible cantilever-stanchion carapace system, having
at least one water-directing-and-ejecting ball-directing-and-ejecting fruit-directing-and-ejecting cross-cutting seam 103*d*.
Therefore, the method of manufacturing and using a five-device-in-one multi-function multi-orientation interchangeable reversible cantilever-stanchion carapace system:

a) Can converge rain water therein,
to repeatedly change the direction of rain water to decelerate the flowing speed of rain water to reduce water splash to avoid damaging vegetables
in the directions of arrows 156 and 157
(see FIG. 1B, FIG. 1C, FIG. 13A, FIG. 13B, and FIG. 13C);
b) Can converge harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and FIG. 14L);
c) Can converge harvested nuts therein,
to repeatedly change the direction of harvested nuts to decelerate the rolling speed of harvested nuts to reduce nut bruises to avoid throwing away nuts
in the direction of arrow 154
(see FIG. 14F and FIG. 14G);
d) Can converge catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);
e) Can direct collected water away from patios and balconies
to keep property and occupants dry
in the direction of arrow 158
(see FIG. 13E, FIG. 13F, FIG. 13G, and FIG. 13H);
f) Can distribute collected water onto crops when attached to the utility holes of a pickup truck
to keep crops irrigated
in the direction of arrow 156
(see FIG. 13A, FIG. 13B, FIG. 13C, and FIG. 13D);
g) Can direct collected fruit to a storage container
to easily gather harvested fruit
in the direction of arrow 153
(see FIG. 14H, FIG. 14I, FIG. 14J, FIGS. 14K, and 14L);
h) Can direct collected nuts to a storage container
to easily gather harvested nuts
in the direction of arrow 154
(see FIG. 14M);
i) Can direct collected whiffle balls to a storage container
to easily gather whiffle balls
in the directions of arrows 151*a* and 151*b*
(see FIGS. 13A and 13B);
j) Can direct collected golf balls to a storage container
to easily gather golf balls
in the direction of arrow 151
(see FIG. 14A, FIG. 14B, FIG. 14C, FIG. 14D, and FIG. 14E); and
k) Can securely connect at least one first three-dimensional-contour-conforming carapace dome panel 103*a* to at least one second three-dimensional-contour-conforming carapace dome panel 103*b*
(see FIG. 7B).

3) It is an object of the new invention to provide a method of manufacturing and using a five-device-in-one multi-function multi-orientation interchangeable reversible cantilever-stanchion carapace system, having three-hundred-and-sixty-degree-orientational-spline-interchangeable carapace 102. Therefore, the method of manufacturing and using a five-device-in-one multi-function multi-orientation interchangeable reversible cantilever-stanchion carapace system:
 a) Can cover the perimeter of three-hundred-and-sixty-degree-orientational interchangeable-spline system 121
  in the direction of arrow 139
   (see FIG. 5, FIG. 6, FIG. 7B, FIG. 7C, and FIG. 8A);
 b) Can require a single cut only during manufacturing process, to save labor
  (see FIG. 7B);
 c) Can require a single cut only during manufacturing process, to save machinery and tooling cost;
 d) Can require a single cut only during manufacturing process, to save time
  (see FIG. 6 and FIG. 7B);
 e) Can require no stitching during manufacturing process, to save labor
  (see FIG. 6, and FIG. 7B);
 f) Can require no stitching during manufacturing process, to save time;
 g) Can provide means to tighten three-hundred-and-sixty-degree-orientational-spline-interchangeable carapace 102 on interchangeable splines 123 being attaching by carapace-perimeter-securing screws 105
  in the direction of arrow 139
   (see FIG. 5, FIG. 6, and FIG. 8A);
 h) Can conform three-hundred-and-sixty-degree-orientational-spline-interchangeable carapace 102 to the shape of three-hundred-and-sixty-degree-orientational interchangeable-spline system 121; and
 i) Can provide means to tighten three-hundred-and-sixty-degree-orientational-spline-interchangeable carapace 102 on interchangeable splines 123.
4) It is an object of the new invention to provide a method of manufacturing and using a five-device-in-one multi-function multi-orientation interchangeable reversible cantilever-stanchion carapace system, having three-hundred-and-sixty-degree-orientational-spline-interchangeable carapace 102.
 Therefore, the method of manufacturing and using a five-device-in-one multi-function multi-orientation interchangeable reversible cantilever-stanchion carapace system:
  a) Can act as a cistern for irrigation
   (see FIG. 13D, FIG. 13I, and FIG. 13J);
  b) Can act as a water-diverting gutter
   (see FIG. 13E, FIG. 13F, FIG. 13G, and FIG. 14H);
  c) Can act as a falling-fruit-catching device
   (see FIG. 14H, FIG. 13I, FIG. 13J, FIG. 13K, and FIG. 13L);
  d) Can act as a falling-nut catching device
   (see FIG. 14M);
  e) Can act as a whiffle ball and/or badminton shuttle-cock catching and/or collecting device
   (see FIG. 14A, FIG. 14B, FIG. 14C, FIG. 14D, and FIG. 14E);
  f) Can act as a golf-ball-catching, -blocking and/or -collecting device
   (see FIG. 14F and FIG. 14G);
  g) Can act as a free-standing projector screen
   (see FIG. 14O and FIG. 14P);
  h) Can act as a truck-bed tonneau cover when attached to a utility hole of a truck bed side to secure items within a truck bed
   (see FIG. 14T);
  i) Can act as a shade cover when attached to a utility hole of a truck bed side
   to provide shade to occupants
   (see FIG. 14N);
  j) Can act as a whiffle ball and/or badminton shuttle-cock blocking and/or deflecting device
   (see FIG. 14Q and FIG. 14R); and
  k) Can act as a tow-hitch mountable projector screen
   (see FIG. 14S).
5) It is an object of the new invention to provide a method of manufacturing and using a five-device-in-one multi-function multi-orientation interchangeable reversible cantilever-stanchion carapace system, having
 at least one first three-dimensional-contour-conforming carapace dome panel 103a. Therefore, the method of manufacturing and using a five-device-in-one multi-function multi-orientation interchangeable reversible cantilever-stanchion carapace system:
  a) Can cover the perimeter of three-hundred-and-sixty-degree-orientational interchangeable-spline system 121
   in the direction of arrow 139
    (see FIG. 5, FIG. 6, FIG. 7B, FIG. 7C, and FIG. 8A);
  b) Can require a single cut only during manufacturing process, to save labor
   (see FIG. 7B);
  c) Can require a single cut only during manufacturing process, to save machinery and tooling cost;
  d) Can require a single cut only during manufacturing process, to save time
   (see FIG. 6 and FIG. 7B);
  e) Can require no stitching during manufacturing process, to save labor
   (see FIG. 6, and FIG. 7B);
  f) Can require no stitching during manufacturing process, to save machinery and tooling cost
   (see FIG. 6, and FIG. 8A);
  g) Can require no stitching during manufacturing process, to save time;
  h) Can provide means to tighten three-hundred-and-sixty-degree-orientational-spline-interchangeable carapace 102 on interchangeable splines 123 being attaching by carapace-perimeter-securing screws 105
   in the direction of arrow 139
    (see FIG. 5, FIG. 6, and FIG. 8A);
  i) Can conform three-hundred-and-sixty-degree-orientational-spline-interchangeable carapace 102 to the shape of three-hundred-and-sixty-degree-orientational interchangeable-spline system 121; and
  j) Can provide means to tighten three-hundred-and-sixty-degree-orientational-spline-interchangeable carapace 102 on interchangeable splines 123.
6) It is an object of the new invention to provide a method of manufacturing and using a five-device-in-one multi-function multi-orientation interchangeable reversible cantilever-stanchion carapace system, having at least one first three-dimensional-contour-conforming carapace dome panel 103*a*. Therefore, the method of manufacturing and using a five-device-in-one multi-function multi-orientation interchangeable reversible cantilever-stanchion carapace system:
  a) Can act as a cistern for irrigation
    (see FIG. 13D, FIG. 13I, and FIG. 13J);
  b) Can act as a water-diverting gutter
    (see FIG. 13E, FIG. 13F, FIG. 13G, and FIG. 14H);
  c) Can act as a falling-fruit-catching device
    (see FIG. 14H, FIG. 13I, FIG. 13J, FIG. 13K, and FIG. 13L);
  d) Can act as a falling-nut catching device
    (see FIG. 14M);
  e) Can act as a whiffle ball and/or badminton shuttle-cock catching and/or collecting device
    (see FIG. 14A, FIG. 14B, FIG. 14C, FIG. 14D, and FIG. 14E);
  f) Can act as a golf-ball-catching, -blocking and/or -collecting device
    (see FIG. 14F and FIG. 14G);
  g) Can act as a free-standing projector screen
    (see FIG. 14O and FIG. 14P);
  h) Can act as a truck-bed tonneau cover when attached to a utility hole of a truck bed side to secure items within a truck bed
    (see FIG. 14T);
  i) Can act as a shade cover when attached to a utility hole of a truck bed side to provide shade to occupants
    (see FIG. 14N);
  j) Can act as a whiffle ball and/or badminton shuttle-cock blocking and/or deflecting device
    (see FIG. 14Q and FIG. 14R); and
  k) Can act as a tow-hitch mountable projector screen
    (see FIG. 14S).
7) It is an object of the new invention to provide a method of manufacturing and using a five-device-in-one multi-function multi-orientation interchangeable reversible cantilever-stanchion carapace system, having
  at least one second three-dimensional-contour-conforming carapace dome panel 103*b*. Therefore, the method of manufacturing and using a five-device-in-one multi-function multi-orientation interchangeable reversible cantilever-stanchion carapace system:
    a) Can cover the perimeter of three-hundred-and-sixty-degree-orientational interchangeable-spline system 121 in the direction of arrow 139
      (see FIG. 5, FIG. 6, FIG. 7B, FIG. 7C, and FIG. 8A);
    b) Can require a single cut only during manufacturing process, to save labor
      (see FIG. 7B);
    c) Can require a single cut only during manufacturing process, to save machinery and tooling cost;
    d) Can require a single cut only during manufacturing process, to save time
      (see FIG. 6 and FIG. 7B);
    e) Can require no stitching during manufacturing process, to save labor
      (see FIG. 6, and FIG. 7B);
    f) Can require no stitching during manufacturing process, to save machinery and tooling cost
      (see FIG. 6, and FIG. 8A);
    g) Can require no stitching during manufacturing process, to save time;
    h) Can provide means to tighten three-hundred-and-sixty-degree-orientational-spline-interchangeable carapace 102 on interchangeable splines 123 being attaching by carapace-perimeter-securing screws 105 in the direction of arrow 139
      (see FIG. 5, FIG. 6, and FIG. 8A);
    i) Can conform three-hundred-and-sixty-degree-orientational-spline-interchangeable carapace 102 to the shape of three-hundred-and-sixty-degree-orientational interchangeable-spline system 121; and
    j) Can provide means to tighten three-hundred-and-sixty-degree-orientational-spline-interchangeable carapace 102 on interchangeable splines 123.
8) It is an object of the new invention to provide a method of manufacturing and using a five-device-in-one multi-function multi-orientation interchangeable reversible cantilever-stanchion carapace system, having
  at least one second three-dimensional-contour-conforming carapace dome panel 103*b*. Therefore, the method of manufacturing and using a five-device-in-one multi-function multi-orientation interchangeable reversible cantilever-stanchion carapace system:
    a) Can act as a cistern for irrigation
      (see FIG. 13D, FIG. 13I, and FIG. 13J);
    b) Can act as a water-diverting gutter
      (see FIG. 13E, FIG. 13F, FIG. 13G, and FIG. 14H);
    c) Can act as a falling-fruit-catching device
      (see FIG. 14H, FIG. 13I, FIG. 13J, FIG. 13K, and FIG. 13L);
    d) Can act as a falling-nut catching device
      (see FIG. 14M);
    e) Can act as a whiffle ball and/or badminton shuttle-cock catching and/or collecting device
      (see FIG. 14A, FIG. 14B, FIG. 14C, FIG. 14D, and FIG. 14E);
    f) Can act as a golf-ball-catching, -blocking and/or -collecting device
      (see FIG. 14F and FIG. 14G);
    g) Can act as a free-standing projector screen
      (see FIG. 14O and FIG. 14P);
    h) Can act as a truck-bed tonneau cover when attached to a utility hole of a truck bed side to secure items within a truck bed
      (see FIG. 14T);
    i) Can act as a shade cover when attached to a utility hole of a truck bed side to provide shade to occupants
      (see FIG. 14N);
    j) Can act as a whiffle ball and/or badminton shuttle-cock blocking and/or deflecting device
      (see FIG. 14Q and FIG. 14R); and
    k) Can act as a tow-hitch mountable projector screen
      (see FIG. 14S).
9) It is another object of the new invention to provide a method of manufacturing and using a five-device-in-one multi-function multi-orientation interchangeable reversible cantilever-stanchion carapace system, having
  perimeter-contour-conforming carapace edge 104.

Therefore, the method of manufacturing and using a five-device-in-one multi-function multi-orientation interchangeable reversible cantilever-stanchion carapace system:
  a) Can stretch at least one first three-dimensional-contour-conforming carapace dome panel 103a and at least one second three-dimensional-contour-conforming carapace dome panel 103b over three-hundred-and-sixty-degree-orientational interchangeable-spline system 121;
  b) Can cover the perimeter of three-hundred-and-sixty-degree-orientational interchangeable-spline system 121
    (see FIG. 6, FIG. 7B, FIG. 7C, and FIG. 8A);
  c) Can conform three-hundred-and-sixty-degree-orientational-spline-interchangeable carapace 102 to the shape of three-hundred-and-sixty-degree-orientational interchangeable-spline system 121
    (see FIG. 6); and
  d) Can provide means to tighten three-hundred-and-sixty-degree-orientational-spline-interchangeable carapace 102 on interchangeable splines 123 being attaching by carapace-perimeter-securing screws 105
    (see FIG. 5 and FIG. 6).

10) It is another object of the new invention to provide a method of manufacturing and using a five-device-in-one multi-function multi-orientation interchangeable reversible cantilever-stanchion carapace system, having
multi-orientational-spline holes 120.
Therefore, the method of manufacturing and using a five-device-in-one multi-function multi-orientation interchangeable reversible cantilever-stanchion carapace system:
  a) Can provide means to insert multi-orientational-spline screw and wing-nut 119 to lock three-hundred-and-sixty-degree-orientational spline-interchangeable carapace system 101 into multiple positions of rotation
    in the directions of arrows 142, 143, 144, 145a, 145b, 146a, 146b, and 146c
    (see FIG. 9A, FIG. 9B, FIG. 10A, FIG. 10C, FIG. 10D, FIG. 10E, FIG. 10F, and FIG. 10G);
  b) Can provide means to rotate three-hundred-and-sixty-degree-orientational spline-interchangeable carapace system 101 side to side
    in the directions of arrows 144, 145a, 145b, 146a, 146b, and 146c (see FIG. 9A, FIG. 9B, FIG. 10A, FIG. 10B, FIG. 10C, FIG. 10D, FIG. 10E, FIG. 10F, and FIG. 10G);
  c) Can provide means to lock three-hundred-and-sixty-degree-orientational spline-interchangeable carapace system 101 into multiple positions of rotation
    in the directions of arrows 142, 143, 144, 146a, 146b, and 146c (see FIG. 9A, FIG. 9B, FIG. 10A, FIG. 10D, FIG. 10F, and FIG. 10G); and
  d) Can provide means to hingedly secure multi-orientational-spline screw and wing-nut 119 to multi-orientational-spline holes 120.

11) It is a further object of the new invention to provide a method of manufacturing and using a five-device-in-one multi-function multi-orientation interchangeable reversible cantilever-stanchion carapace system, having
interchangeable splines 123.

Therefore, the method of manufacturing and using a five-device-in-one multi-function multi-orientation interchangeable reversible cantilever-stanchion carapace system:
  a) Can provide support for the preferred shape of three-hundred-and-sixty-degree-orientational-spline-interchangeable carapace 102;
    in the directions of arrows 139
    (see FIG. 5, FIG. 6, FIG. 7B, FIG. 7C, and FIG. 8A);
  b) Can provide means to collapse the deployed, large shape of three-hundred-and-sixty-degree-orientational spline-interchangeable carapace system 101 for storage
    (see FIG. 7b, FIG. 7C, and FIG. 8A);
  c) Can provide a form for a shape that is desirable for design and aesthetics of three-hundred-and-sixty-degree-orientational spline-interchangeable carapace system 101
    (see FIG. 5, FIG. 6, FIG. 7B, FIG. 7C, and FIG. 8A);
  d) Can provide structural means to support three-hundred-and-sixty-degree-orientational spline-interchangeable carapace system 101 from multiple positions along the outer perimeter;
  e) Can provide structural means to tilt three-hundred-and-sixty-degree-orientational spline-interchangeable carapace system 101 in multiple degrees from side to side; and
    in the directions of arrows 146a, 146b, and 146c
    (see FIG. 10D, FIG. 10E, and FIG. 10F);
  f) Can provide structural means to swing three-hundred-and-sixty-degree-orientational spline-interchangeable carapace system 101 in multiple degrees horizontally; and
    in the directions of arrow 145b
    (see FIG. 10D); and
  g) Can provide structural means to support three-hundred-and-sixty-degree-orientational spline-interchangeable carapace system 101 from multiple positions along the outer perimeter.
    in the directions of arrows 143, 146a, 146b, 146c, 147, 148, 149, and 150
    (see FIG. 11, FIG. 12A, FIG. 12B, and FIG. 12C).

12) It is an even further object of the new invention to provide a method of manufacturing and using a five-device-in-one multi-function multi-orientation interchangeable reversible cantilever-stanchion carapace system, having
spline-actuating-and-supporting ribs 131.
Therefore, the method of manufacturing and using a five-device-in-one multi-function multi-orientation interchangeable reversible cantilever-stanchion carapace system:
  a) Can support interchangeable splines 123
    in the directions of arrows 143, 146a, 146b, 146c, 147, 148, 149, and 150 (see FIG. 9A, FIG. 10A, FIG. 11, FIG. 12A, FIG. 12B, and FIG. 12C);
  b) Can provide means to actuate interchangeable splines 123 for deployment and contraction of three-hundred-and-sixty-degree-orientational interchangeable-spline system 121
    in the directions of arrows 143, 146a, 147, 148, 149, and 150 (see FIG. 9A, FIG. 10A, FIG. 11C, and FIG. 11D);

c) Can provide means to form desirable aesthetic shapes of three-hundred-and-sixty-degree-orientational spline-interchangeable carapace system 101; and
d) Can provide geometry to deploy three-hundred-and-sixty-degree-orientational interchangeable-spline system 121 into an erect and locked position.

13) It is another object of the new invention to provide a method of manufacturing and using a five-device-in-one multi-function multi-orientation interchangeable reversible cantilever-stanchion carapace system, having multi-spline-interchangeable-hanger-attachment holes 133.

Therefore, the method of manufacturing and using a five-device-in-one multi-function multi-orientation interchangeable reversible cantilever-stanchion carapace system:
a) Can provide means to screw multi-orientation-spline-supporting hanger 109 to interchangeable splines 123;
b) Can provide multiple holes around semi-circumferences of interchangeable splines 123 to mount multi-orientation-spline-supporting hanger 109 thereby allowing multi-orientation-spline-supporting hanger 109 to be selectively positioned in any of multiple positions
in the directions of arrows 143, 145a, 145b, 146a, 146b, 146c, 147, 148, 149, and 150
(see FIG. 9A, FIG. 10A, FIG. 11, FIG. 12A, FIG. 12B, and FIG. 12C);
c) Can provide attachment for structural support to vertically tilt three-hundred-and-sixty-degree-orientational spline-interchangeable carapace system 101; and
d) Can provide attachment for the suspending of no-sew single-cut three-hundred-and-sixty-degree-orientational spline-interchangeable carapace system 101 from multi-orientation-spline-supporting hanger 109.

14) It is yet another object of the new invention to provide a method of manufacturing and using a five-device-in-one multi-function multi-orientation interchangeable reversible cantilever-stanchion carapace system, having multi-orientational-spline-attachment holes 134.

Therefore, the method of manufacturing and using a five-device-in-one multi-function multi-orientation interchangeable reversible cantilever-stanchion carapace system:
a) Can provide means to insert multi-orientational-spline screws and wing-nuts 119, thereby securing interchangeable splines 123 to multi-orientational-spline holes 120
in the directions of arrows 143, 145a, 145b, 146a, 146b, 146c, 147, 148, 149, and 150
(see FIG. 9A, FIG. 10A, FIG. 11, FIG. 12A, FIG. 12B, and FIG. 12C);
b) Can provide multiple holes around circumferences of interchangeable splines 123, to mount to multi-orientational-spline holes 120, thereby allowing to be selectively secured in any one of multiple vertical positions; and
c) Can provide attachment for the suspending of three-hundred-and-sixty-degree-orientational spline-interchangeable carapace system 101 from carapace-tilting-and-multi-orienting snap-locking handle 114
(see FIG. 6, FIG. 7B, and FIG. 8B).

Other objects and advantages of the present invention will become apparent from a consideration of the accompanying drawings and ensuing description.

SUMMARY OF THE INVENTION

A method of manufacturing and using a five-device-in-one multi-function multi-orientation interchangable reversible cantilever-stanchion carapace system comprises the steps of:

sewing said at least one first three-dimensional-contour-conforming carapace dome panel 103a and said at least one second three-dimensional-contour-conforming carapace dome panel 103b together such that said at least one water-directing-and-ejecting ball-directing-and-ejecting fruit-directing-and-ejecting transverse seam 103c and said at least one water-directing-and-ejecting ball-directing-and-ejecting fruit-directing-and-ejecting cross-cutting seam 103d are formed therebetween
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts,
for converging catched balls therein
to repeatedly change the direction of catched balls to decelerate the rolling speed of catched balls to reduce ball damages to avoid throwing away damaged balls,
for directing rain water therealong,
for directing harvested fruits therealong,
for directing harvested nuts therealong,
for directing game balls therealong,
for forming a collecting cistern to collect rain water to irrigate garden,
for forming a diverting gutter to collect rain water
to discharge said rain water away from house balcony and foundation,
for forming a collecting device to collect harvested fruits
to save labor and time,
for forming a collecting device to collect harvested nuts
to save labor and time,
for forming a collecting device to collect game balls
to save labor and time,
for forming a tonneau cover for a truck bed,
for forming a shade cover,
for forming a free-standing projector screen,
for forming a hitch-mountable projector screen, and
for forming a sports-ball blocking device;

attaching said at least one first three-dimensional-contour-conforming carapace dome panel 103*a* to said interchangeable splines 123
for converging rain water therein,
for converging harvested fruits therein,
for converging harvested nuts therein,
for converging catched balls therein,
for guiding rain water down along said carapace-supporting angled arm 108 and down along said multi-height-adjustable carapace stanchion 111,
for guiding fruits down along said carapace-supporting angled arm 108
and down along said multi-height-adjustable carapace stanchion 111,
for guiding nuts down along said carapace-supporting angled arm 108
and down along said multi-height-adjustable carapace stanchion 111,
for guiding balls down along said carapace-supporting angled arm 108
and down along said multi-height-adjustable carapace stanchion 111;
attaching said at least one second three-dimensional-contour-conforming carapace dome panel 103*b* to said interchangeable splines 123
for converging rain water therein,
for converging harvested fruits therein,
for converging harvested nuts therein,
for converging catched balls therein,
for guiding rain water down along said carapace-supporting angled arm 108 and down along said multi-height-adjustable carapace stanchion 111,
for guiding fruits down along said carapace-supporting angled arm 108
and down along said multi-height-adjustable carapace stanchion 111,
for guiding nuts down along said carapace-supporting angled arm 108
and down along said multi-height-adjustable carapace stanchion 111,
for guiding balls down along said carapace-supporting angled arm 108
and down along said multi-height-adjustable carapace stanchion 111;
attaching said at least one first outer edges of said at least one first three-dimensional-contour-conforming carapace dome panel 103*a* to said spline ends of said interchangeable splines 123, respectively;
attaching said at least one second outer edges said at least one second three-dimensional-contour-conforming carapace dome panel 103*b* to said spline ends of said interchangeable splines 123, respectively;
adjusting said carapace-supporting-arm angle of said carapace-supporting angled arm 108; and locking said carapace-tilting-and-multi-orienting snap-locking handle 114 to said multi-height-adjustable carapace stanchion 111.

BRIEF DESCRIPTION OF THE DRAWINGS

FIG. 1A, FIG. 1B, FIG. 1C, FIG. 1D, FIG. 1E, FIG. 1F, FIG. 1G, FIG. 1H, and FIG. 1I illustrate complete, frame-only, and carapace-only side and perspective views of the method of manufacturing and using a five-device-in-one multi-function multi-orientation interchangeable reversible cantilever-stanchion carapace system, respectively.

FIG. 2C and FIG. 2D illustrate partial views of the carapace-sliding-and-tilting multi-orienting snap-locking handle system 113, and the multi-orientational mounting of the interchangeable splines 123, respectively.

FIG. 4A and FIG. 4B illustrate top views of the slide-lock buckle eyelet 136, the slide-lock buckle button 137, and the storage strap 138, respectively.

FIG. 8A, FIG. 8B, FIG. 8C, and FIG. 8D illustrate a perspective view and side views of multi-height-adjustable and spline-supporting stanchion system 106, and how the system provides a tilting function, respectively.

FIG. 10A, FIG. 10B, FIG. 10C, FIG. 10D, FIG. 10E, FIG. 10F, FIG. 10G, FIG. 11, FIG. 12A, FIG. 12B, and FIG. 12C depict side-to-side tilting, horizontal rotation, spline interchangeability, and automatic centering functions provided by the three-hundred-and-sixty-degree-orientational interchangeable-spline system 121, respectively.

FIG. 13A, FIG. 13B, FIG. 13C, FIG. 13D, FIG. 13E, FIG. 13F, FIG. 13G, FIG. 13H, FIG. 13I, FIG. 13J, FIG. 14A, FIG. 14B, FIG. 14C, FIG. 14D, FIG. 14E, FIG. 14F, FIG. 14G, FIG. 14H, FIG. 14I, FIG. 14J, FIG. 14K, FIG. 14L, FIG. 14M, FIG. 14N, FIG. 14O, FIG. 14P, FIG. 14Q, FIG. 14R, FIG. 14S, and FIG. 14T depict varying functions of the method of manufacturing and using a five-device-in-one multi-function multi-orientation interchangeable reversible cantilever-stanchion carapace system, respectively.

DETAILED DESCRIPTION OF THE INVENTION

Figure 1A:
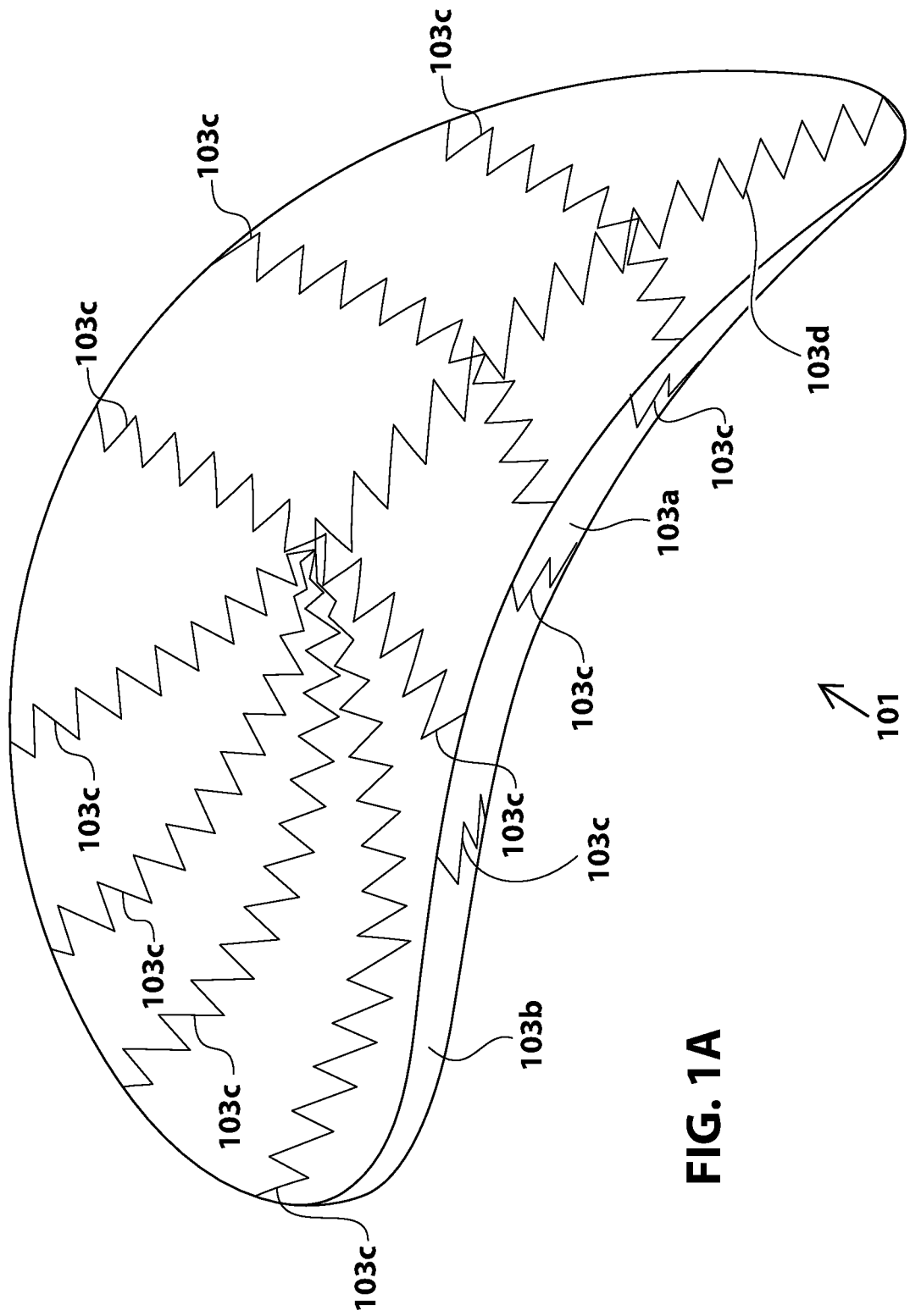
Figure 1B:
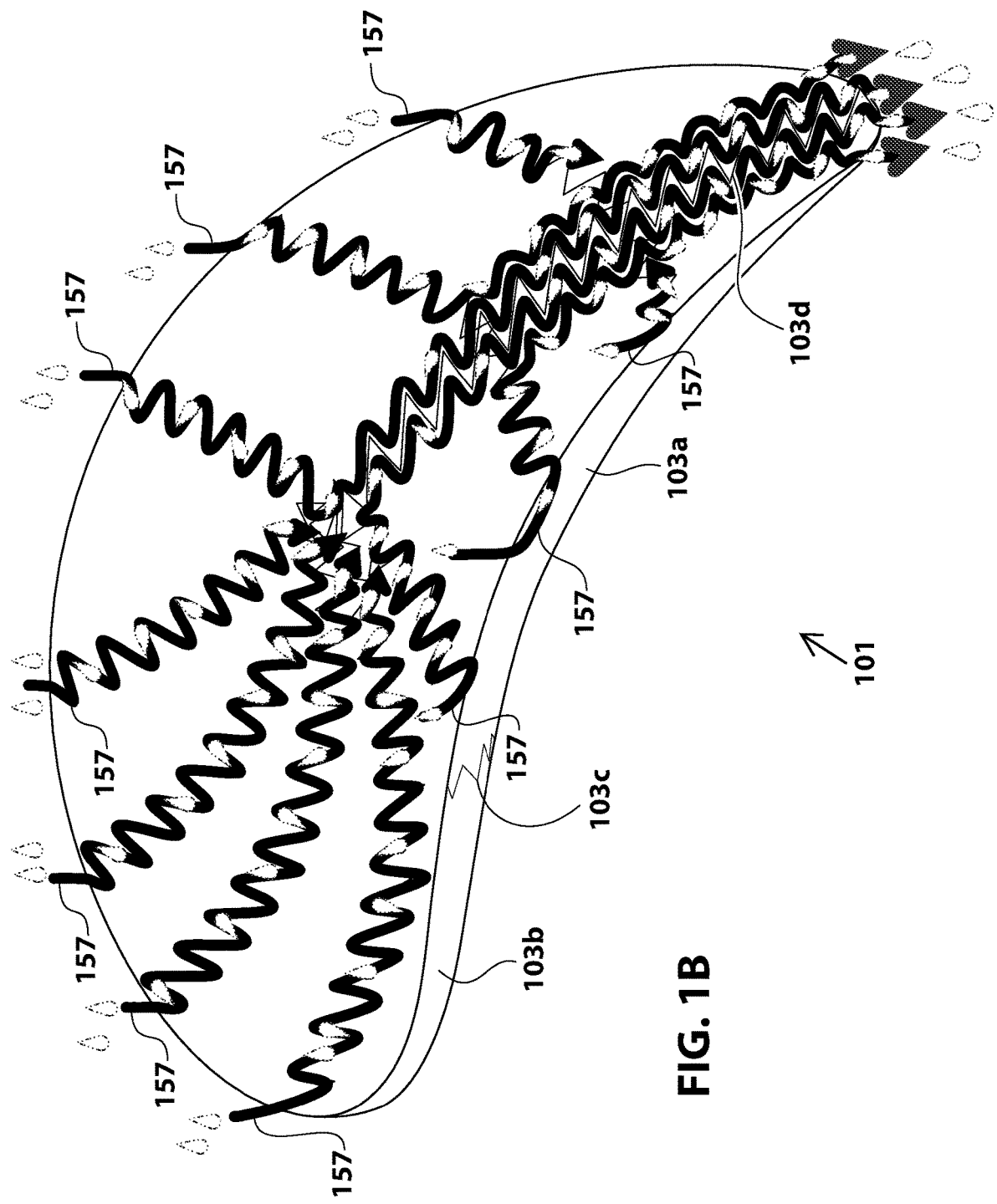
Figure 1C:
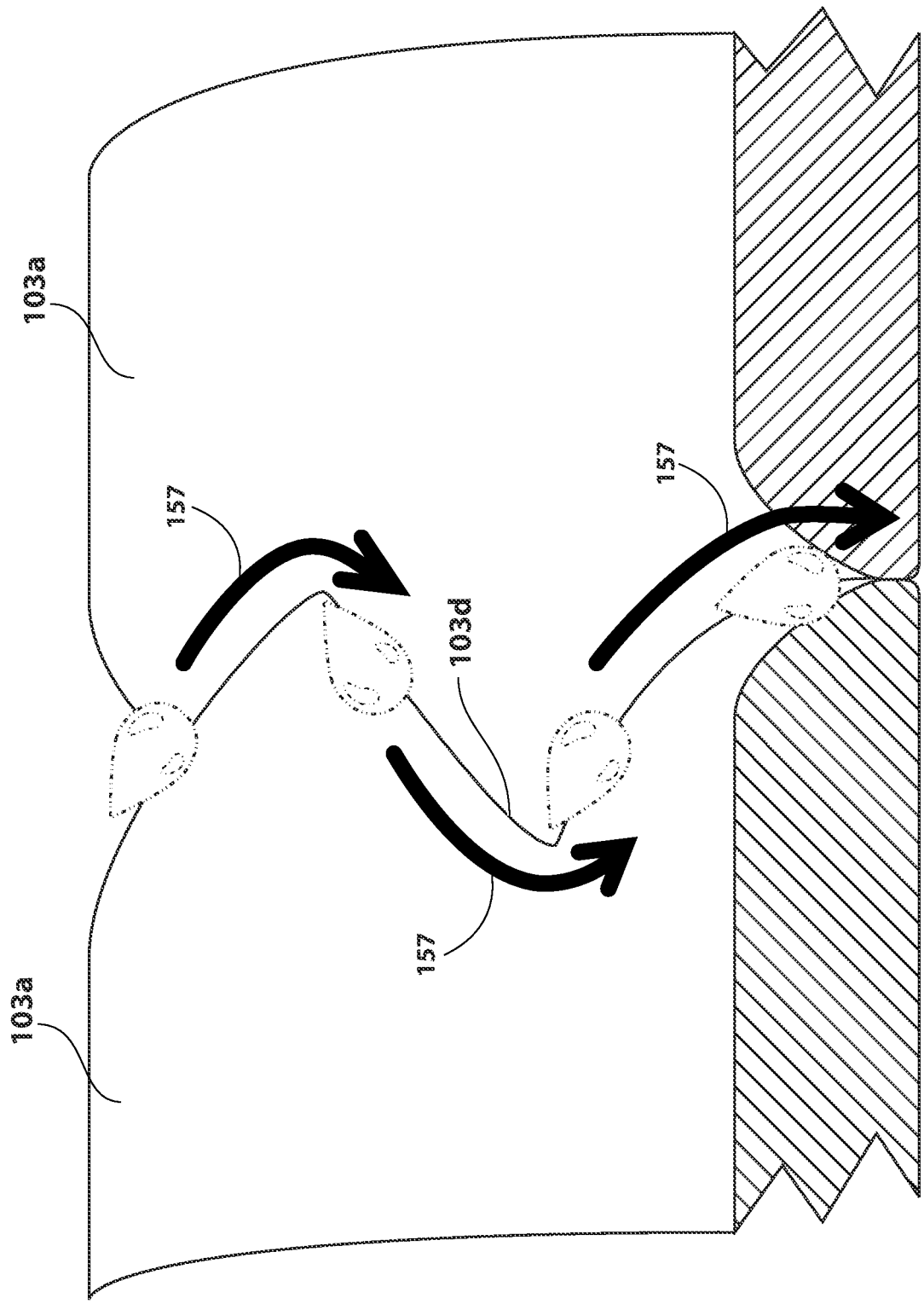
Figure 1D:
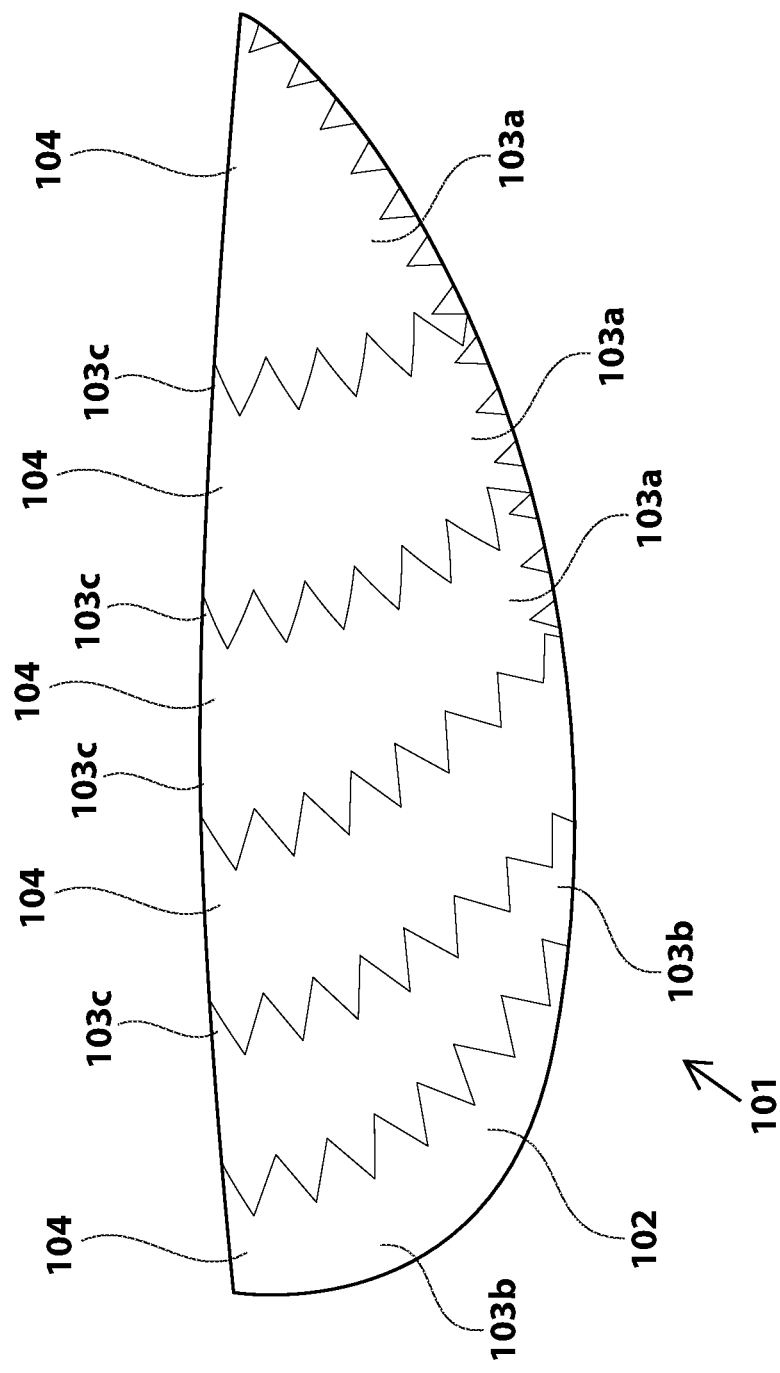
Figure 1F:
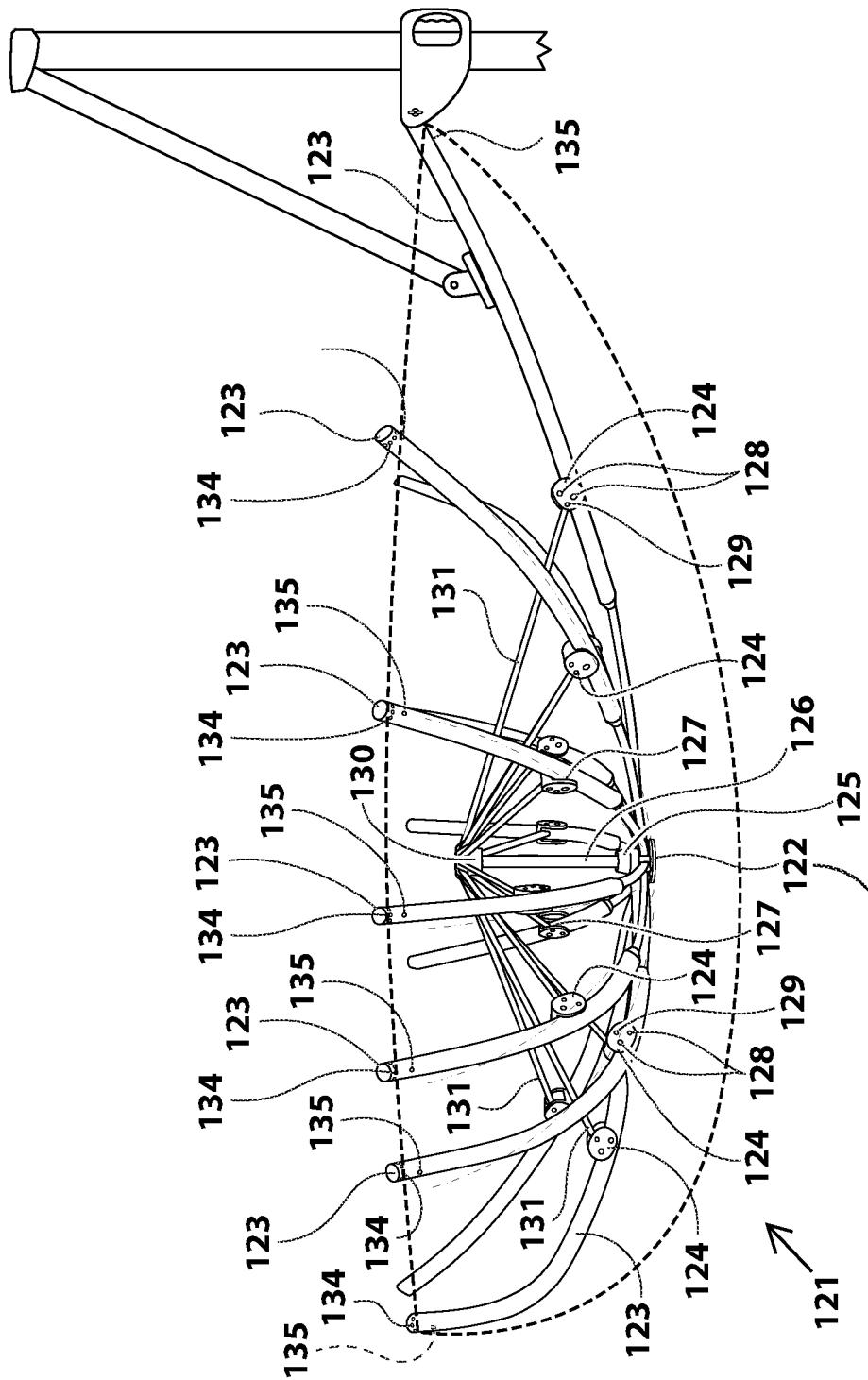
Figure 1G:
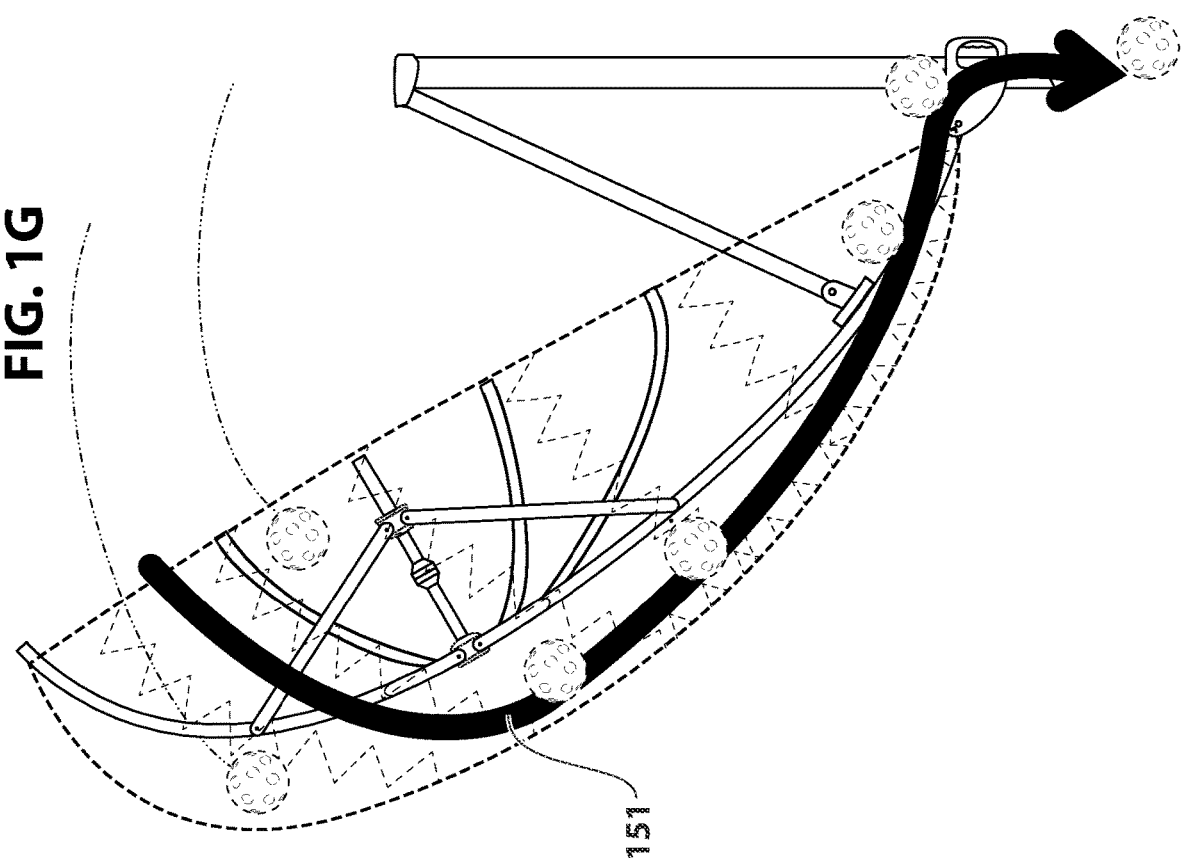
Figure 1H:
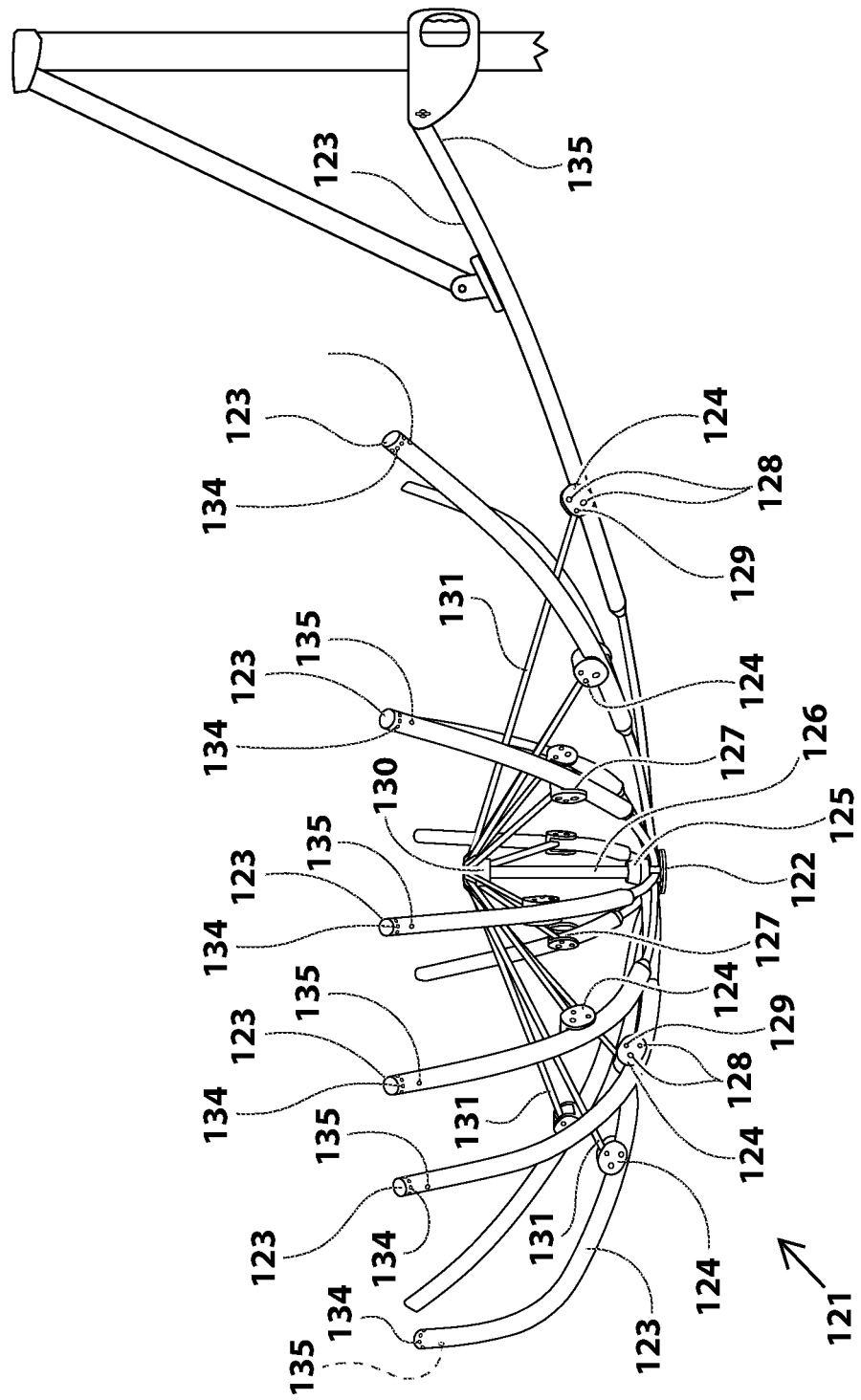
Figure 1I:
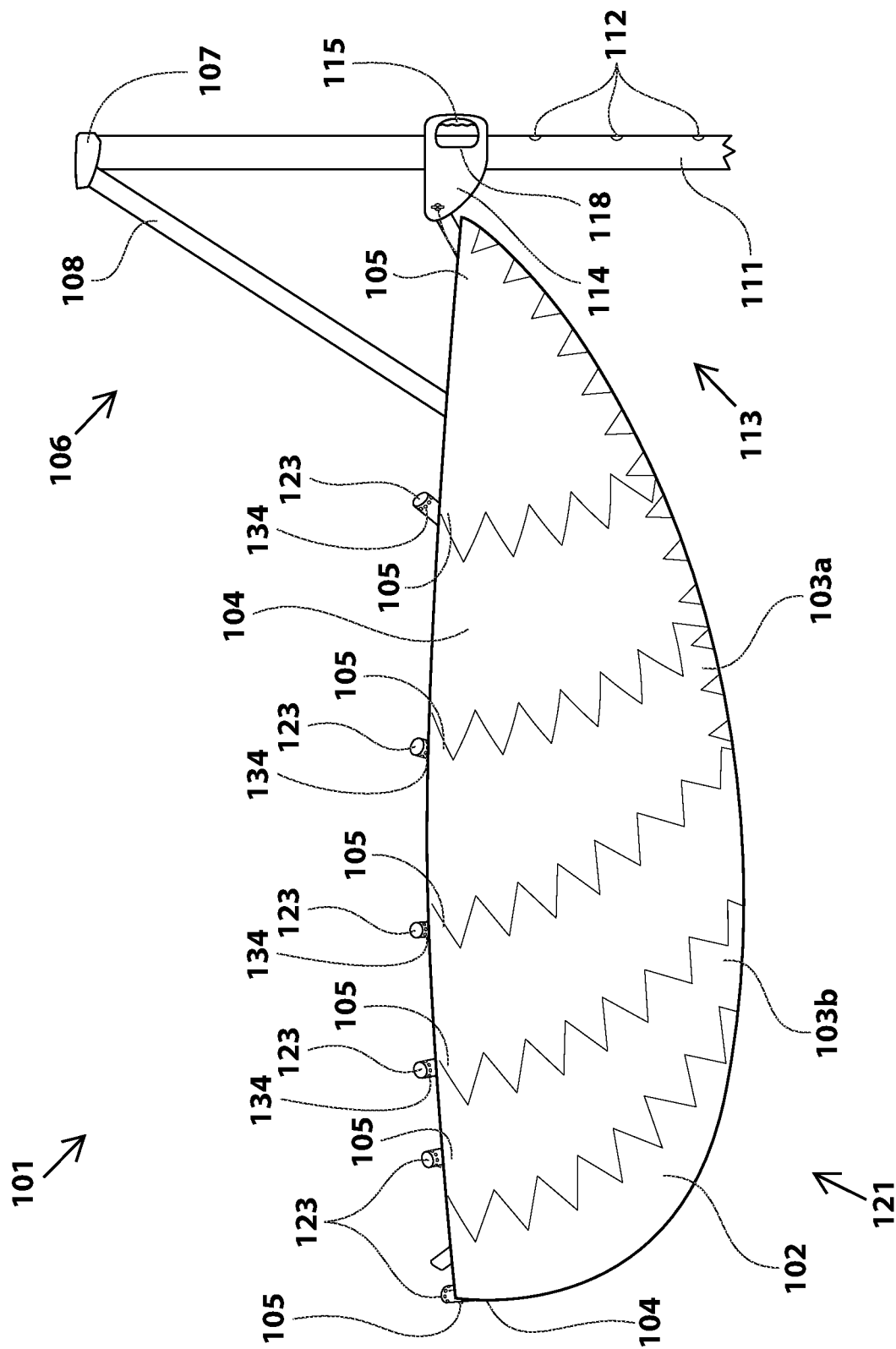
Figure 2A:
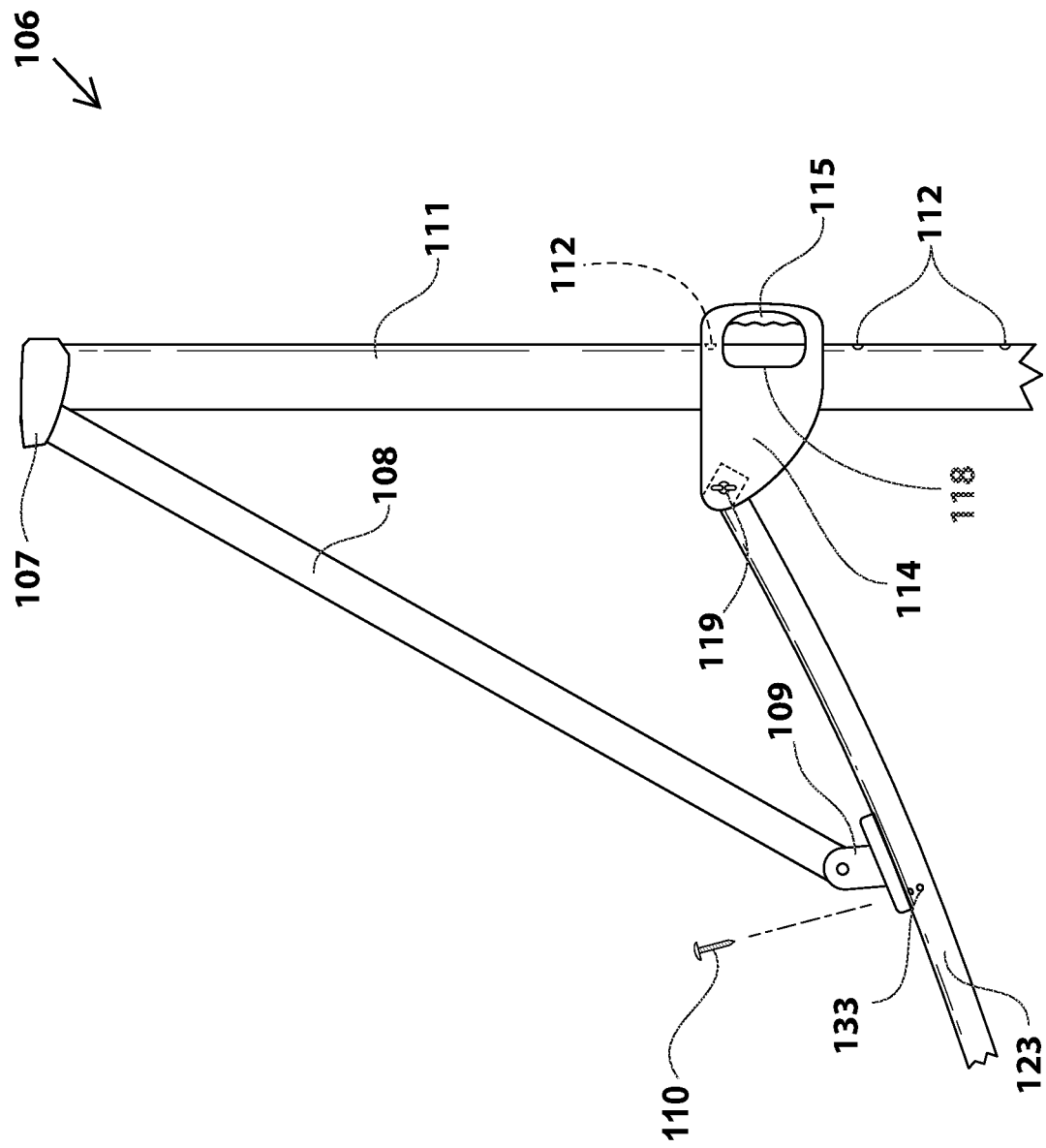
FIG. 2A and FIG. 2B illustrate partial views of the multi-height-adjustable and spline-supporting stanchion system 106, respectively.
Figure 2B:
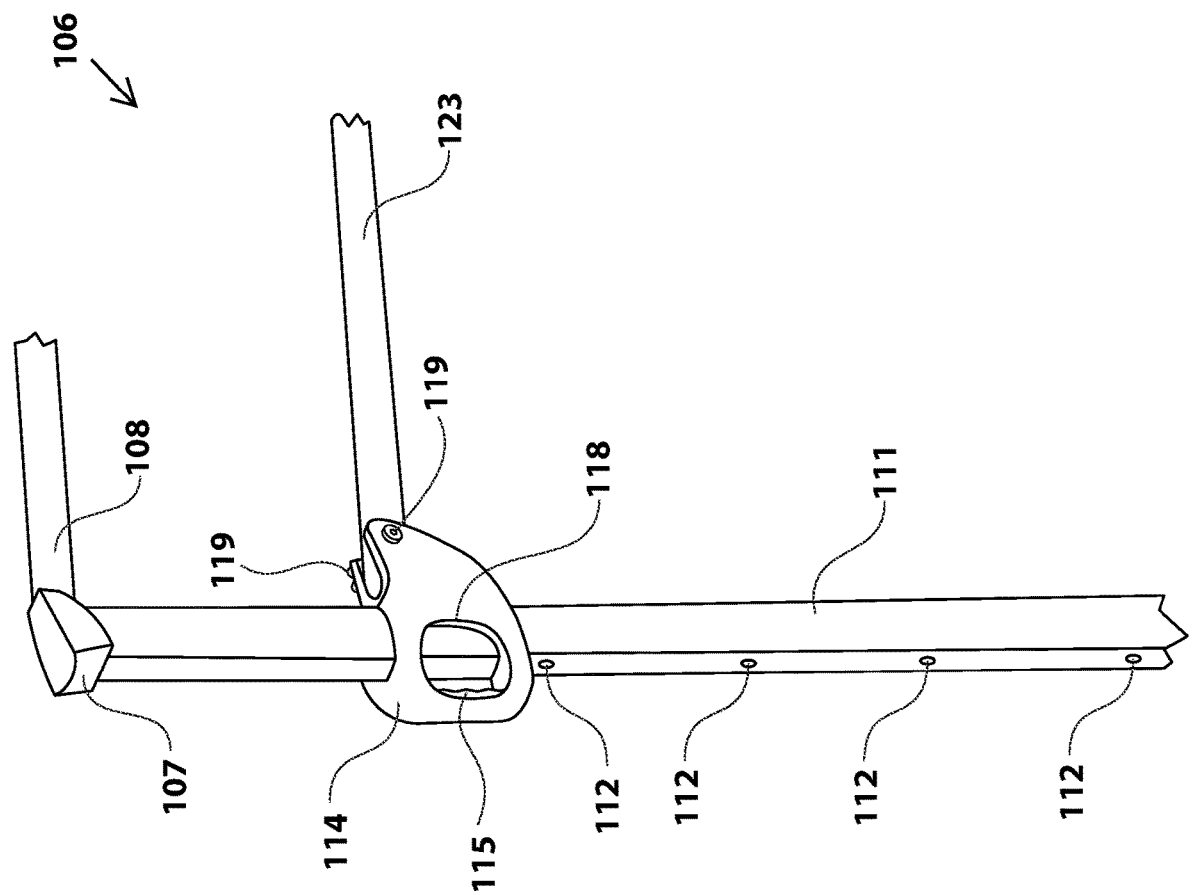
Figure 3A:
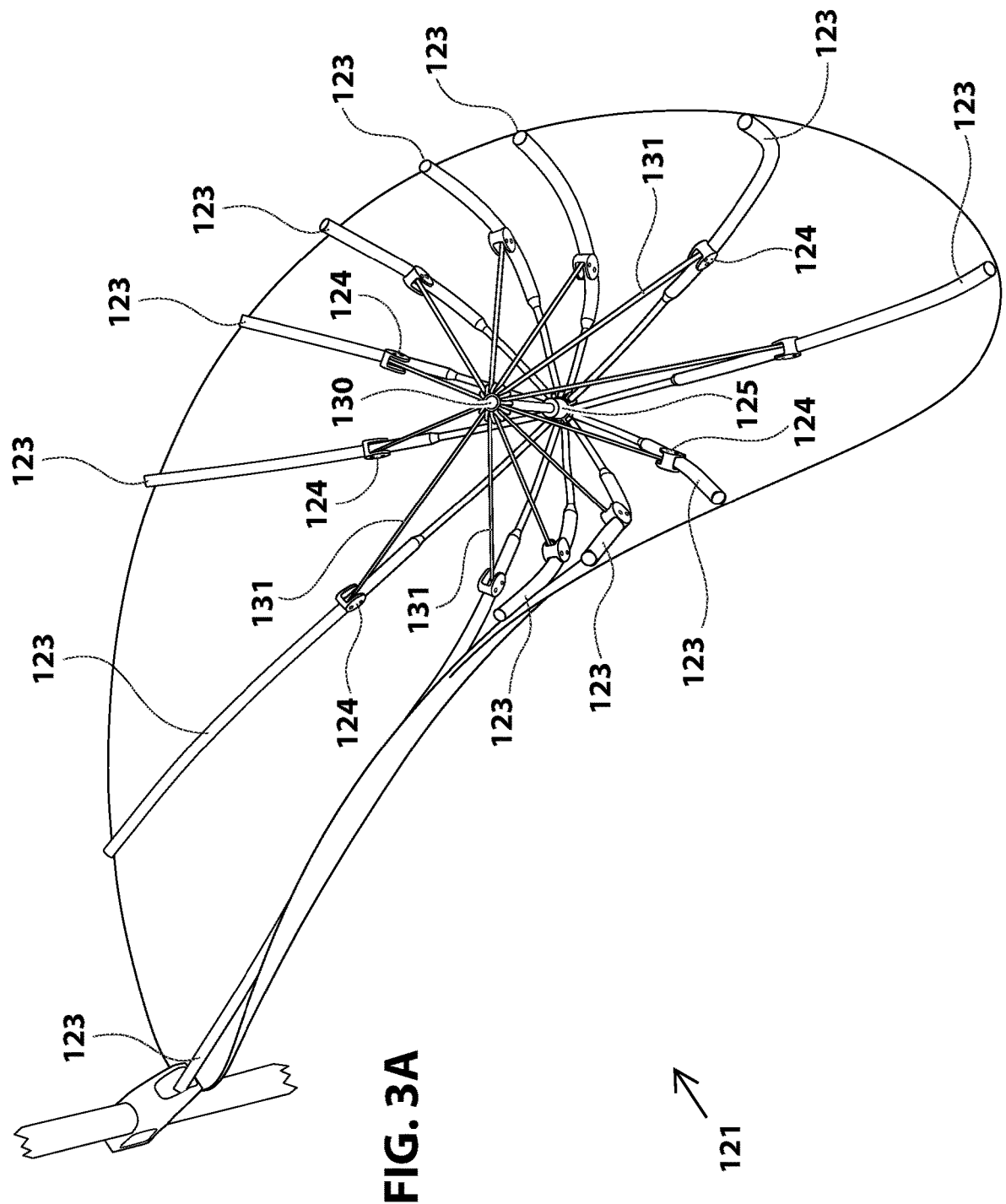
FIG. 3A and FIG. 3B illustrate bottom perspective views of the three-hundred-and-sixty-degree-orientational interchangeable-spline system 121, respectively.
Figure 3B:
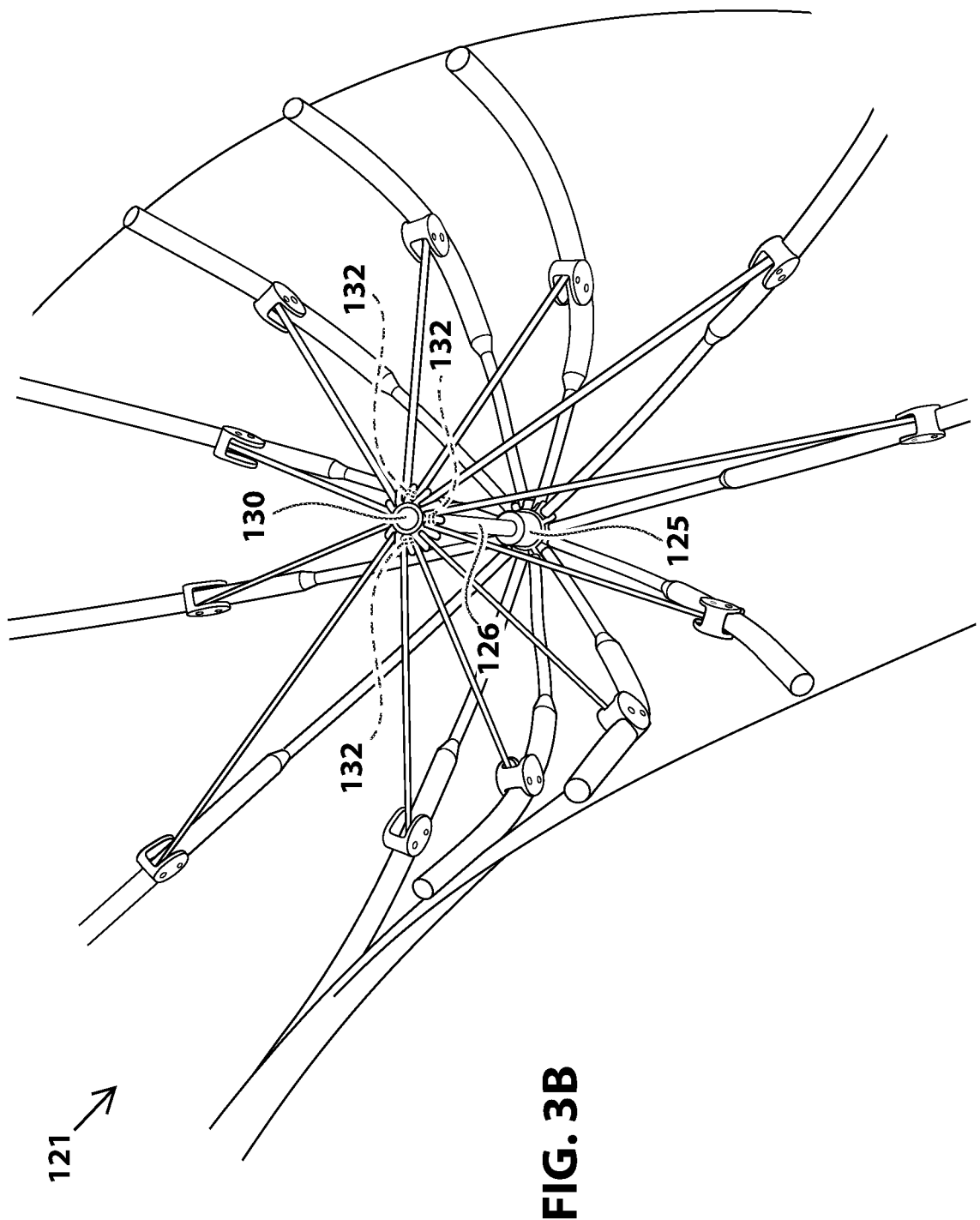
Figure 4B:
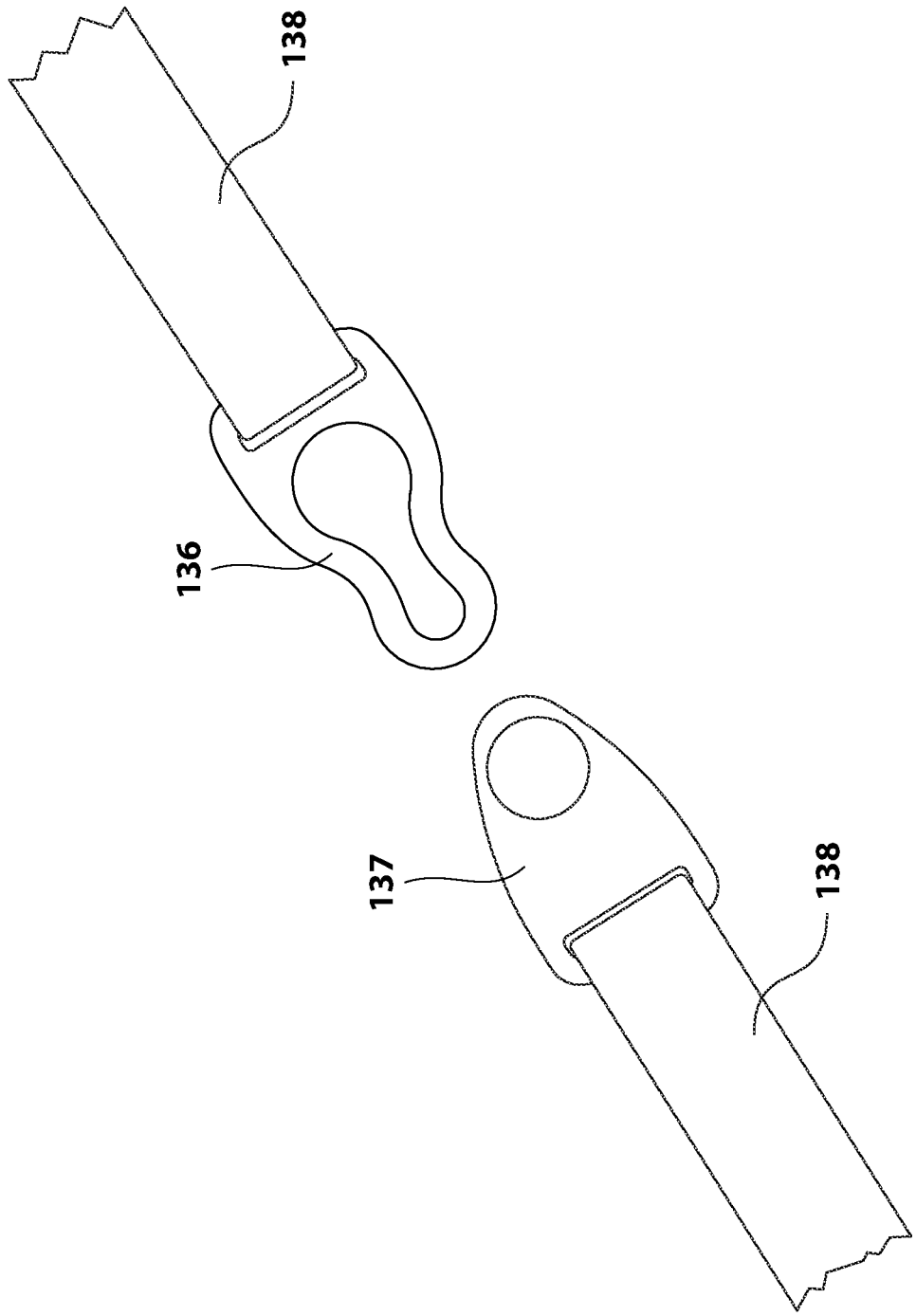
Figure 5:
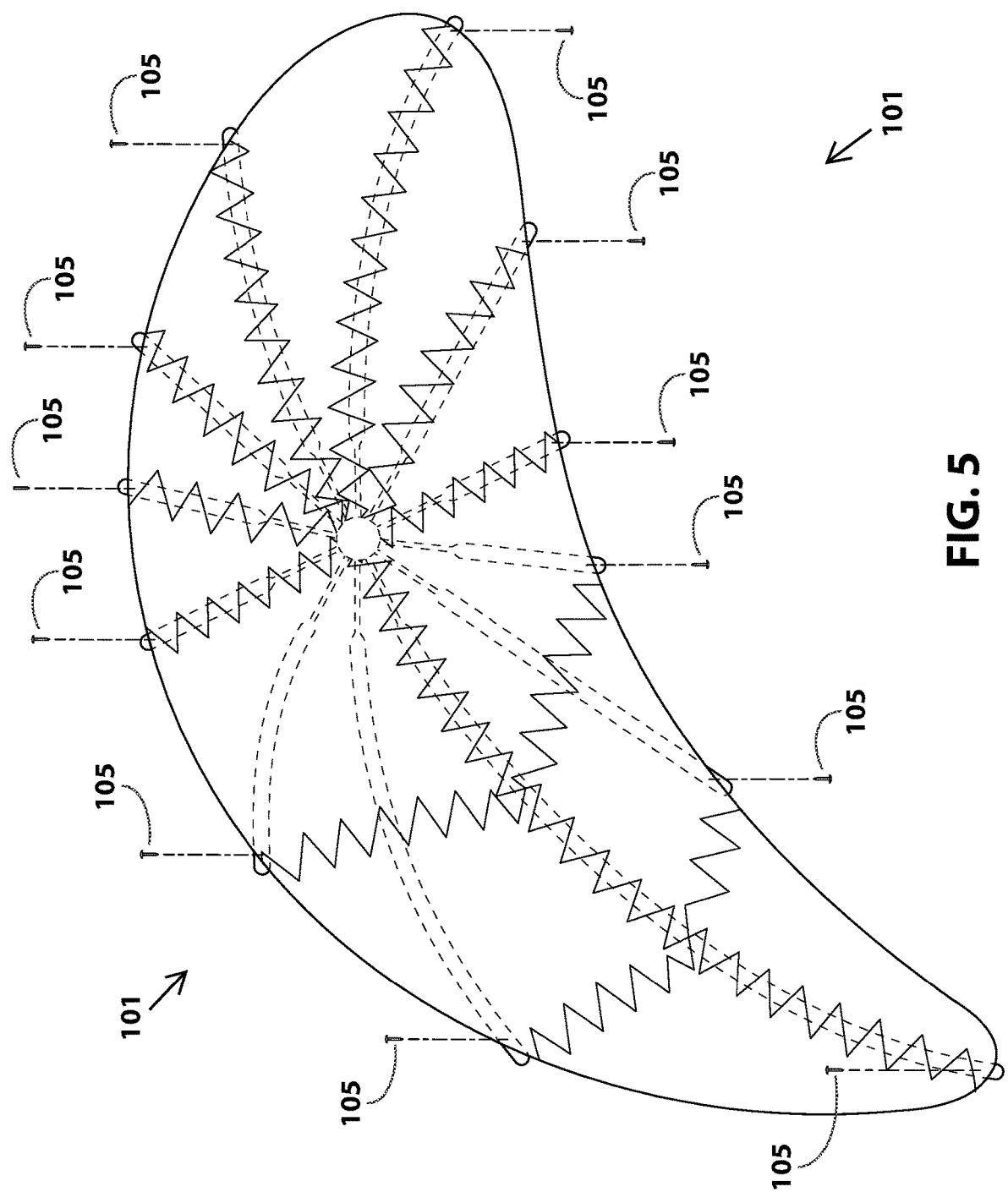
FIG. 5, FIG. 6, FIG. 7A, FIG. 7B, and FIG. 7C illustrate top views and a side exploded view of the three-hundred-and-sixty-degree-orientational spline-interchangeable carapace system 101, and the mounting thereof to three-hundred-and-sixty-degree-orientational interchangeable-spline system 121, respectively.

The five-device-in-one multi-function multi-orientation interchangeable reversible cantilever-stanchion carapace system comprises:
1) Three-hundred-and-sixty-degree-orientational spline-interchangeable carapace system,
2) Multi-height-adjustable and spline-supporting stanchion system,
3) Carapace-sliding-and-tilting multi-orienting snap-locking handle system, and
4) Multi-orientation interchangeable-spline system.

Component
Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 2C, FIG. 2D, FIG. 3A, FIG. 3B, FIG. 4A, FIG. 4A, FIG. 4B, FIG. 5, FIG. 6, FIG. 7A, FIG. 7B, and FIG. 7C, the five-device-in-one multi-function multi-orientation interchangeable reversible cantilever-stanchion carapace system comprises:
1) Three-hundred-and-sixty-degree-orientational spline-interchangeable carapace system 101 comprising (or each comprising):
2) Three-hundred-and-sixty-degree-orientational-spline-interchangeable carapace 102,
3) At least one first three-dimensional-contour-conforming carapace dome panel 103a,
    At least one second three-dimensional-contour-conforming carapace dome panel 103b,
    At least one water-directing ball-directing fruit-directing dome-bisecting transverse seam 103c,
    At least one water-directing-and-ejecting ball-directing-and-ejecting fruit-directing-and-ejecting cross-cutting seam 103d,
4) Perimeter-contour-conforming carapace edge 104, and
5) Carapace-perimeter-securing screws 105;
6) Multi-height-adjustable and spline-supporting stanchion system 106 comprising (or each comprising):
7) Carapace-supporting-arm intersector 107,
8) Carapace-supporting-arm 108,
9) Multi-orientation-spline-supporting hanger 109,
10) Multi-orientation-spline-supporting-hanger screw and hole 110,
11) Multi-height-adjustable carapace stanchion 111, and
12) Multi-height-adjustable carapace stanchion holes 112;
13) Carapace-sliding-and-tilting multi-orienting snap-locking handle system 113 comprising (or each comprising):
14) Carapace-tilting-and-multi-orienting snap-locking handle 114,
15) Snap-locking trigger 115,
16) Snap-locking-trigger pin 116,
17) Snap-locking-trigger spring 117,
18) Hand-grip opening 118,
19) Multi-orientational-spline screw and wing-nut 119, and
20) Multi-orientational-spline holes 120; and
21) Three-hundred-and-sixty-degree-orientational interchangeable-spline system 121
comprising (or each comprising):
22) Crown disk 122,
23) Interchangeable splines 123,
24) Spline-rib hinging intersectors 124,
25) Upper hub 125,
26) Center-support tube 126
27) Spline-intersector channels 127
28) Intersector-to-spline screws and holes 128
29) Intersector-to-supporting-rib screws and holes 129
30) Shuttle hub 130,
31) Spline-actuating-and-supporting ribs 131,
32) Hub screws 132,
33) Multi-spline-interchangeable-hanger-attachment holes 133,
34) Multi-orientational-spline-attachment holes 134,
35) Carapace-perimeter-securing-screw holes 135,
36) Slide-lock buckle eyelet 136,
37) Slide-lock buckle button 137, and
38) Storage strap 138.

Material
Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 2C, FIG. 2D, FIG. 3A, FIG. 3B, FIG. 4A, FIG. 4A, FIG. 4B, FIG. 5, FIG. 6, FIG. 7A, FIG. 7B, and FIG. 7C:
1) Three-hundred-and-sixty-degree-orientational spline-interchangeable carapace system 101 is (or are each) made of the combined materials of its components.
2) Three-hundred-and-sixty-degree-orientational-spline-interchangeable carapace 102
    is (or are each) made of fabric.
3) At least one first three-dimensional-contour-conforming carapace dome panel 103a is (or are each) made of fabric.
    At least one second three-dimensional-contour-conforming carapace dome panel 103b is (or are each) made of fabric.
    At least one water-directing ball-directing fruit-directing dome-bisecting transverse seam 103c
        is (or are each) made of being sewn between at least one first and at least one second three-dimensional contour-conforming carapace dome panels 103a and 103b.
    At least one water-directing-and-ejecting ball-directing-and-ejecting fruit-directing-and-ejecting cross-cutting seam 103d
        is (or are each) made of being sewn at least one first three-dimensional contour-conforming carapace dome panel 103a.
4) Perimeter-contour-conforming carapace edge 104
    is (or are each) made of a stronger fabric than the at least one first three-dimensional-contour-conforming carapace dome panel 103a and at least one second three-dimensional-contour-conforming carapace dome panel 103b.
5) Carapace-perimeter-securing screws 105
    is (or are each) made of metal.
6) Multi-height-adjustable and spline-supporting stanchion system 106 is (or are each) made of the combined materials of its components.
7) Carapace-supporting-arm intersector 107
    is (or are each) made of metal.
8) Carapace-supporting-arm 108
    is (or are each) made of metal.
9) Multi-orientation-spline-supporting hanger 109
    is (or are each) made of metal.
10) Multi-orientation-spline-supporting-hanger screw and hole 110
    is (or are each) made of metal and empty space, respectively.
11) Multi-height-adjustable carapace stanchion 111
    is (or are each) made of metal.
12) Multi-height-adjustable carapace stanchion holes 112
    is (or are each) made of empty space.
13) Carapace-sliding-and-tilting multi-orienting snap-locking handle system 113
    is (or are each) made of the combined materials of its components.
14) Carapace-tilting-and-multi-orienting snap-locking handle 114
    is (or are each) made of metal.
15) Snap-locking trigger 115
    is (or are each) made of metal.
16) Snap-locking-trigger pin 116
    is (or are each) made of metal.
17) Snap-locking-trigger spring 117
    is (or are each) made of metal.

18) Hand-grip opening 118
   is (or are each) made of empty space.
19) Multi-orientational-spline screw and wing-nut 119
   is (or are each) made of metal.
20) Multi-orientational-spline holes 120
   is (or are each) made of empty space.
21) Three-hundred-and-sixty-degree-orientational interchangeable-spline system 121 is (or are each) made of the combined materials of its components.
22) Crown disk 122
   is (or are each) made of plastic or metal
23) Interchangeable splines 123
   is (or are each) made of metal.
24) Spline-rib hinging intersectors 124
   is (or are each) made of plastic and/or metal.
25) Upper hub 125
   is (or are each) made of plastic and/or metal.
26) Center-support tube 126
   is (or are each) made of plastic and/or metal.
27) Spline-intersector channels 127
   is (or are each) made of empty space.
28) Intersector-to-spline screws and holes 128
   is (or are each) made of metal, and empty space, respectively.
29) Intersector-to-supporting-rib screws and holes 129
   is (or are each) made of metal, and empty space, respectively.
30) Shuttle hub 130
   is (or are each) made of plastic and/or metal.
31) Spline-actuating-and-supporting ribs 131
   is (or are each) made of metal.
32) Hub screws 132
   is (or are each) made of metal.
33) Multi-spline-interchangeable-hanger-attachment holes 133
   is (or are each) made of empty space.
34) Multi-orientational-spline-attachment holes 134
   is (or are each) made of empty space.
35) Carapace-perimeter-securing-screw holes 135
   is (or are each) made of empty space.
36) Slide-lock buckle eyelet 136
   is (or are each) made of plastic.
37) Slide-lock buckle button 137
   is (or are each) made of plastic.
38) Storage strap 138
   is (or are each) made of webbing, the equivalent, or other fabric.

Shape

Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 2C, FIG. 2D, FIG. 3A, FIG. 3B, FIG. 4A, FIG. 4A, FIG. 4B, FIG. 5, FIG. 6, FIG. 7A, FIG. 7B, and FIG. 7C:

1) Three-hundred-and-sixty-degree-orientational spline-interchangeable carapace system 101 is (or are each) formed into the combined shapes of its components.
2) Three-hundred-and-sixty-degree-orientational-spline-interchangeable carapace 102
   is (or are each) formed into a concave kidney shape.
3) At least one first three-dimensional-contour-conforming carapace dome panel 103*a* is (or are each) formed into a half-concave shape.
   At least one second three-dimensional-contour-conforming carapace dome panel 103*b* is (or are each) formed into a half-concave shape.
   At least one water-directing ball-directing fruit-directing dome-bisecting transverse seam 103*c*
      is (or are each) formed into a zig-zag shape.
   At least one water-directing-and-ejecting ball-directing-and-ejecting fruit-directing-and-ejecting cross-cutting seam 103*d*
      is (or are each) formed into a zig-zag shape.
4) Perimeter-contour-conforming carapace edge 104
   is (or are each) formed into a kidney shape.
5) Carapace-perimeter-securing screws 105
   is (or are each) formed into a screw shape.
6) Multi-height-adjustable and spline-supporting stanchion system 106 is (or are each) formed into the combined shapes of its components.
7) Carapace-supporting-arm intersector 107
   is (or are each) formed into a tube shape.
8) Carapace-supporting-arm 108
   is (or are each) formed into a tube shape.
9) Multi-orientation-spline-supporting hanger 109
   is (or are each) formed into a tubular upper shape with a rectangular base.
10) Multi-orientation-spline-supporting-hanger screw and hole 110
   is (or are each) formed into a screw shape, and a circular shape, respectively.
11) Multi-height-adjustable carapace stanchion 111
   is (or are each) formed into a tube shape.
12) Multi-height-adjustable carapace stanchion holes 112
   is (or are each) formed into a circular shape.
13) Carapace-sliding-and-tilting multi-orienting snap-locking handle system 113 is (or are each) formed into the combined shapes of its components.
14) Carapace-tilting-and-multi-orienting snap-locking handle 114
   is (or are each) formed into a rounded rectangle with a rectangular hole at one end.
15) Snap-locking trigger 115
   is (or are each) formed into an elongated block with a finger-conforming wavy edge.
16) Snap-locking-trigger pin 116 is (or are each) formed into a cylindrical shape.
17) Snap-locking-trigger spring 117
   is (or are each) formed into a spring shape.
18) Hand-grip opening 118
   is (or are each) formed into an oval shape.
19) Multi-orientational-spline screw and wing-nut 119
   is (or are each) formed into a screw shape, and a wing-nut shape, respectively.
20) Multi-orientational-spline holes 120
   is (or are each) formed into a circular shape.
21) Three-hundred-and-sixty-degree-orientational interchangeable-spline system 121 is (or are each) formed into the combined shapes of its components.
22) Crown disk 122
   is (or are each) formed into a disk shape.
23) Interchangeable splines 123
   is (or are each) formed into a curved tube shape.
24) Spline-rib hinging intersectors 124
   is (or are each) formed into a rounded-rectangular shape with a U shaped cross-section.
25) Upper hub 125
   is (or are each) formed into a circular shape with multi-notched outer perimeter.
26) Center-support tube 126
   is (or are each) formed into a tube shape.
27) Spline-intersector channels 127
   is (or are each) formed into a recessed channel.
28) Intersector-to-spline screws and holes 128
   is (or are each) formed into a screw shape, and a circular shape, respectively.

29) Intersector-to-supporting-rib screws and holes 129
is (or are each) formed into a screw shape, and a circular shape, respectively.
30) Shuttle hub 130
is (or are each) formed into a circular shape with multi-notched outer perimeter.
31) Spline-actuating-and-supporting ribs 131
is (or are each) formed into a tube shape with an oval cross-section.
32) Hub screws 132
is (or are each) formed into a screw shape.
33) Multi-spline-interchangeable-hanger-attachment holes 133
is (or are each) formed into a circular shape.
34) Multi-orientational-spline-attachment holes 134
is (or are each) formed into a circular shape.
35) Carapace-perimeter-securing-screw holes 135
is (or are each) formed into a circular shape.
36) Slide-lock buckle eyelet 136
is (or are each) formed into a figure eight shape.
37) Slide-lock buckle button 137
is (or are each) formed into a button shape.
38) Storage strap 138
is (or are each) formed into a strap shape.

Connection

Referring to FIG. 1A, FIG. 1B, FIG. 1C, FIG. 1D, FIG. 1E, FIG. 1F, FIG. 1G, FIG. 1H, FIG. 1I, FIG. 2A, FIG. 2B, FIG. 2C, FIG. 2D, FIG. 3A, FIG. 3B, FIG. 4A, FIG. 4A, FIG. 4B, FIG. 5, FIG. 6, FIG. 7A, FIG. 7B, and FIG. 7C:

1) Three-hundred-and-sixty-degree-orientational spline-interchangeable carapace system 101 is (or are respectively) connected by the combined connections of its components.
2) Three-hundred-and-sixty-degree-orientational-spline-interchangeable carapace 102 is (or are respectively)
is (or are respectively) manufactured from at least one piece of material sewn together and stretched over three-hundred-and-sixty-degree-orientational interchangeable-spline system 121.
3) At least one first three-dimensional-contour-conforming carapace dome panel 103a is (or are respectively) manufactured from at least one piece of material sewn to at least one second three-dimensional-contour-conforming carapace dome panel 103b and stretched over three-hundred-and-sixty-degree-orientational interchangeable-spline system 121.
At least one second three-dimensional-contour-conforming carapace dome panel 103b is (or are respectively) manufactured from at least one piece of material sewn to at least one first three-dimensional-contour-conforming carapace dome panel 103a and stretched over three-hundred-and-sixty-degree-orientational interchangeable-spline system 121.
At least one water-directing ball-directing fruit-directing dome-bisecting transverse seam 103c
is (or are each) sewn between at least one first three-dimensional-contour-conforming carapace dome panel 103a and at least one second three-dimensional-contour-conforming carapace dome panel 103b.
At least one water-directing-and-ejecting ball-directing-and-ejecting fruit-directing-and-ejecting cross-cutting seam 103d
is (or are each) sewn into at least one first three-dimensional-contour-conforming carapace dome panel 103a.
4) Perimeter-contour-conforming carapace edge 104
is (or are respectively) molded to three-hundred-and-sixty-degree-orientational-spline-interchangeable carapace 102.
5) Carapace-perimeter-securing screws 105
is (or are respectively) screwed into carapace-perimeter-securing-screw holes 135.
6) Multi-height-adjustable and spline-supporting stanchion system 106 is (or are respectively) connected by the combined connections of its components.
7) Carapace-supporting-arm intersector 107
is (or are respectively) screwed atop multi-height-adjustable carapace stanchion 111.
8) Carapace-supporting-arm 108 is (or are respectively) screwed to carapace-supporting-arm intersector 107.
9) Multi-orientation-spline-supporting hanger 109
is (or are respectively) screwed to carapace-supporting-arm 108.
10) Multi-orientation-spline-supporting-hanger screw and hole 110
is (or are respectively) screwed into, and is drilled out of multi-orientation-spline-supporting hanger 109, respectively.
11) Multi-height-adjustable carapace stanchion 111
is (or are respectively) attached to carapace-supporting-arm intersector 107.
12) Multi-height-adjustable carapace stanchion holes 112
is (or are respectively) drilled out of multi-height-adjustable carapace stanchion 111.
13) Carapace-sliding-and-tilting multi-orienting snap-locking handle system 113
is (or are respectively) connected by the combined connections of its components.
14) Carapace-tilting-and-multi-orienting snap-locking handle 114
is (or are respectively) vertically and lockably slid on multi-height-adjustable carapace stanchion 111.
15) Snap-locking trigger 115
is (or are respectively) movably attached to carapace-tilting-and-multi-orienting snap-locking handle 114.
16) Snap-locking-trigger pin 116
is (or are respectively) is springably attached to carapace-tilting-and-multi-orienting snap-locking handle 114.
17) Snap-locking-trigger spring 117
is (or are respectively) movably associated with, and between carapace-tilting-and-multi-orienting snap-locking handle 114 and snap-locking-trigger pin 116.
18) Hand-grip opening 118
is (or are respectively) formed into carapace-tilting-and-multi-orienting snap-locking handle 114.
19) Multi-orientational-spline screw and wing-nut 119
is (or are respectively) screwed through multi-orientational-spline holes 120.
20) Multi-orientational-spline holes 120
is (or are respectively) drilled out of carapace-tilting-and-multi-orienting snap-locking handle 114.
21) Three-hundred-and-sixty-degree-orientational interchangeable-spline system 121 is (or are respectively) connected by the combined connections of its components.
22) Crown disk 122
is (or are respectively) attached atop upper hub 125.
23) Interchangeable splines 123
is (or are respectively) hingedly attached to upper hub 125 and spline-rib hinging intersectors 124 and spline-actuating-and-supporting ribs 131.

24) Spline-rib hinging intersectors 124
  is (or are respectively) hingedly attached to interchangeable splines 123.
25) Upper hub 125 is (or are respectively)
  is mounted atop center-support tube 126 and hingedly attached to interchangeable splines 123.
26) Center-support tube 126
  is (or are respectively) attached between upper hub 125 and shuttle hub 130.
27) Spline-intersector channels 127
  is (or are respectively) attached below center-support tube 126.
28) Intersector-to-spline screws and holes 128
  is (or are respectively) attached atop intersector-to-supporting-rib screws and holes 129.
29) Intersector-to-supporting-rib screws and holes 129
  is (or are respectively) attached between Intersector-to-spline screws and holes 128 and shuttle hub 130.
30) Shuttle hub 130
  is (or are respectively) attached below intersector-to-supporting-rib screws and holes 129 and hingedly attached to spline-actuating-and-supporting ribs 131.
31) Spline-actuating-and-supporting ribs 131
  is (or are respectively) hingedly attached between spline-rib hinging intersectors 124 and shuttle hub 130, and shuttle hub 130 to spline-actuating-and-supporting ribs 131.
32) Hub screws 132
  is (or are respectively) hingedly secured interchangeable splines 123 to upper hub 125.
33) Multi-spline-interchangeable-hanger-attachment holes 133
  is (or are respectively) drilled through interchangeable splines 123.
34) Multi-orientational-spline-attachment holes 134
  is (or are respectively) drilled through interchangeable splines 123.
35) Carapace-perimeter-securing-screw holes 135
  is (or are respectively) drilled into interchangeable splines 123.
36) Slide-lock buckle eyelet 136
  is (or are each) attached to storage strap 138.
37) Slide-lock buckle button 137
  is (or are each) attached to storage strap 138.
38) Storage strap 138
  is (or are each) attached to slide-lock buckle eyelet 136 and slide-lock buckle button 137.

Function

Figure 13A:
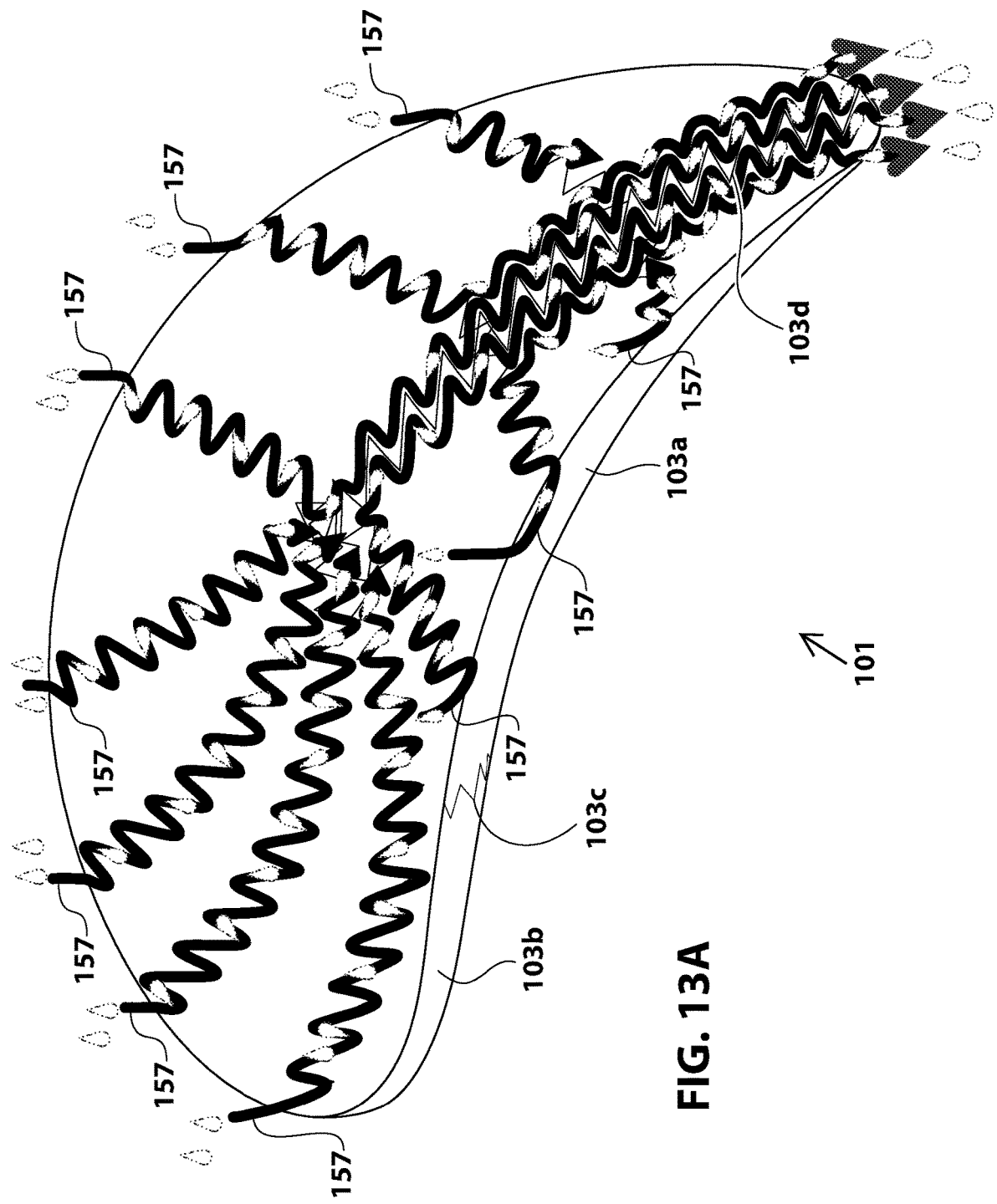
Figure 13B:
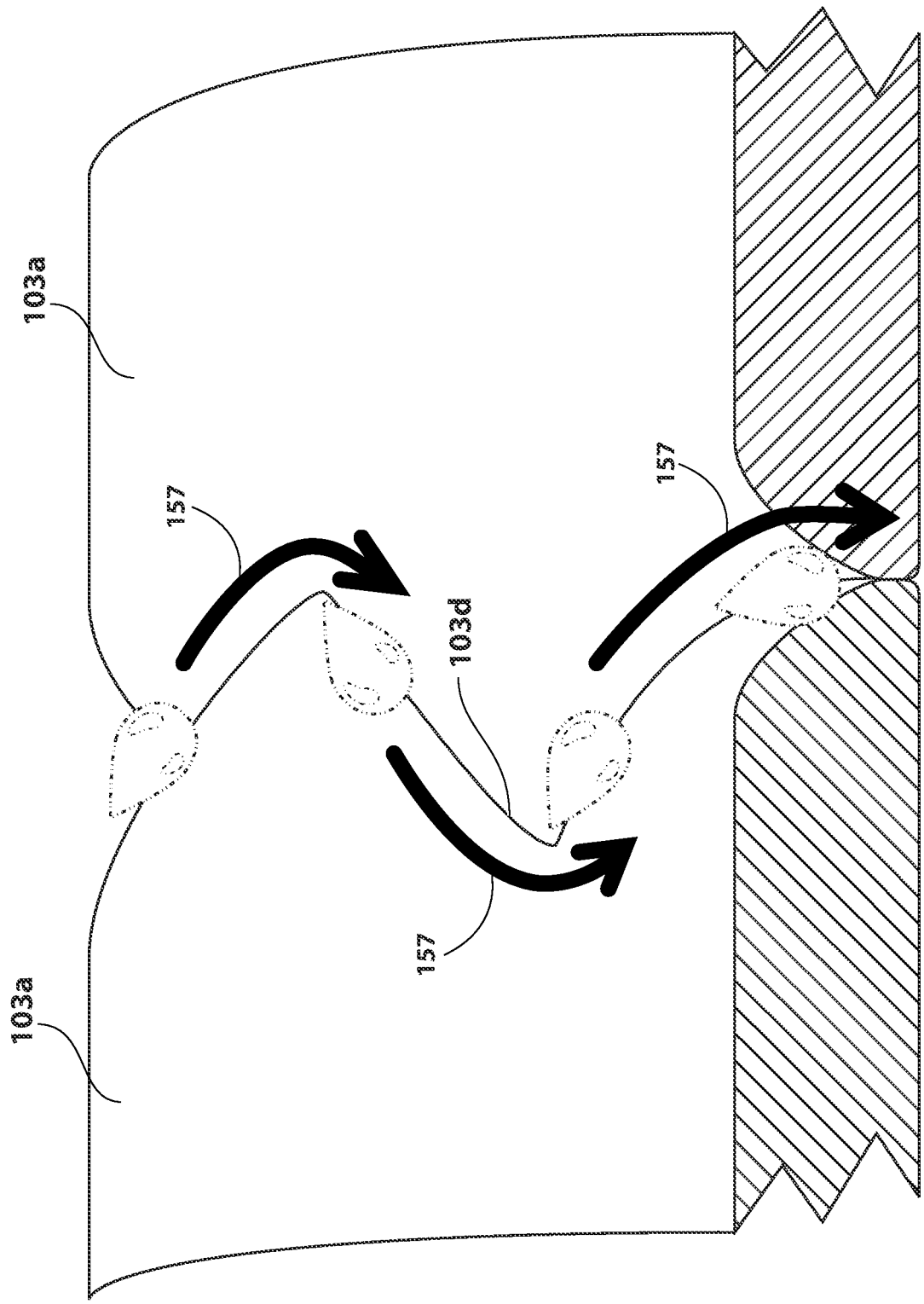
Figure 13C:
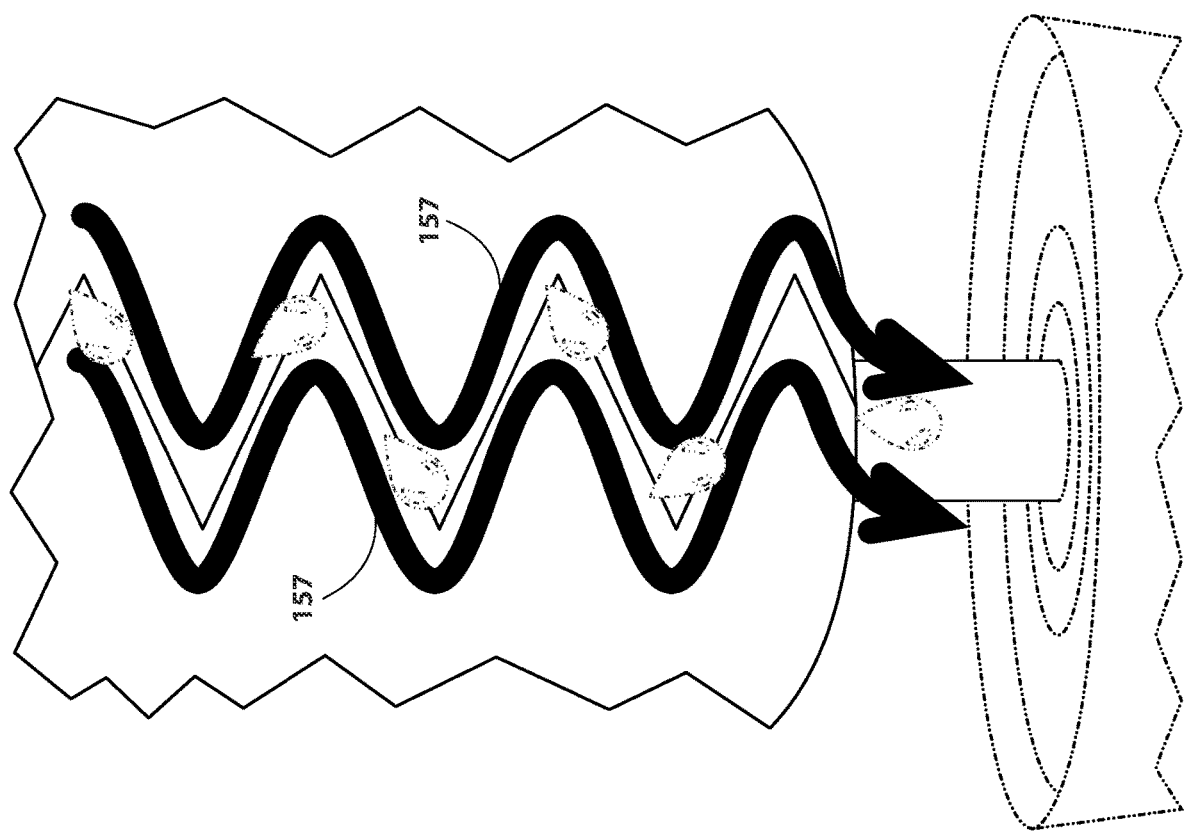
Figure 13E:
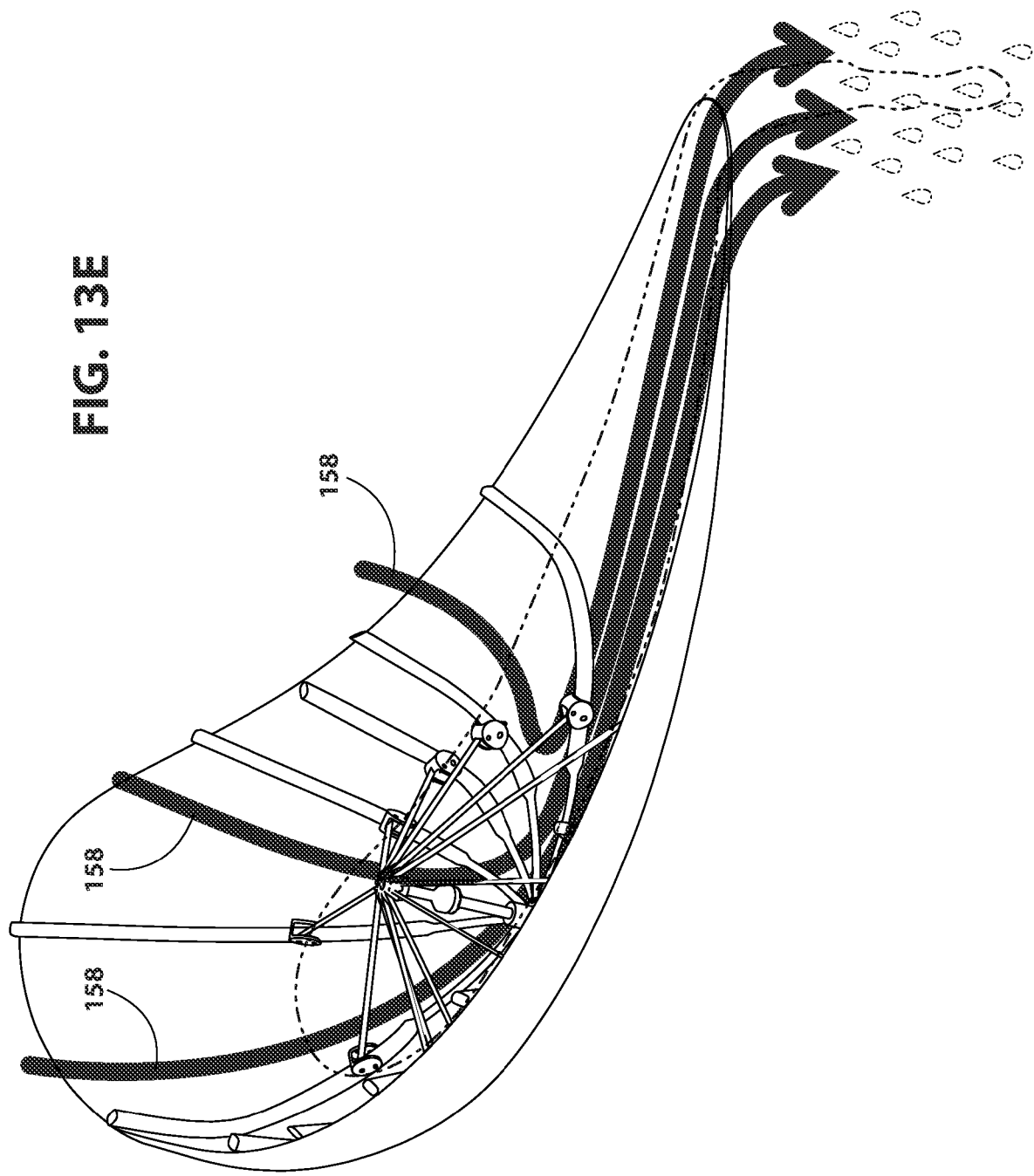
Figure 13F:
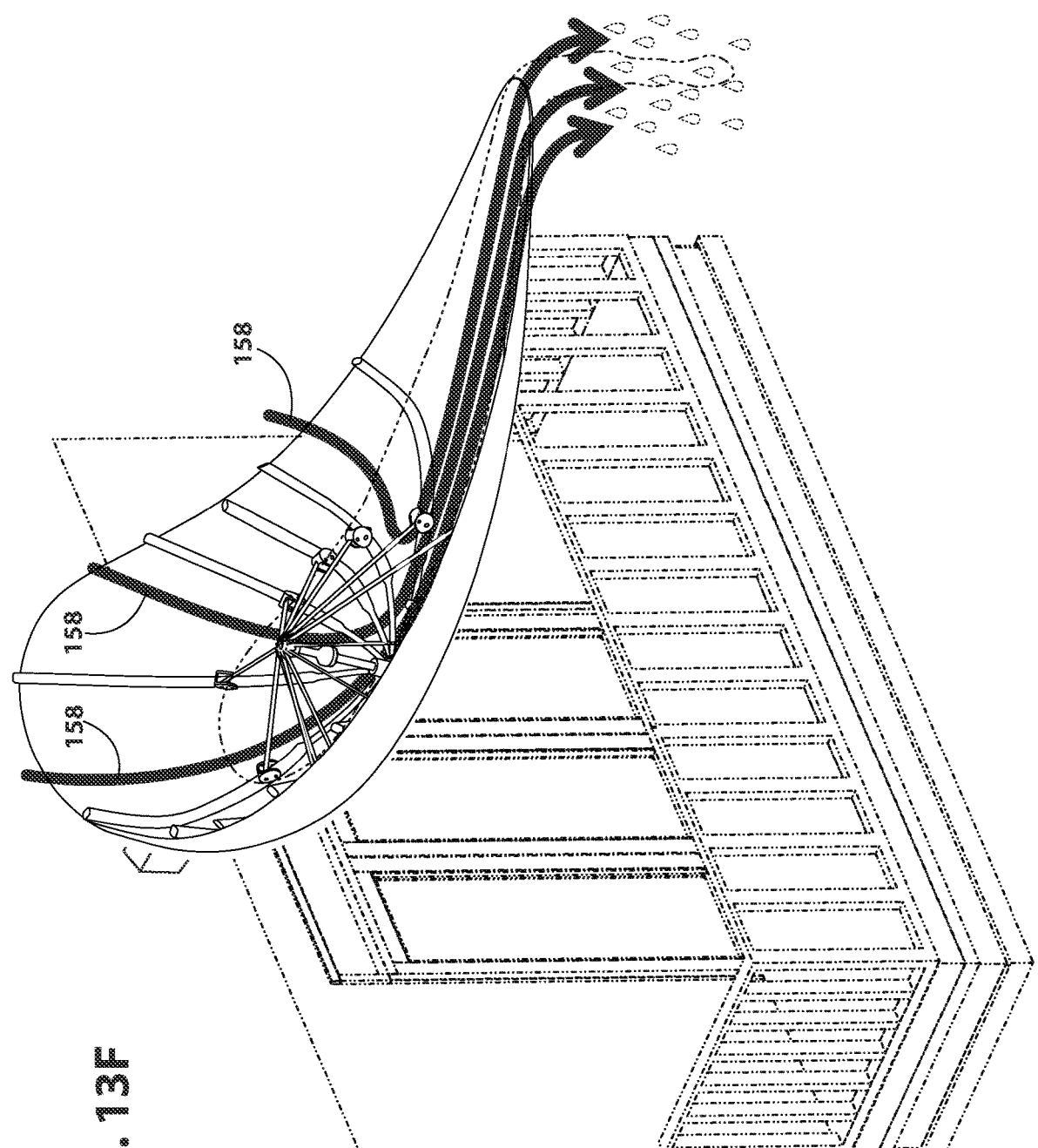
Figure 13G:
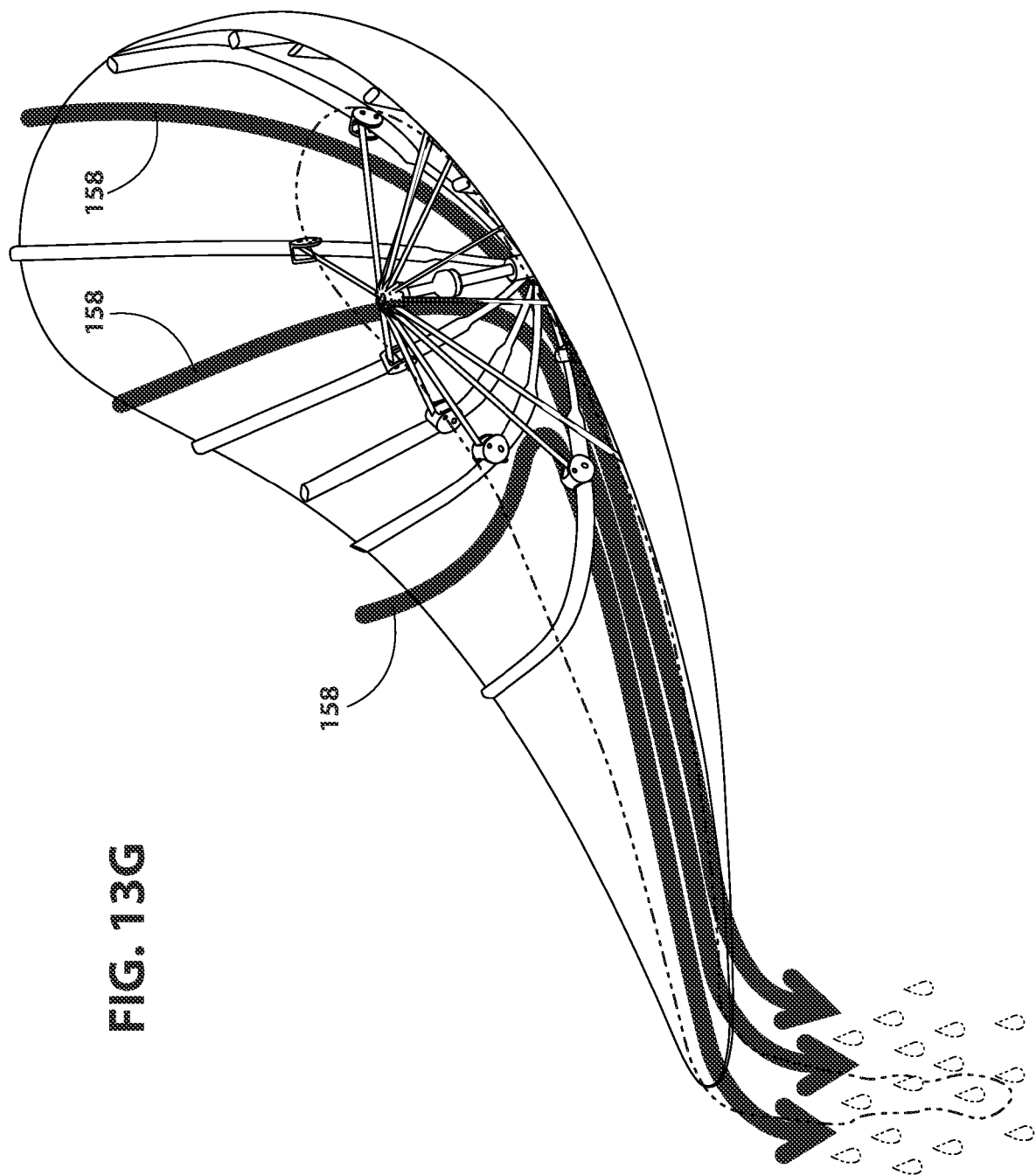
Figure 13H:
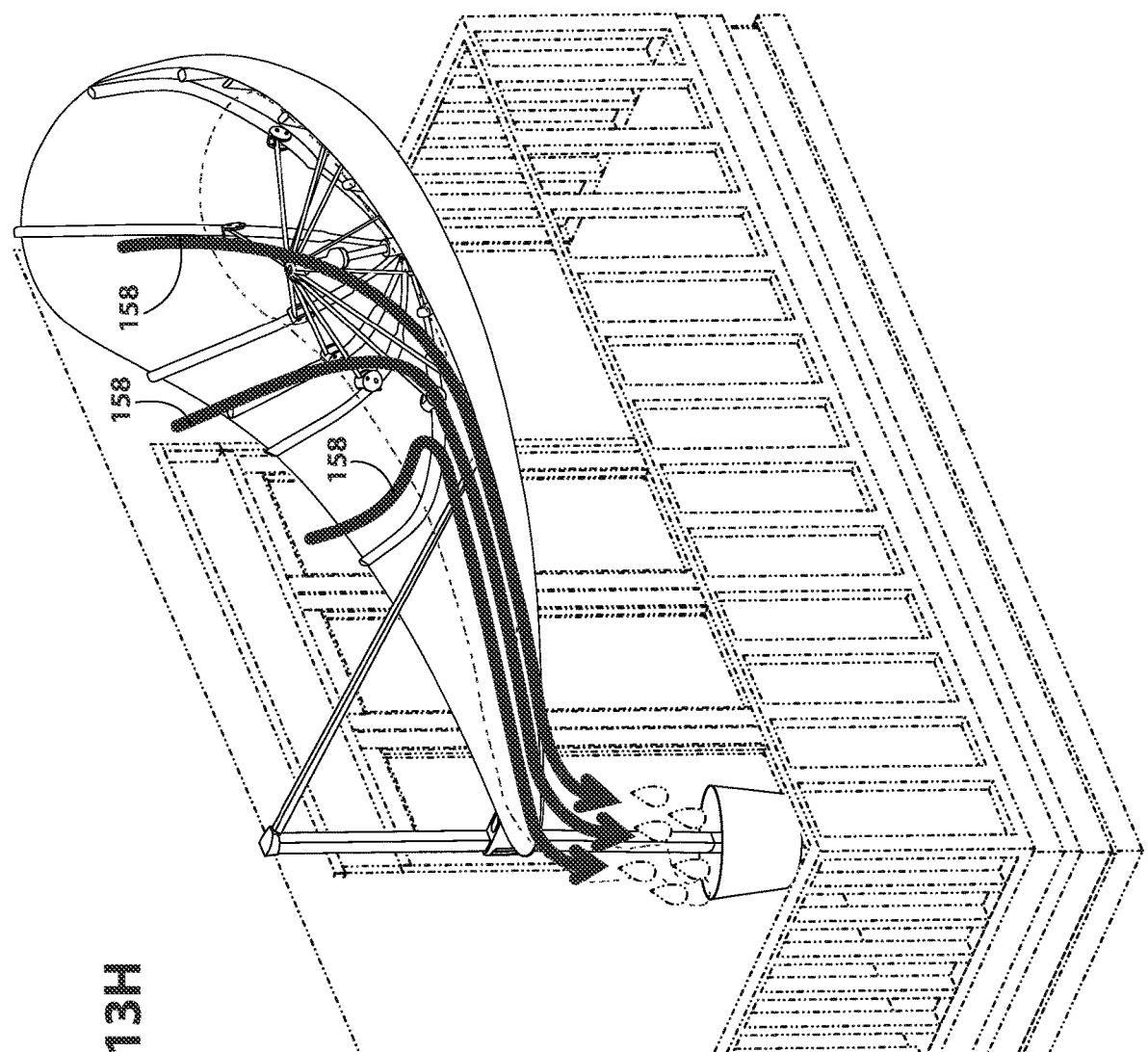
Figure 13I:
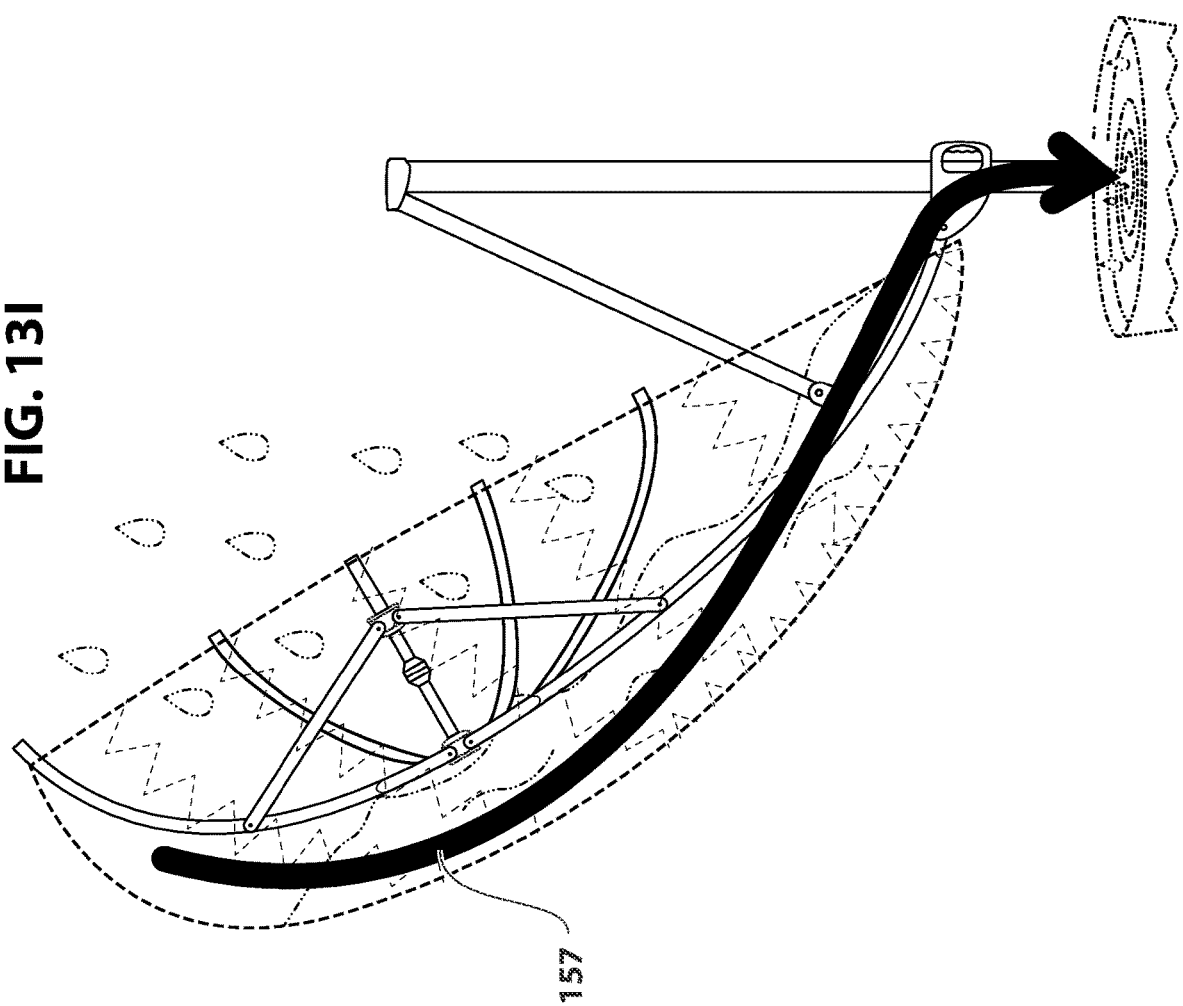
Figure 13J:
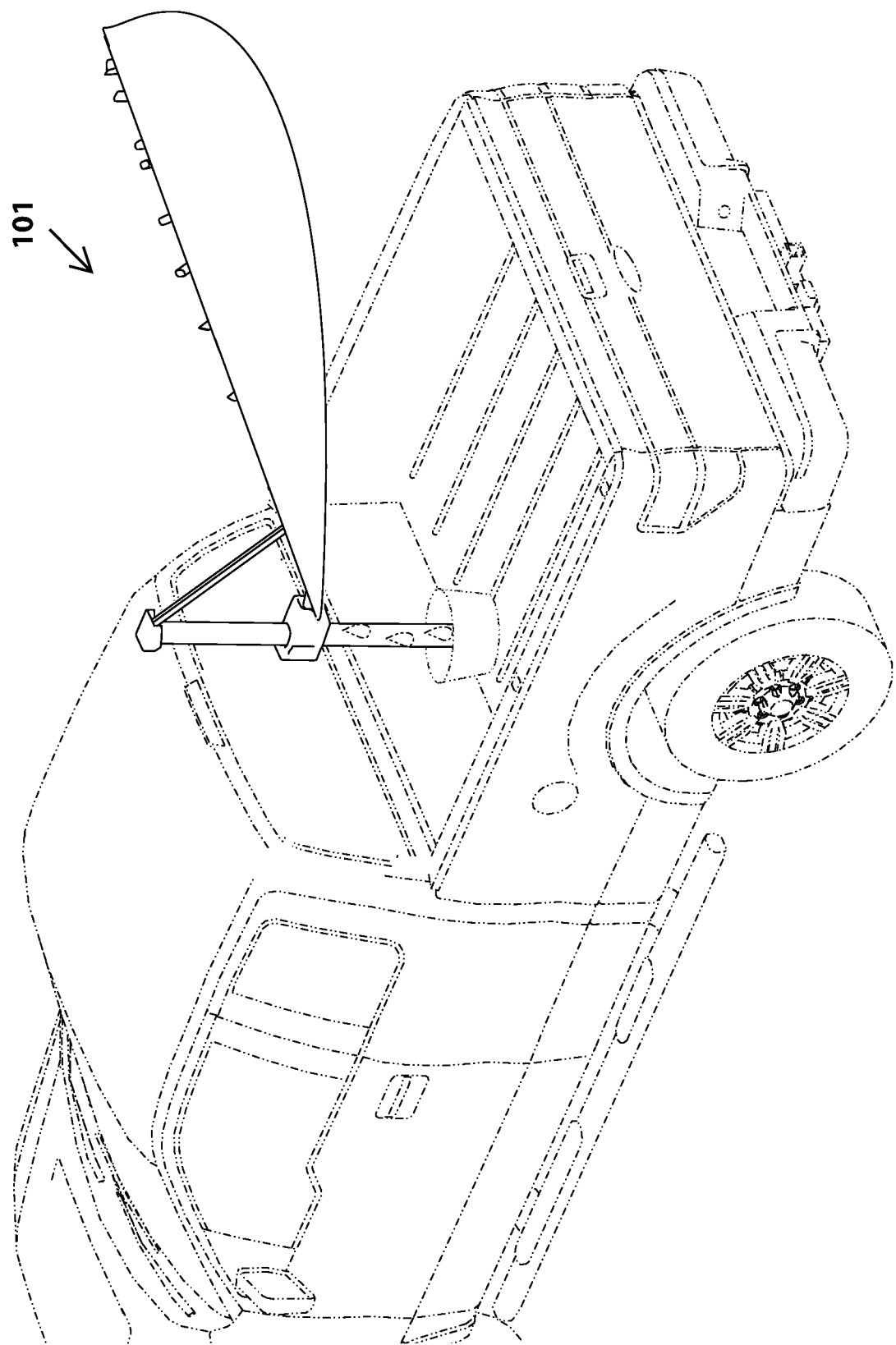
Figure 14A:
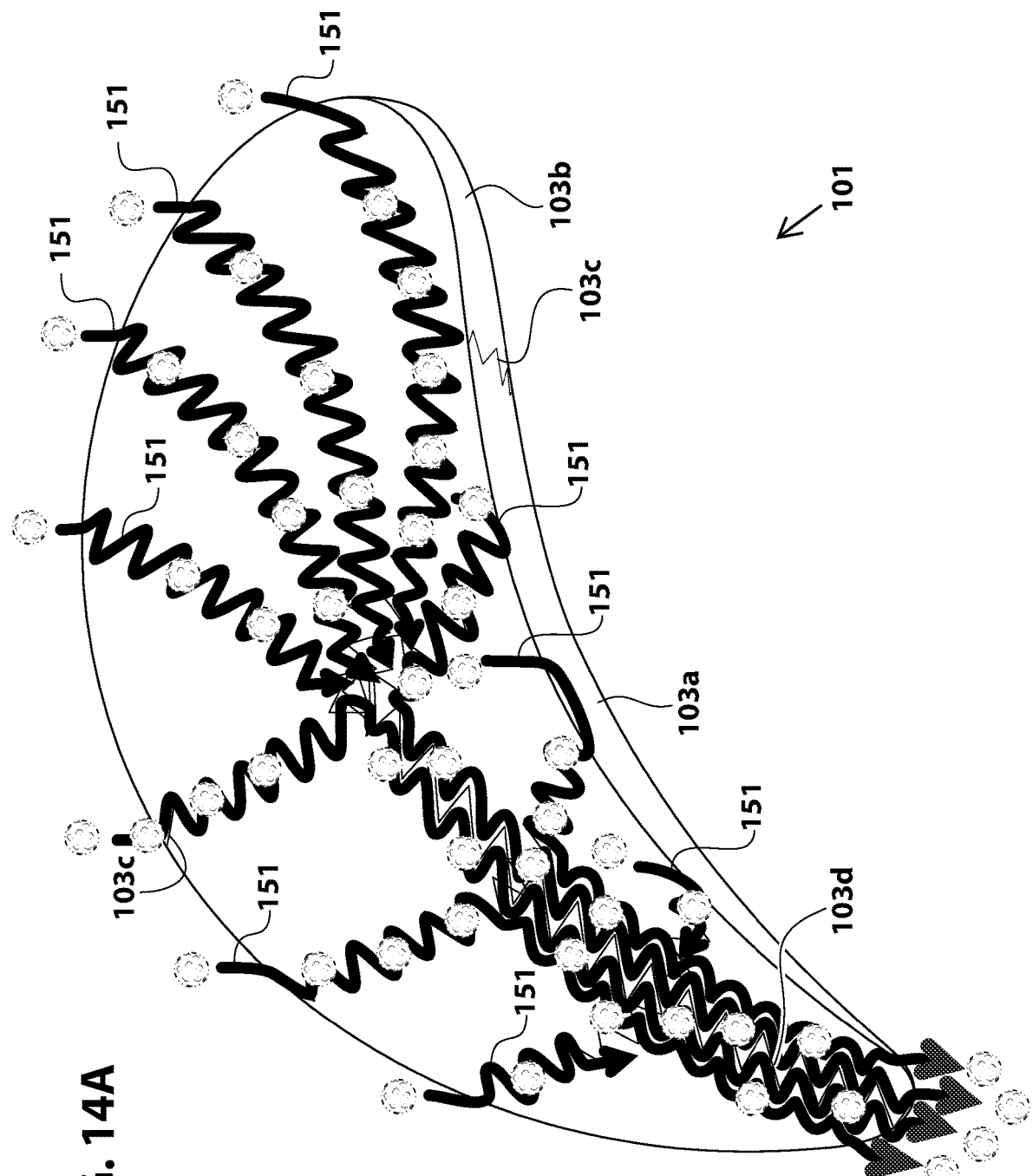
Figure 14C:
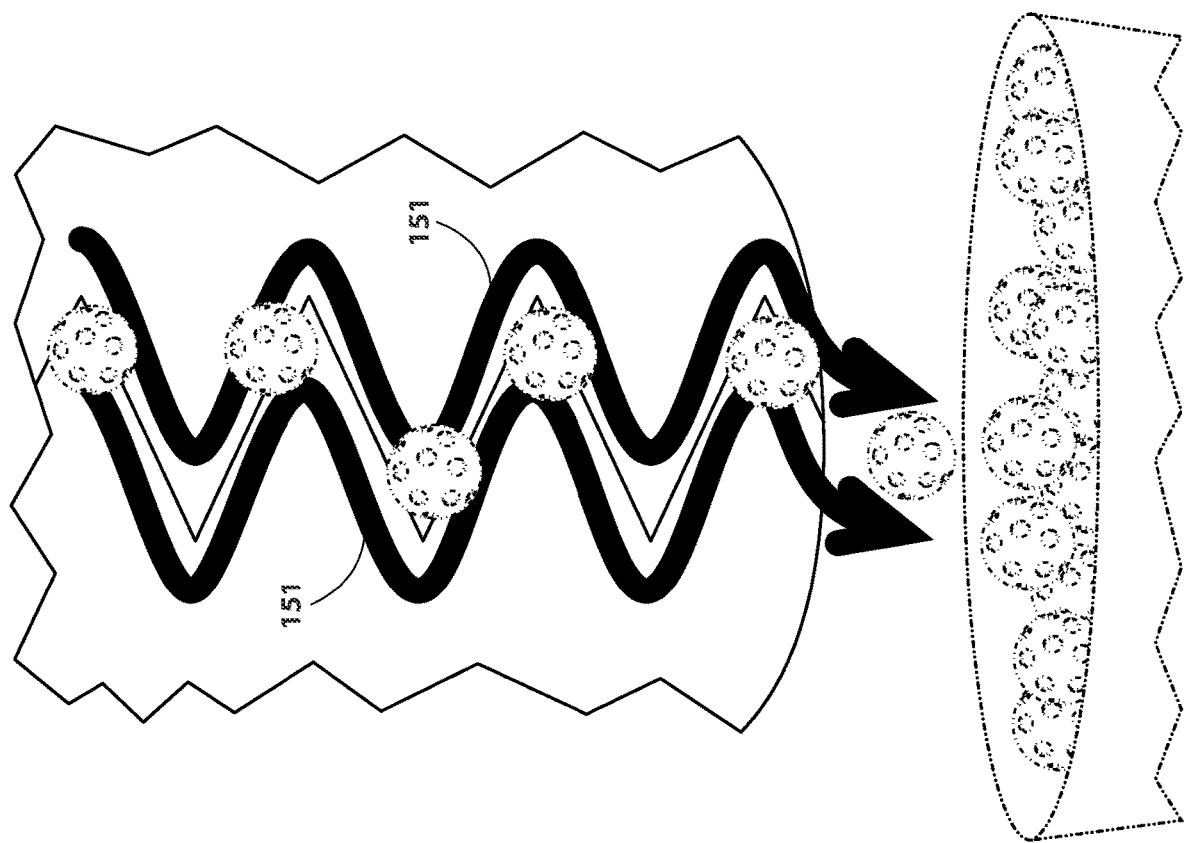
Figure 14E:
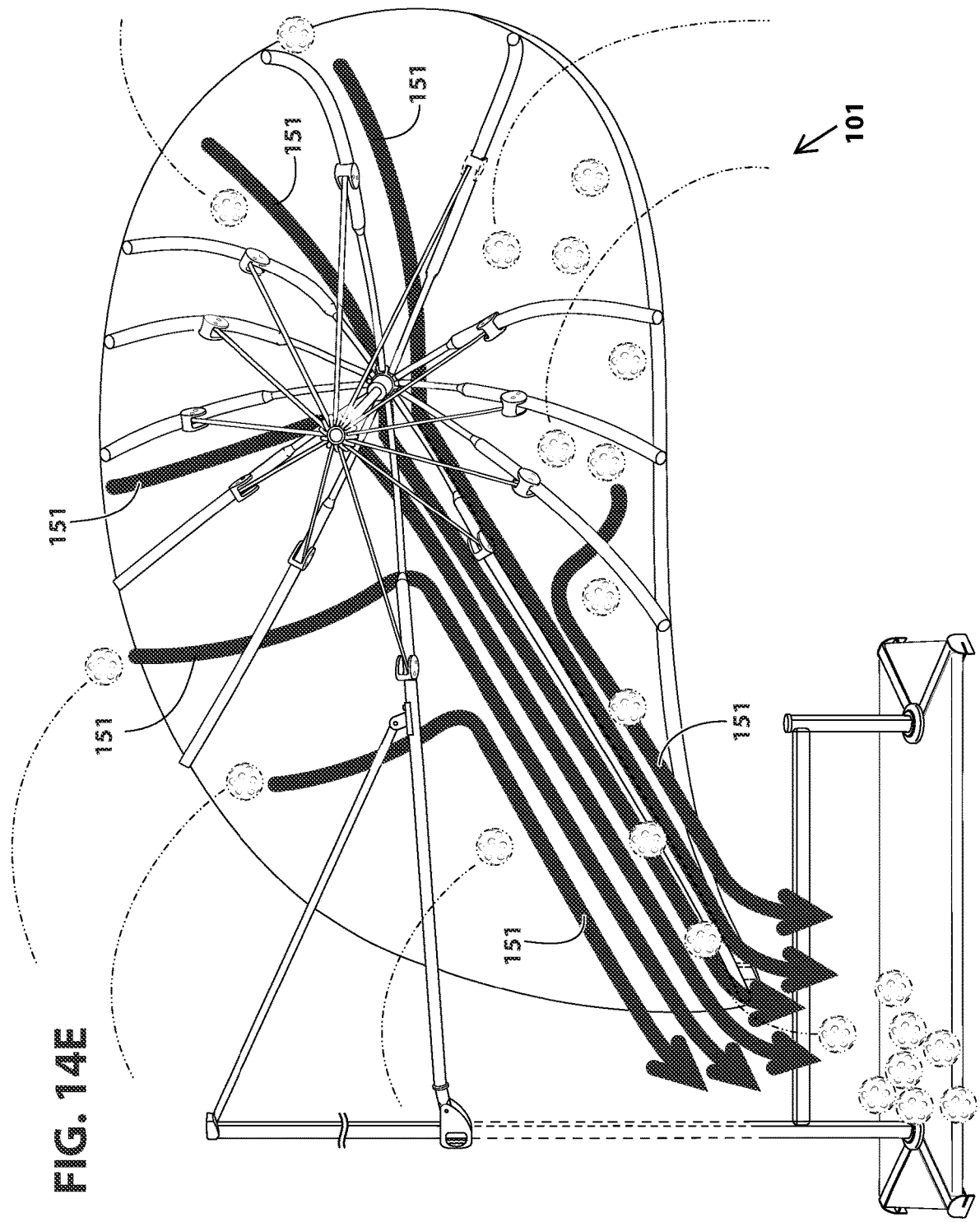
Figure 14G:
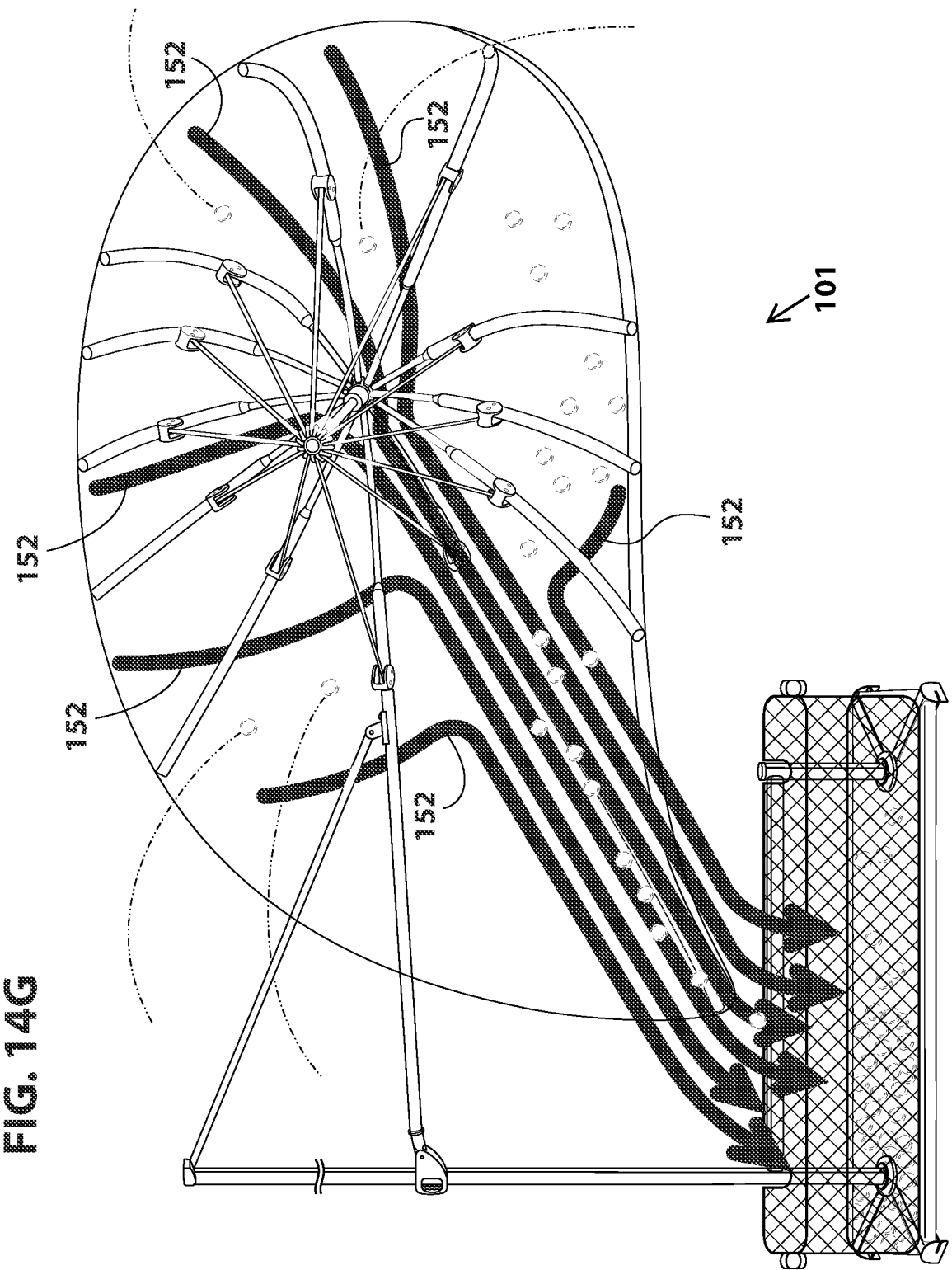
Figure 14H:
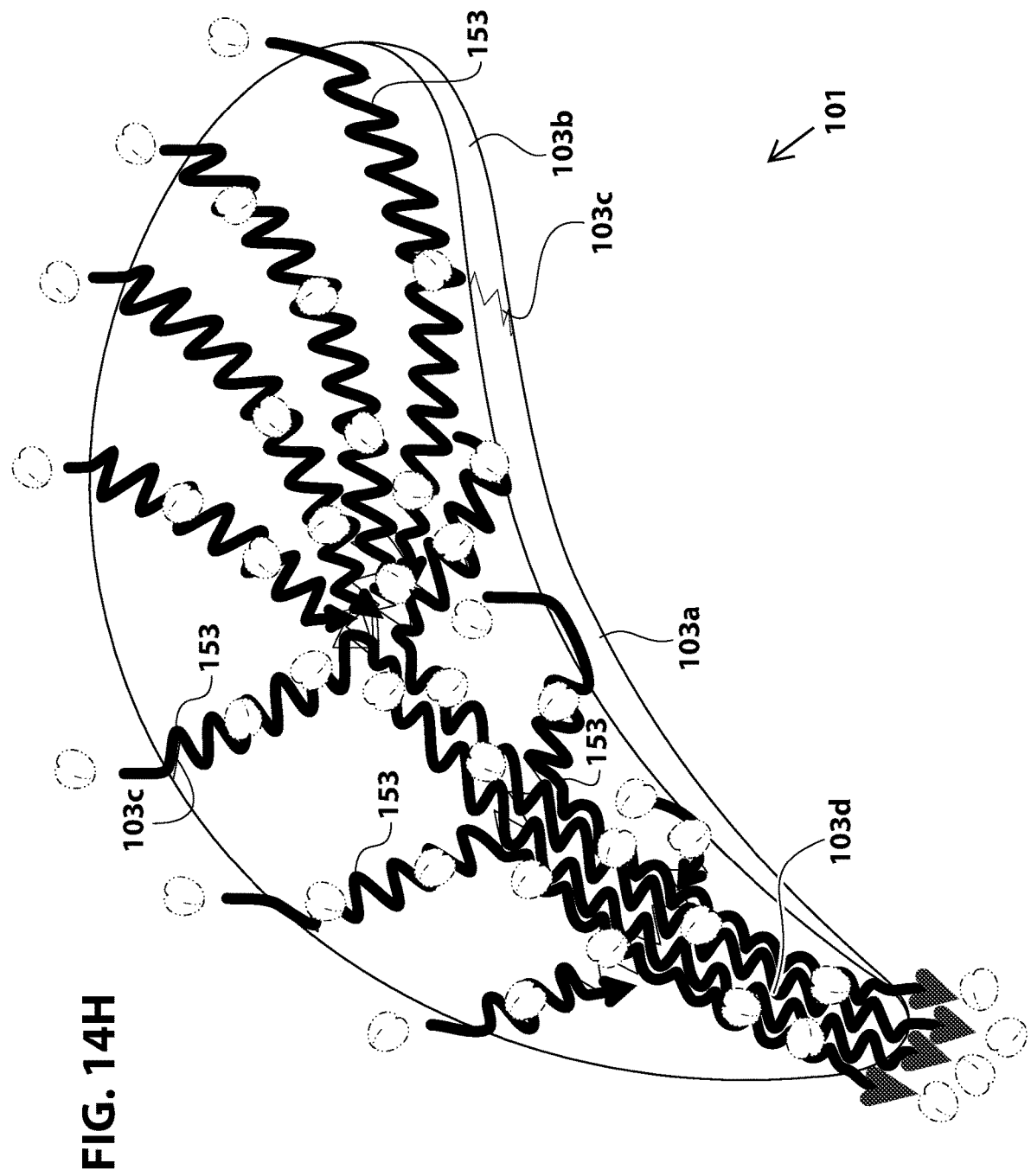
Figure 14J:
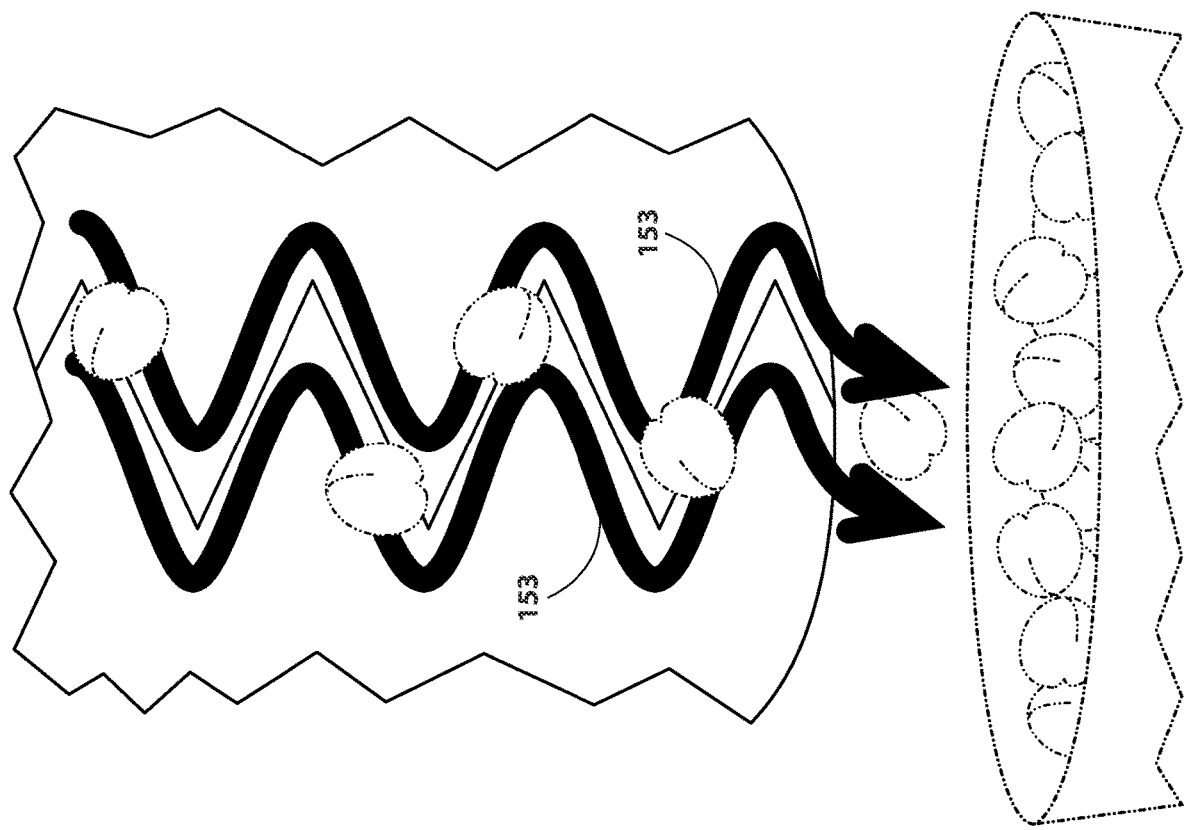
Figure 14N:
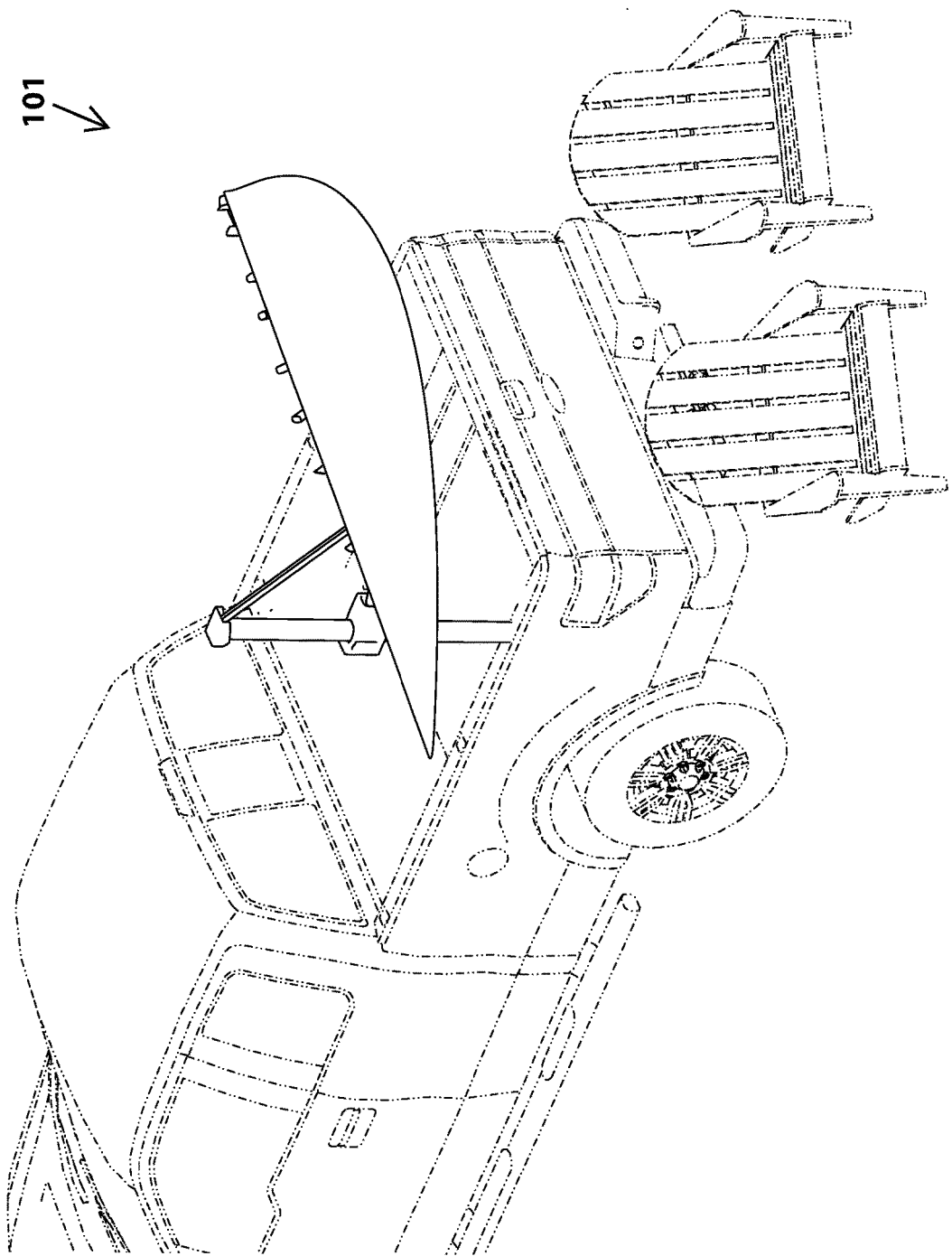
Figure 140:
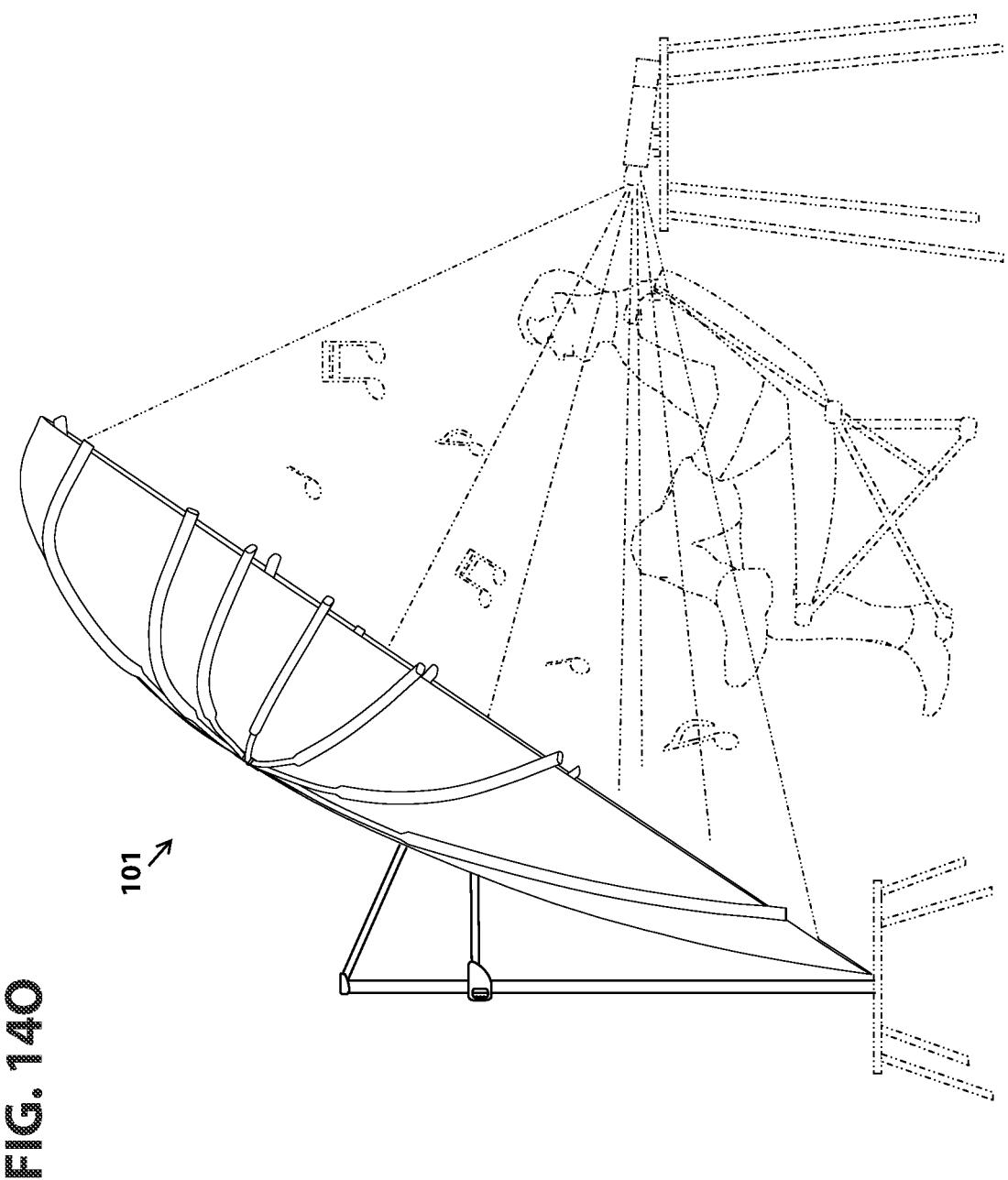
Figure 14P:
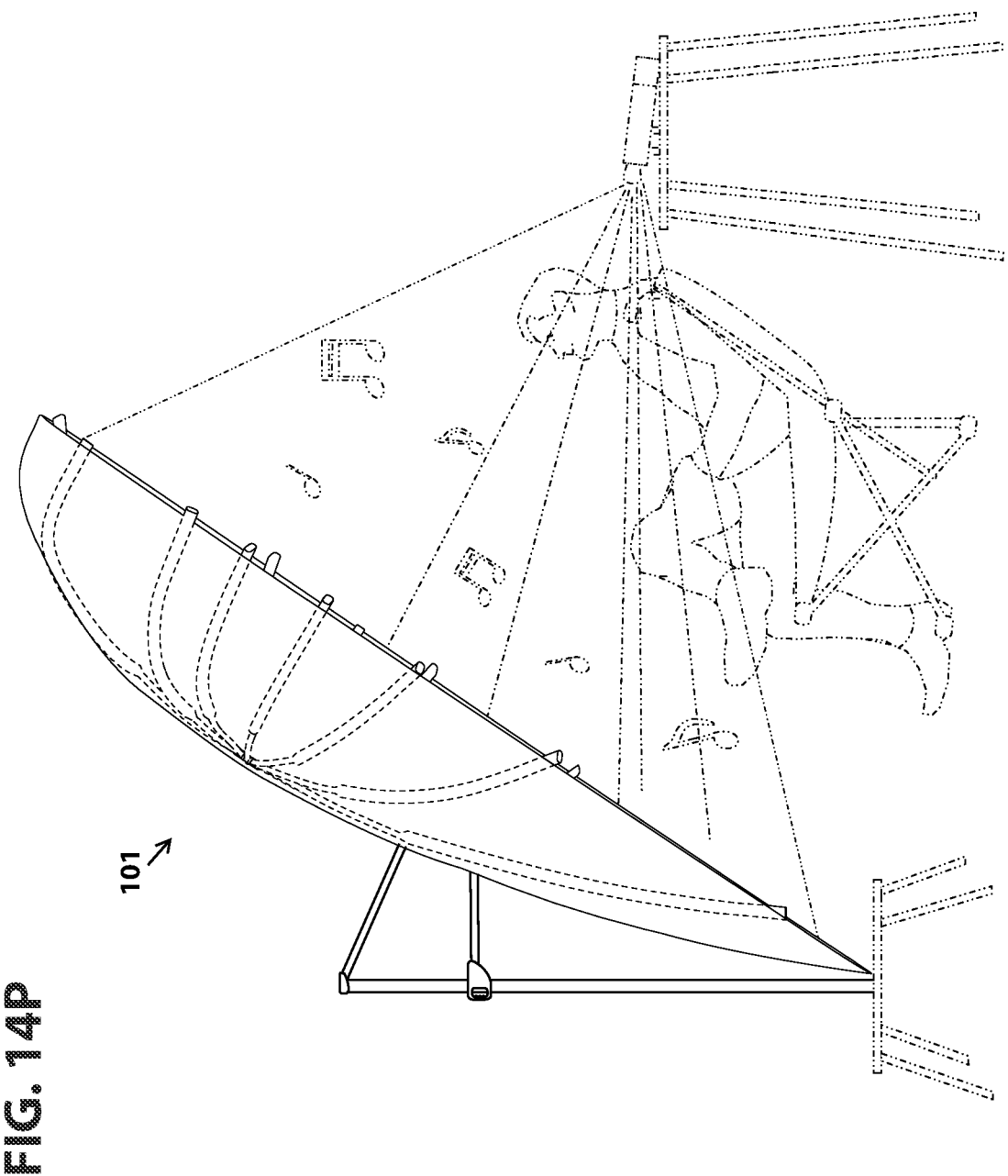
Figure 14S:
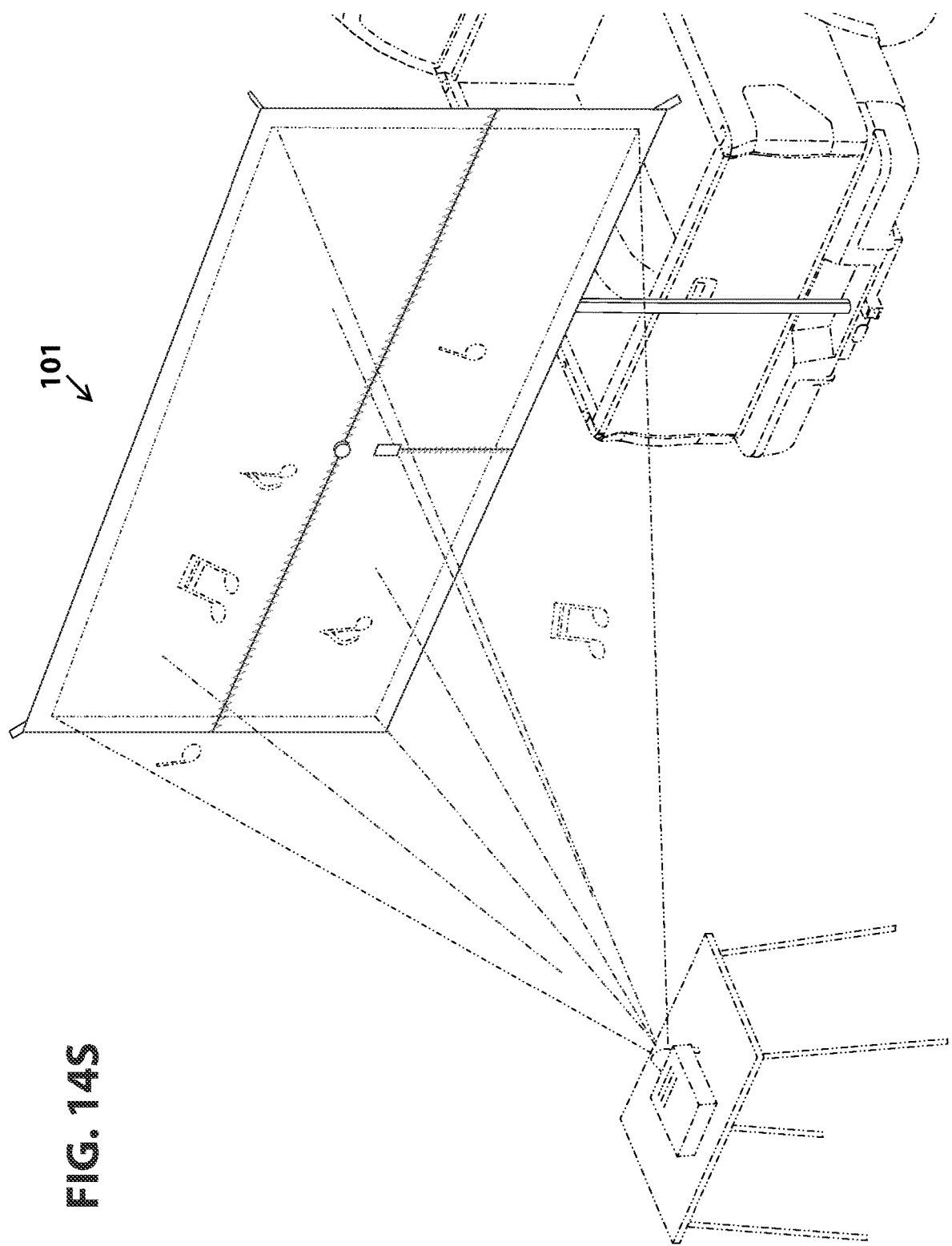
Figure 14T:
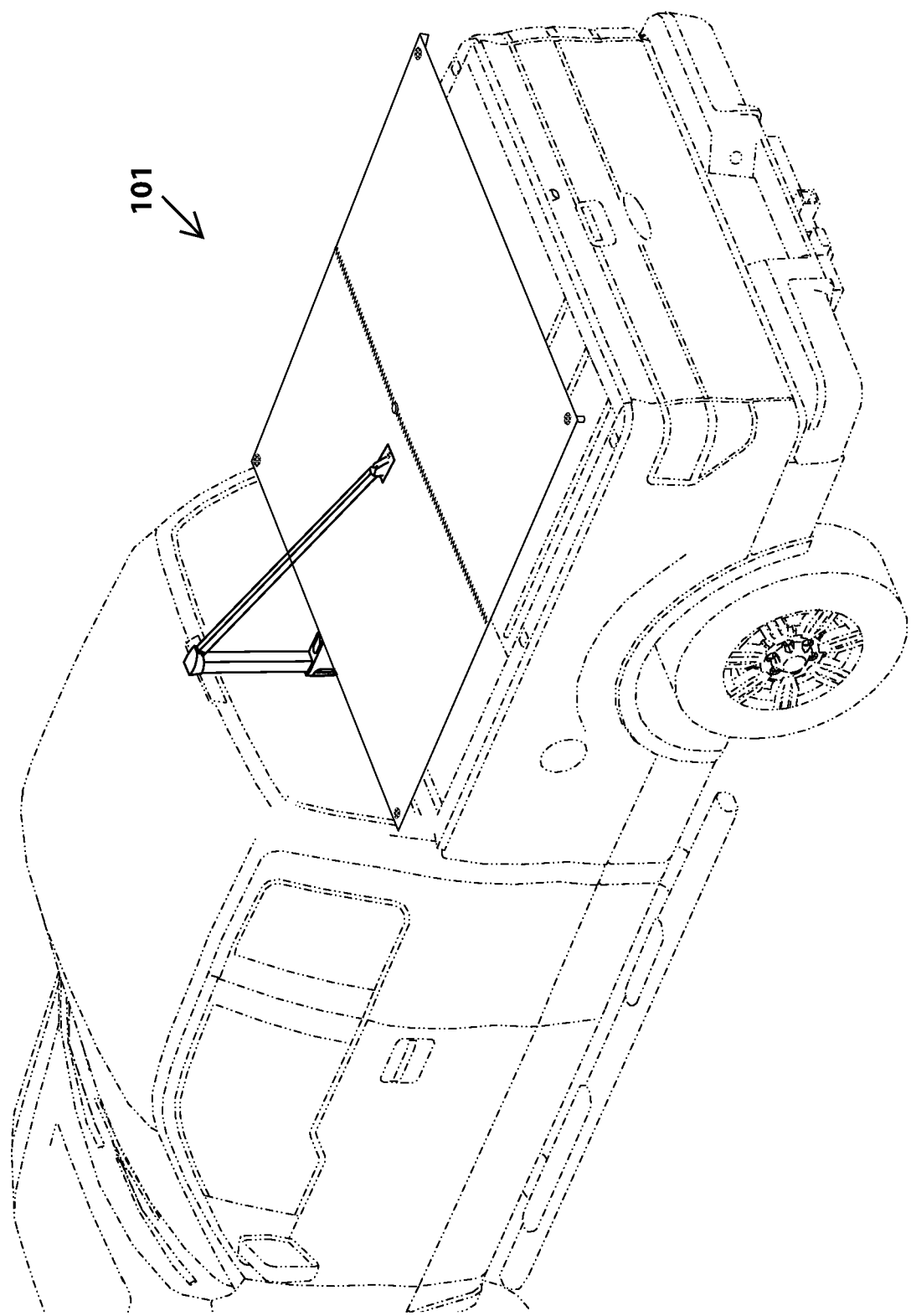
Figure 15C:
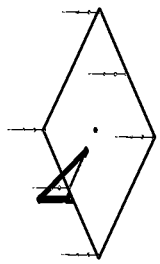
FIG. 15A, FIG. 15B, FIG. 15C, FIG. 15D, FIG. 15E, FIG. 16A, FIG. 16B, FIG. 16C, FIG. 16D, FIG. 16E, FIG. 16F, FIG. 16G, FIG. 16H, FIG. 16I, FIG. 16J, and FIG. 16K depict equivalent variations of no-sew-single-cut-three-hundred-and-sixty-degree-orientational-spline-interchangeable carapace system 101, respectively.
Figure 15E:
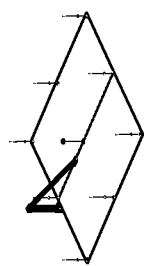
Figure 15B:
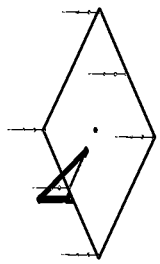
Figure 15D:
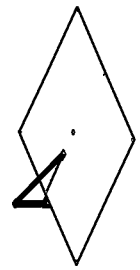
Figure 15A:
Figure 16A:
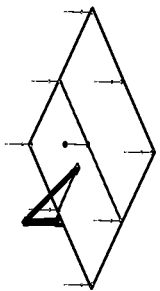
Figure 16B:
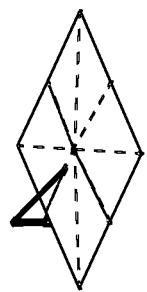
Figure 16C:
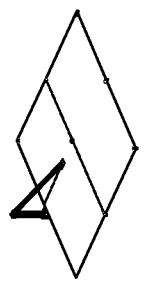
Figure 16D:
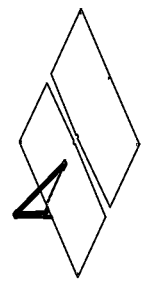
Figure 16E:
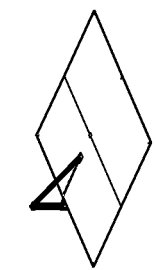
Figure 16F:
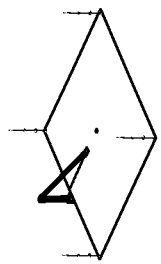
Figure 16K:
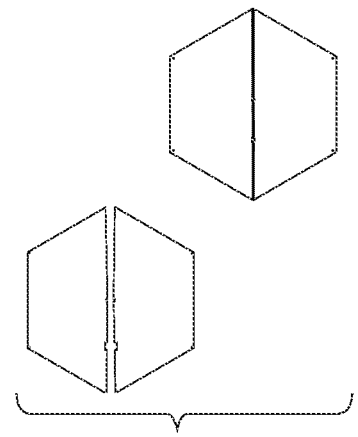
Figure 16J:
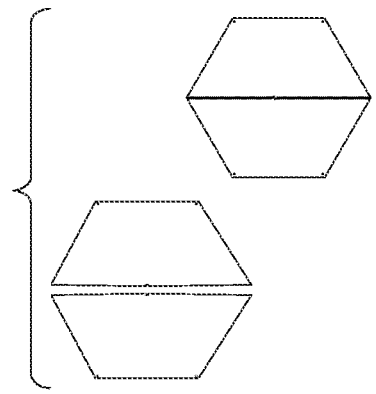
Figure 16I:
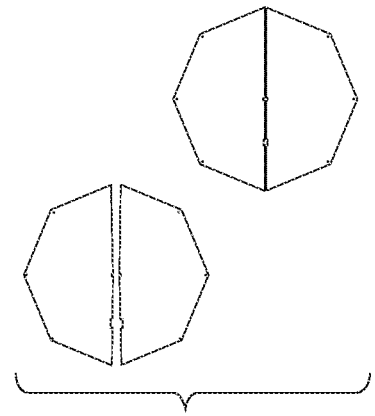
Figure 16H:
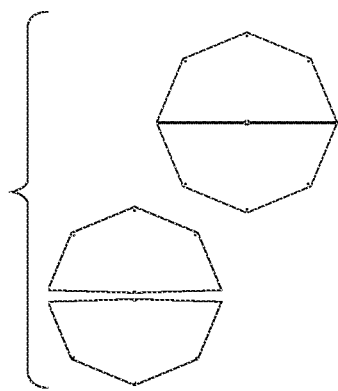
Figure 16G:
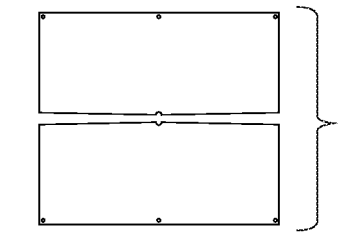

Referring to FIG. 8A, FIG. 8B, FIG. 8C, FIG. 8D, FIG. 9A, FIG. 9B, FIG. 10A, FIG. 10B, FIG. 10C, FIG. 10D, FIG. 10E, FIG. 10F, FIG. 10G, FIG. 11, FIG. 12A, FIG. 12B, FIG. 12C, FIG. 13A, FIG. 13B, FIG. 13C, FIG. 13D, FIG. 13E, FIG. 13F, FIG. 13G, FIG. 13H, FIG. 13I, FIG. 13J, FIG. 14A, FIG. 14B, FIG. 14C, FIG. 14D, FIG. 14E, FIG. 14F, FIG. 14G, FIG. 14H, FIG. 14I, FIG. 14J, FIG. 14K, FIG. 14L, FIG. 14M, FIG. 14N, FIG. 14O, FIG. 14P, FIG. 14Q, FIG. 14R, FIG. 14S, and FIG. 14T:
  1) Three-hundred-and-sixty-degree-orientational spline-interchangeable carapace system 101 is (or are respectively) for performing the combined functions of its components.
  2) Three-hundred-and-sixty-degree-orientational-spline-interchangeable carapace 102 is (or are respectively) for:
    a) Covering the perimeter of three-hundred-and-sixty-degree-orientational interchangeable-spline system 121
      in the direction of arrow 139
      (see FIG. 5, FIG. 6, FIG. 7B, FIG. 7C, and FIG. 8A);
    b) Requiring at least one cut only during manufacturing process, to save labor
      (see FIG. 7B);
    c) Requiring at least one cut only during manufacturing process, to save machinery and tooling cost;
    d) Requiring at least one cut only during manufacturing process, to save time
      (see FIG. 6 and FIG. 7B);
    e) Requiring at least one stitching during manufacturing process, to save labor
      (see FIG. 6, and FIG. 7B);
    f) Requiring at least one stitching during manufacturing process, to save machinery and tooling cost
      (see FIG. 6, and FIG. 8A);
    g) Requiring at least one stitching during manufacturing process, to save time;
    h) Providing means to tighten three-hundred-and-sixty-degree-orientational-spline-interchangeable carapace 102 on interchangeable splines 123 being attaching by carapace-perimeter-securing screws 105
      in the direction of arrow 139
      (see FIG. 5, FIG. 6, and FIG. 8A);
    i) Conforming three-hundred-and-sixty-degree-orientational-spline-interchangeable carapace 102 to the shape of three-hundred-and-sixty-degree-orientational interchangeable-spline system 121;
    j) Providing means to tighten three-hundred-and-sixty-degree-orientational-spline-interchangeable carapace 102 on interchangeable splines 123
    k) Acting as a cistern for irrigation
      (see FIG. 13D, FIG. 13I, and FIG. 13J);
    l) Acting as a water-diverting gutter
      (see FIG. 13E, FIG. 13F, FIG. 13G, and FIG. 14H);
    m) Acting as a falling-fruit-catching device
      (see FIG. 14H, FIG. 13I, FIG. 13J, FIG. 13K, and FIG. 13L);
    n) Acting as a falling-nut catching device
      (see FIG. 14M);
    o) Acting as a whiffle ball and/or badminton shuttlecock catching and/or collecting device
      (see FIG. 14A, FIG. 14B, FIG. 14C, FIG. 14D, and FIG. 14E);
    p) Acting as a golf-ball-catching, -blocking and/or -collecting device
      (see FIG. 14F and FIG. 14G);
    q) Acting as a free-standing projector screen
      (see FIG. 14O and FIG. 14P);
    r) Acting as a truck-bed tonneau cover when attached to a utility hole of a truck bed side
      to secure items within a truck bed
        (see FIG. 14T);
    s) Acting as a shade cover when attached to a utility hole of a truck bed side to provide shade to occupants
      (see FIG. 14N);
    t) Acting as a whiffle ball and/or badminton shuttlecock blocking and/or deflecting device
      (see FIG. 14Q and FIG. 14R); and
    u) Acting as a tow-hitch mountable projector screen
      (see FIG. 14S).
  3) At least one first three-dimensional-contour-conforming carapace dome panel 103*a* is (or are respectively) for:
    a) Covering three-hundred-and-sixty-degree-orientational interchangeable-spline system 121;

b) Covering the perimeter of three-hundred-and-sixty-degree-orientational interchangeable-spline system 121
   (see FIG. 5, FIG. 6, FIG. 7B, FIG. 7C, and FIG. 8A);
c) Requiring a single cut only during manufacturing process, to save labor in the direction of arrow 139
   (see FIG. 7B);
d) Requiring a single cut only during manufacturing process, to save machinery and tooling cost
   in the direction of arrow 139
   (see FIG. 8A);
e) Requiring a single cut only during manufacturing process, to save time
   (see FIG. 6 and FIG. 7B);
f) Requiring no stitching during manufacturing process, to save labor
   (see FIG. 6 and FIG. 7B);
g) Requiring no stitching during manufacturing process, to save machinery and tooling cost
   (see FIG. 6 and FIG. 8A);
h) Requiring no stitching during manufacturing process, to save time;
i) Providing means to tighten three-hundred-and-sixty-degree-orientational-spline-interchangeable carapace 102 on interchangeable splines 123 being attaching by carapace-perimeter-securing screws 105
   in the direction of arrow 139
   (see FIG. 5, FIG. 6, and FIG. 8A);
j) Conforming three-hundred-and-sixty-degree-orientational-spline-interchangeable carapace 102 to the shape of three-hundred-and-sixty-degree-orientational interchangeable-spline system 121;
k) Providing means to tighten three-hundred-and-sixty-degree-orientational-spline-interchangeable carapace 102 on interchangeable splines 123;
l) Acting as a cistern for irrigation
   (see FIG. 13D, FIG. 13I, and FIG. 13J);
m) Acting as a water-diverting gutter
   (see FIG. 13E, FIG. 13F, FIG. 13G, and FIG. 14H);
n) Acting as a falling-fruit-catching device
   (see FIG. 14H, FIG. 13I, FIG. 13J, FIG. 13K, and FIG. 13L);
o) Acting as a falling-nut catching device
   (see FIG. 14M);
p) Acting as a whiffle ball and/or badminton shuttlecock catching and/or collecting device
   (see FIG. 14A, FIG. 14B, FIG. 14C, FIG. 14D, and FIG. 14E);
q) Acting as a golf-ball-catching, -blocking and/or -collecting device
   (see FIG. 14F and FIG. 14G);
r) Acting as a free-standing projector screen
   (see FIG. 14O and FIG. 14P);
s) Acting as a truck-bed tonneau cover when attached to a utility hole of a truck bed side
   to secure items within a truck bed
   (see FIG. 14T);
t) Acting as a shade cover when attached to a utility hole of a truck bed side
   to provide shade to occupants
   (see FIG. 14N);
u) Acting as a whiffle ball and/or badminton shuttlecock blocking and/or deflecting device
   (see FIG. 14Q and FIG. 14R); and
v) Acting as a tow-hitch mountable projector screen
   (see FIG. 14S).

At least one second three-dimensional-contour-conforming carapace dome panel 103b is (or are respectively) for:
a) Covering three-hundred-and-sixty-degree-orientational interchangeable-spline system 121.
b) Covering the perimeter of three-hundred-and-sixty-degree-orientational interchangeable-spline system 121
   in the direction of arrow 139
   (see FIG. 5, FIG. 6, FIG. 7B, FIG. 7C, and FIG. 8A);
c) Requiring a single cut only during manufacturing process, to save labor in the direction of arrow 139
   (see FIG. 7B);
d) Requiring a single cut only during manufacturing process, to save machinery and tooling cost;
e) Requiring a single cut only during manufacturing process, to save time
   (see FIG. 6);
f) Requiring no stitching during manufacturing process, to save labor
   (see FIG. 6 and FIG. 7B);
g) Requiring no stitching during manufacturing process, to save machinery and tooling cost
   (see FIG. 6 and FIG. 7B);
h) Requiring no stitching during manufacturing process, to save time;
i) Providing means to tighten three-hundred-and-sixty-degree-orientational-spline-interchangeable carapace 102 on interchangeable splines 123 being attaching by carapace-perimeter-securing screws 105;
j) Conforming three-hundred-and-sixty-degree-orientational-spline-interchangeable carapace 102 to the shape of three-hundred-and-sixty-degree-orientational interchangeable-spline system 121; and
k) Providing means to tighten three-hundred-and-sixty-degree-orientational-spline-interchangeable carapace 102 on interchangeable splines 123;
l) Acting as a cistern for irrigation
   (see FIG. 13D, FIG. 13I, and FIG. 13J);
m) Acting as a water-diverting gutter
   (see FIG. 13E, FIG. 13F, FIG. 13G, and FIG. 14H);
n) Acting as a falling-fruit-catching device
   (see FIG. 14H, FIG. 13I, FIG. 13J, FIG. 13K, and FIG. 13L);
o) Acting as a falling-nut catching device
   (see FIG. 14M);
p) Acting as a whiffle ball and/or badminton shuttlecock catching and/or collecting device
   (see FIG. 14A, FIG. 14B, FIG. 14C, FIG. 14D, and FIG. 14E);
q) Acting as a golf-ball-catching, -blocking and/or -collecting device
   (see FIG. 14F and FIG. 14G);
r) Acting as a free-standing projector screen
   (see FIG. 14O and FIG. 14P);
s) Acting as a truck-bed tonneau cover when attached to a utility hole of a truck bed side
   to secure items within a truck bed
   (see FIG. 14T);
t) Acting as a shade cover when attached to a utility hole of a truck bed side
   to provide shade to occupants
   (see FIG. 14N);
u) Acting as a whiffle ball and/or badminton shuttlecock blocking and/or deflecting device
   (see FIG. 14Q and FIG. 14R); and v) Acting as a tow-hitch mountable projector screen (see FIG. 14S).

Figure 7A:
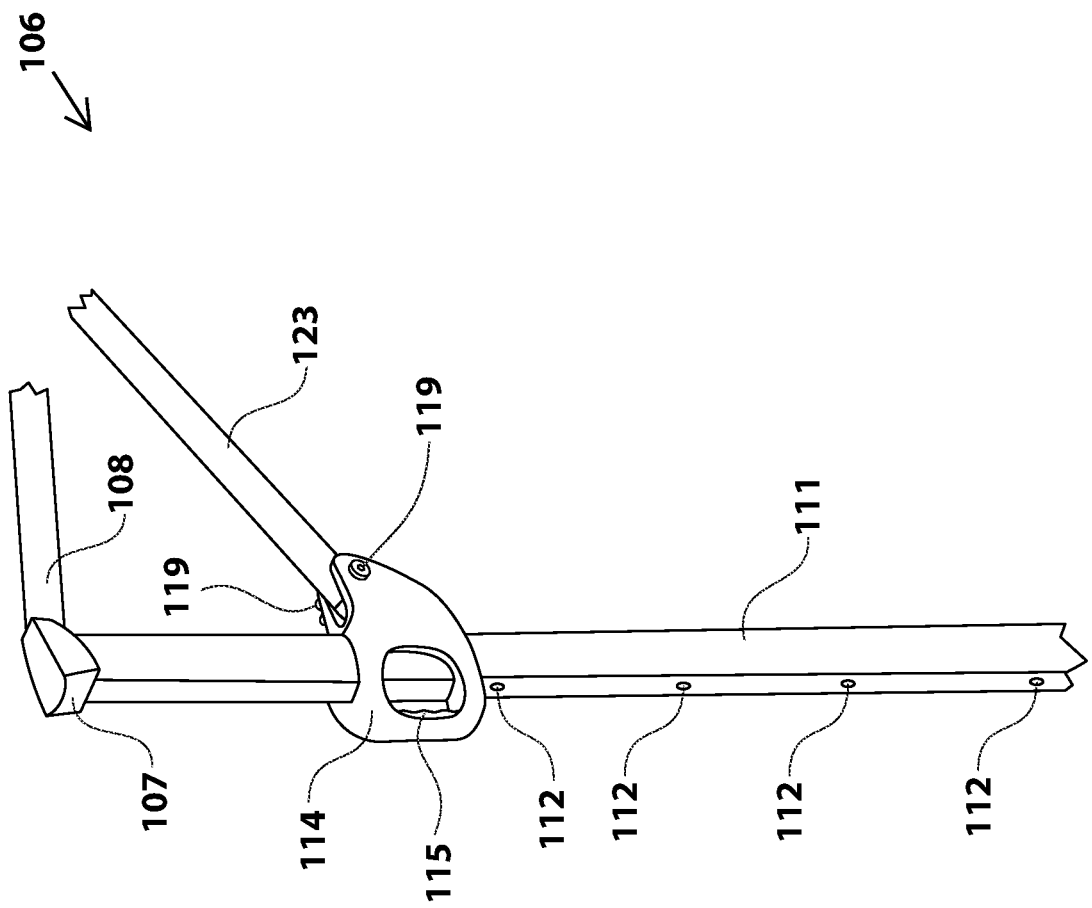
Figure 7B:
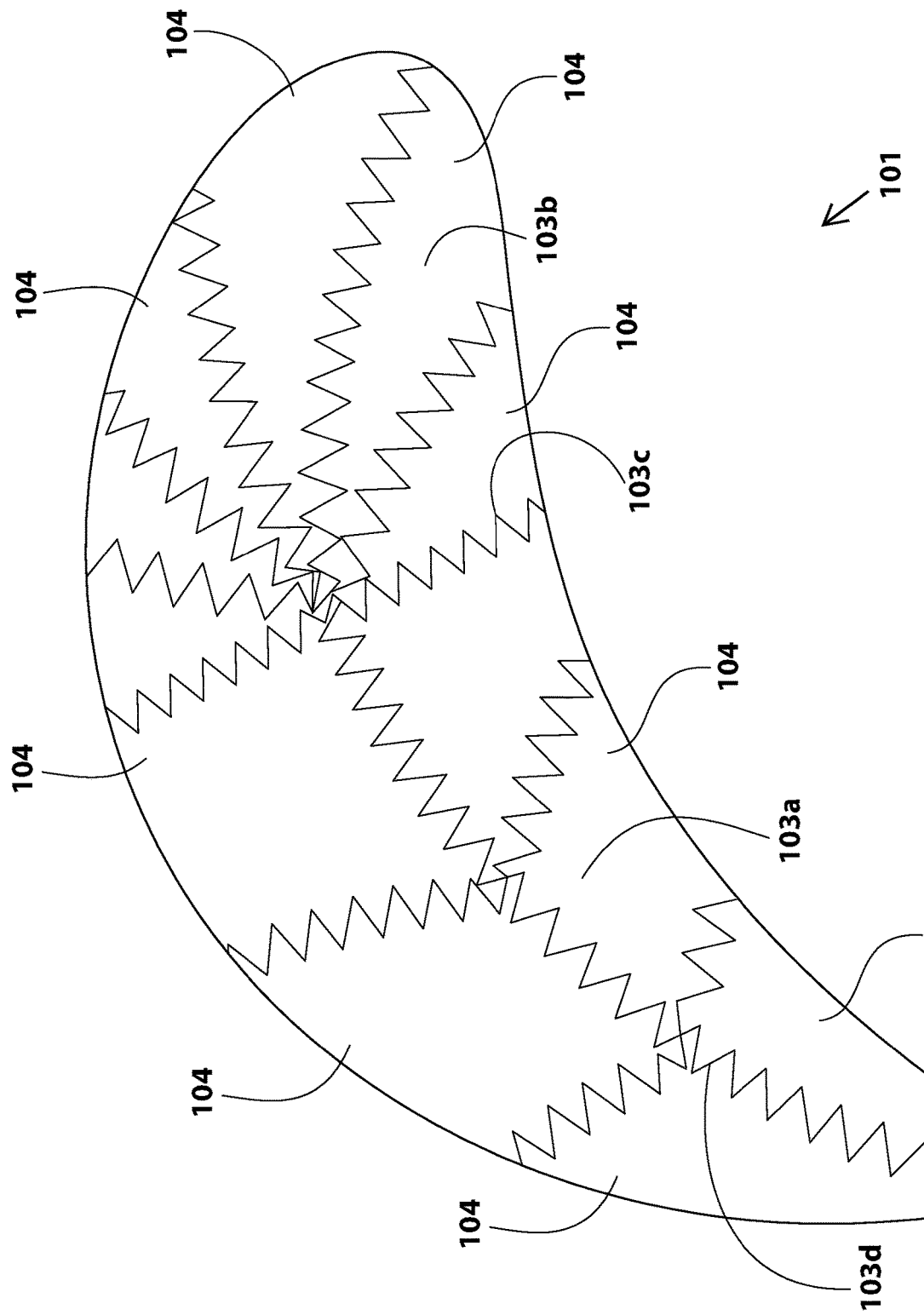
Figure 7C:
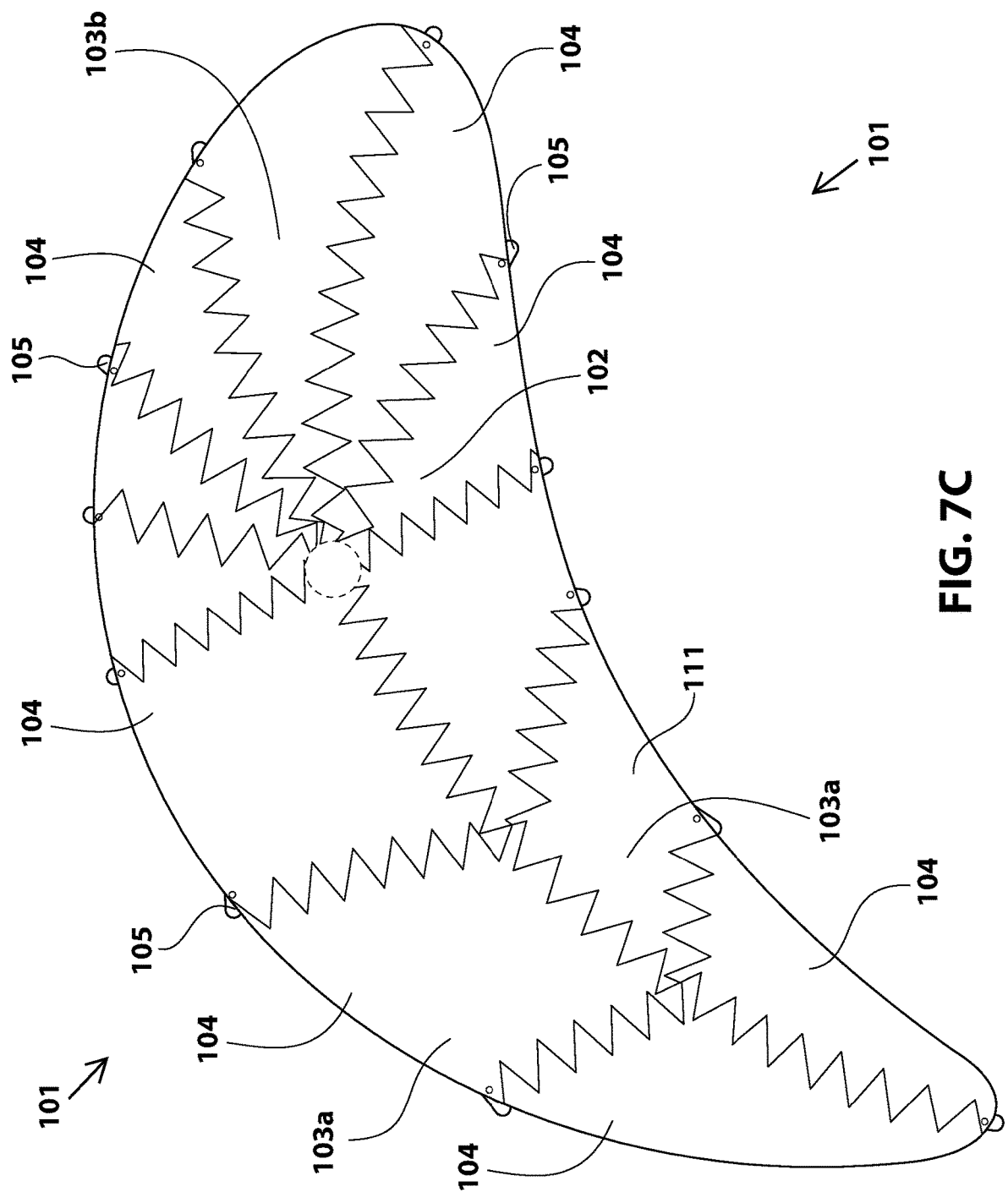

At least one water-directing ball-directing fruit-directing dome-bisecting transverse seam 103c is (or are respectively) for:
a) Converging rain water therein,
to repeatedly change the direction of rain water to decelerate the flowing speed of rain water to reduce water splash to avoid damaging vegetables in the directions of arrows 156 and 157
(see FIG. 1B, FIG. 1C, FIG. 13A, FIG. 13B, and FIG. 13C);
b) Converging harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and FIG. 14L);
c) Converging harvested nuts therein,
to repeatedly change the direction of harvested nuts to decelerate the rolling speed of harvested fruits to reduce nut bruises to avoid throwing away nuts
in the direction of arrow 154
(see FIG. 14F and FIG. 14G);
d) Converging catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);
e) Directing collected water away from patios and balconies
to keep property and occupants dry
in the direction of arrow 158
(see FIG. 13E, FIG. 13F, FIG. 13G, and FIG. 13H);
f) Distributing collected water onto crops when attached to the utility holes of a pickup truck
to keep crops irrigated
in the direction of arrow 156
(see FIG. 13A, FIG. 13B, FIG. 13C, and FIG. 13D);
g) Directing collected fruit to a storage container
to easily gather harvested fruit
in the direction of arrow 153
(see FIG. 14H, FIG. 14I, FIG. 14J, FIGS. 14K, and 14L);
h) Directing collected nuts to a storage container
to easily gather harvested nuts
in the direction of arrow 154
(see FIG. 14M);
i) Directing collected whiffle balls to a storage container
to easily gather whiffle balls
in the directions of arrows 151a and 151b
(see FIGS. 13A and 13B);
j) Directing collected golf balls to a storage container
to easily gather golf balls
in the directions of arrows 152a and 152b
(see FIGS. 13C and 13D); and
k) Securely connecting at least one first three-dimensional-contour-conforming carapace dome panel 103a to at least one second three-dimensional-contour-conforming carapace dome panel 103b
(see FIG. 7B).

At least one water-directing-and-ejecting ball-directing-and-ejecting fruit-directing-and-ejecting cross-cutting seam 103d is (or are respectively) for:
a) Converging rain water therein,
to repeatedly change the direction of rain water to decelerate the flowing speed of rain water to reduce water splash to avoid damaging vegetables in the directions of arrows 156 and 157
(see FIG. 1B, FIG. 1C, FIG. 13A, FIG. 13B, and FIG. 13C);
b) Converging harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and FIG. 14L);
c) Converging harvested nuts therein,
to repeatedly change the direction of harvested nuts to decelerate the rolling speed of harvested fruits to reduce nut bruises to avoid throwing away nuts
in the direction of arrow 154
(see FIG. 14F and FIG. 14G);
d) Converging catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);
e) Directing collected water away from patios and balconies
to keep property and occupants dry
in the direction of arrow 158
(see FIG. 13E, FIG. 13F, FIG. 13G, and FIG. 13H);
f) Distributing collected water onto crops when attached to the utility holes of a pickup truck
to keep crops irrigated
in the direction of arrow 156
(see FIG. 13A, FIG. 13B, FIG. 13C, and FIG. 13D);
g) Directing collected fruit to a storage container
to easily gather harvested fruit
in the direction of arrow 153
(see FIG. 14H, FIG. 14I, FIG. 14J, FIGS. 14K, and 14L);
h) Directing collected nuts to a storage container
to easily gather harvested nuts
in the direction of arrow 154
(see FIG. 14M);
i) Directing collected whiffle balls to a storage container
to easily gather whiffle balls
in the direction of arrow 151
(see FIG. 14A, FIG. 14B, FIG. 14C, FIG. 14D, and FIG. 14E);
j) Directing collected golf balls to a storage container
to easily gather golf balls
in the directions of arrows 152
(see FIGS. 14F and 14G); and
k) Securely connecting at least one first three-dimensional-contour-conforming carapace dome panel 103a to at least one second three-dimensional-contour-conforming carapace dome panel 103b
(see FIG. 7B).

4) Perimeter-contour-conforming carapace edge 104 is (or are respectively) for:
   a) Stretching at least one first three-dimensional-contour-conforming carapace dome panel 103a and at least one second three-dimensional-contour-conforming carapace dome panel 103b over three-hundred-and-sixty-degree-orientational interchangeable-spline system 121;
   b) Covering the perimeter of three-hundred-and-sixty-degree-orientational interchangeable-spline system 121
      (see FIG. 6, FIG. 7B, FIG. 7C, and FIG. 8A);
   c) Conforming three-hundred-and-sixty-degree-orientational-spline-interchangeable carapace 102 to the shape of three-hundred-and-sixty-degree-orientational interchangeable-spline system 121
      (see FIG. 6); and
   d) Providing means to tighten three-hundred-and-sixty-degree-orientational-spline-interchangeable carapace 102 on interchangeable splines 123 being attaching by carapace-perimeter-securing screws 105
      (see FIG. 5 and FIG. 6).
5) Carapace-perimeter-securing screws 105 is (or are respectively) for:
   Securing the perimeter of three-hundred-and-sixty-degree-orientational-spline-interchangeable carapace 102 to three-hundred-and-sixty-degree-orientational interchangeable-spline system 121
      (see FIG. 5, FIG. 6, and FIG. 8A).
6) Multi-height-adjustable and spline-supporting stanchion system 106 is (or are respectively) for performing the combined functions of its components
7) Carapace-supporting-arm intersector 107 is (or are respectively) for:
   Supporting carapace-supporting-arm 108.
8) Carapace-supporting-arm 108 is (or are respectively) for:
   Supporting multi-orientation-spline-supporting hanger 109.
9) Multi-orientation-spline-supporting hanger 109 is (or are respectively) for:
   Supporting and providing means of attachment to three-hundred-and-sixty-degree-orientational interchangeable-spline system 121.
10) Multi-orientation-spline-supporting-hanger screw and hole 110 is (or are respectively) for:
    Providing means of attaching multi-orientation-spline-supporting hanger 109 to interchangeable splines 123
      (see FIG. 10B, 10C, and FIG. 10D).
11) Multi-height-adjustable carapace stanchion 111 is (or are respectively) for:
    Providing vertical support to carapace-supporting-arm intersector 107, and means of vertically sliding carapace-sliding-and-tilting multi-orienting snap-locking handle system 113 upon.
12) Multi-height-adjustable carapace stanchion holes 112 is (or are respectively) for:
    a) Providing means to vertically adjust, at certain predetermined positions, the height of carapace-sliding-and-tilting multi-orienting snap-locking handle system 113
       in the directions of arrows 140a, 140b, 141a, and 141b
       (see FIG. 7A, FIG. 8B, FIG. 8C, and FIG. 8D); and
    b) Providing means to insert snap-locking-trigger pin 116.
       (see FIG. 7A and FIG. 9A).
13) Carapace-sliding-and-tilting multi-orienting snap-locking handle system 113 is (or are respectively) for performing the combined functions of its components
14) Carapace-tilting-and-multi-orienting snap-locking handle 114 is (or are respectively) for:
    Providing means to vertically slide hand-grip opening 118 to variable heights.
15) Snap-locking trigger 115 is (or are respectively) for:
    Providing means to lock and unlock snap-locking-trigger pin 116 to multi-height-adjustable carapace stanchion holes 112.
       (see FIG. 7A, FIG. 8B, FIG. 8C, FIG. 8D, and FIG. 9A).
16) Snap-locking-trigger pin 116 is (or are respectively) for:
    Inserting and de-inserting into multi-height-adjustable carapace stanchion holes 112
       (see FIG. 7A and FIG. 9A).
17) Snap-locking-trigger spring 117 is (or are respectively) for:
    Creating tension to temporarily insert and lock snap-locking-trigger pin 116 into multi-height-adjustable carapace stanchion holes 112
       (see FIG. 8B, FIG. 8C, FIG. 8D, and FIG. 9A).
18) Hand-grip opening 118 is (or are respectively) for:
    Providing a space for inserting a human hand to thereby access the snap-locking trigger 115
       (see FIG. 9A).
19) Multi-orientational-spline screw and wing-nut 119 is (or are respectively) for:
    hingedly securing interchangeable splines 123 to hand-grip opening 118
       (see FIG. 9A and FIG. 10A).
20) Multi-orientational-spline holes 120 is (or are respectively) for:
    a) Providing means to insert multi-orientational-spline screw and wing-nut 119 to lock three-hundred-and-sixty-degree-orientational spline-interchangeable carapace system 101 into multiple positions of rotation
       in the directions of arrows 142, 143, 144, 145a, 145b, 146a, 146b, and 146c
       (see FIG. 9A, FIG. 9B, FIG. 10A, FIG. 10C, FIG. 10D, FIG. 10E, FIG. 10F, and FIG. 10G);
    b) Providing means to rotate three-hundred-and-sixty-degree-orientational spline-interchangeable carapace system 101 side to side
       in the directions of arrows 144, 145a, 145b, 146a, 146b, and 146c
       (see FIG. 9A, FIG. 9B, FIG. 10A, FIG. 10B, FIG. 10C, FIG. 10D, FIG. 10E, FIG. 10F, and FIG. 10G);
    c) Providing means to lock three-hundred-and-sixty-degree-orientational spline-interchangeable carapace system 101 into multiple positions of rotation
       in the directions of arrows 142, 143, 144, 146a, 146b, and 146c
       (see FIG. 9A, FIG. 9B, FIG. 10A, FIG. 10D, FIG. 10F, and FIG. 10G); and
    d) Providing means to hingedly secure multi-orientational-spline screw and wing-nut 119 to multi-orientational-spline holes 120.

21) Three-hundred-and-sixty-degree-orientational interchangeable-spline system 121 is (or are respectively) for performing the combined functions of its components 22) Crown disk 122 is (or are respectively) for:
   Provides a smooth surface for at least one first three-dimensional-contour-conforming carapace dome panel 103a and at least one second three-dimensional-contour-conforming carapace dome panel 103b to rest upon, in the central-top pressure area, to thereby create a higher central peak, to eliminate rainwater pooling.

23) Interchangeable splines 123 is (or are respectively) for:
   a) Providing support for the preferred shape of three-hundred-and-sixty-degree-orientational-spline-interchangeable carapace 102;
      in the directions of arrows 139
      (see FIG. 5, FIG. 6, FIG. 7B, FIG. 7C, and FIG. 8A);
   b) Providing means to collapse the deployed, large shape of three-hundred-and-sixty-degree-orientational spline-interchangeable carapace system 101 for storage
      (see FIG. 7b, FIG. 7C, and FIG. 8A);
   c) Providing a form for a shape that is desirable for design and aesthetics of three-hundred-and-sixty-degree-orientational spline-interchangeable carapace system 101
      (see FIG. 5, FIG. 6, FIG. 7B, FIG. 7C, and FIG. 8A);
   d) Providing structural means to support three-hundred-and-sixty-degree-orientational spline-interchangeable carapace system 101 from multiple positions along the outer perimeter;
   e) Providing structural means to tilt three-hundred-and-sixty-degree-orientational spline-interchangeable carapace system 101 in multiple degrees from side to side
      in the directions of arrows 146a, 146b, and 146c
      (see FIG. 10D, FIG. 10E, and FIG. 10F);
   f) Providing structural means to swing three-hundred-and-sixty-degree-orientational spline-interchangeable carapace system 101 in multiple degrees horizontally
      in the directions of arrow 145b
      (see FIG. 10D); and
   g) Providing structural means to support three-hundred-and-sixty-degree-orientational spline-interchangeable carapace system 101 from multiple positions along the outer perimeter
      in the directions of arrows 143, 146a, 146b, 146c, 147, 148, 149, and 150
      (see FIG. 11, FIG. 12A, FIG. 12B, and FIG. 12C).

24) Spline-rib hinging intersectors 124 is (or are respectively) for:
   Providing means to hingedly connect interchangeable splines 123 to spline-actuating-and-supporting ribs 131.

25) Upper hub 125 is (or are respectively) for:
   Providing means to hingedly attach multiple interchangeable splines 123 at a center point of upper hub 125 radius.

26) Center-support tube 126 is (or are respectively) for:
   Provides vertical structural support between upper hub 125 and shuttle hub 130.

27) Spline-intersector channels 127 is (or are respectively) for:
   a) Automatically centering interchangeable splines 123;
   b) Docking with interchangeable splines 123;
   c) Preventing three-hundred-and-sixty-degree-orientational spline-interchangeable carapace system 101 from distorting from cross-wind pressure; and
   d) Providing even, centralized pressure against spline-intersector channels 127 when three-hundred-and-sixty-degree-orientational interchangeable-spline system 121 is deployed, to stabilize the three-hundred-and-sixty-degree-orientational interchangeable-spline system 121 structure.

28) Intersector-to-spline screws and holes 128 is (or are respectively) for:
   a) Receiving spline-intersector channels 127;
      in the directions of arrows 151, 152b, 152b, and 153
      (see FIG. 12A, FIG. 12B, and FIG. 12C);
   b) Automatically centering spline-intersector channels 127
      in the directions of arrows 151, 152b, 152b, and 153
      (see FIG. 12A, FIG. 12B, and FIG. 12C);
   c) Preventing three-hundred-and-sixty-degree-orientational spline-interchangeable carapace system 101 from distorting from cross-wind pressure; and
   d) Providing even, centralized pressure against spline-intersector channels 127 when three-hundred-and-sixty-degree-orientational interchangeable-spline system 121 is deployed, to stabilize the three-hundred-and-sixty-degree-orientational interchangeable-spline system 121 structure.

29) Intersector-to-supporting-rib screws and holes 129 is (or are respectively) for:
   Providing means to secure intersector-to-spline screws and holes 128 to shuttle hub 130.

30) Shuttle hub 130 is (or are respectively) for:
   Providing means to hingedly attach multiple interchangeable splines 123 at a center point of shuttle hub 130 radius.

31) Spline-actuating-and-supporting ribs 131 is (or are respectively) for:
   a) Supporting interchangeable splines 123
      in the directions of arrows 143, 146a, 146b, 146c, 147, 148, 149, and 150
      (see FIG. 9A, FIG. 10A, FIG. 11, FIG. 12A, FIG. 12B, and FIG. 12C);
   b) Providing means to actuate interchangeable splines 123 for deployment and contraction of three-hundred-and-sixty-degree-orientational interchangeable-spline system 121
      in the directions of arrows 143, 146a, 147, 148, 149, and 150
      (see FIG. 9A, FIG. 10A, FIG. 11C, and FIG. 11D);
   c) Providing means to form desirable aesthetic shapes of three-hundred-and-sixty-degree-orientational spline-interchangeable carapace system 101; and
   d) Providing geometry to deploy three-hundred-and-sixty-degree-orientational interchangeable-spline system 121 into an erect and locked position.

32) Hub screws 132 is (or are respectively) for:
   Hingedly securing interchangeable splines 123 to upper hub 125, and shuttle hub 130 to spline-actuating-and-supporting ribs 131, respectively.

33) Multi-spline-interchangeable-hanger-attachment holes 133 is (or are respectively) for:
   a) Providing means to screw multi-orientation-spline-supporting hanger 109 to interchangeable splines 123;

b) Providing multiple holes around semi-circumferences of interchangeable splines 123 to mount multi-orientation-spline-supporting hanger 109 thereby allowing multi-orientation-spline-supporting hanger 109 to be selectively positioned in any of multiple positions
in the directions of arrows 143, 145a, 145b, 146a, 146b, 146c, 147, 148, 149, and 150
(see FIG. 9A, FIG. 10A, FIG. 11, FIG. 12A, FIG. 12B, and FIG. 12C);
c) Providing attachment for structural support to vertically tilt three-hundred-and-sixty-degree-orientational spline-interchangeable carapace system 101; and
d) Providing attachment for the suspending of no-sew single-cut three-hundred-and-sixty-degree-orientational spline-interchangeable carapace system 101 from multi-orientation-spline-supporting hanger 109.

Figure 6:
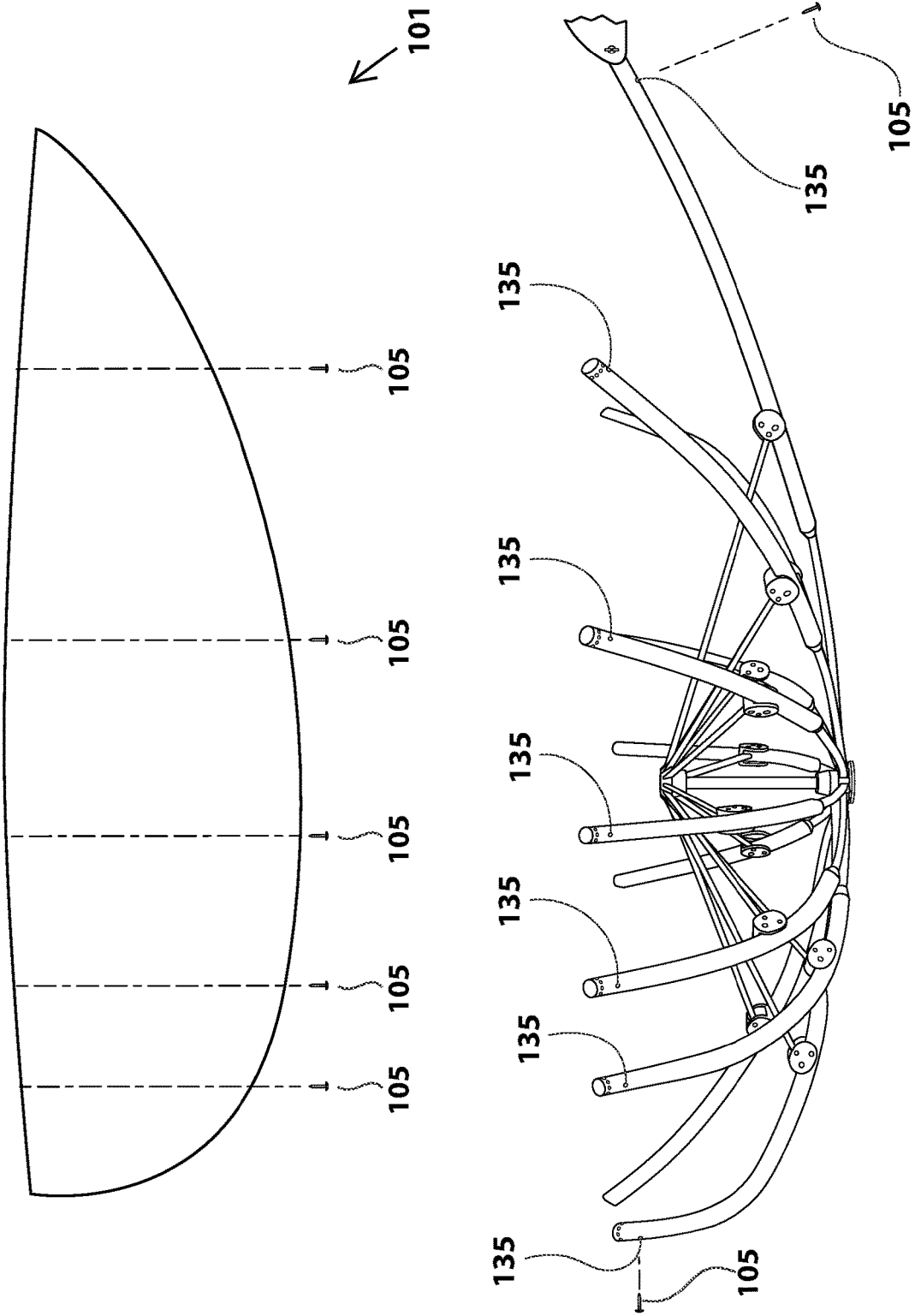
Figure 8B:
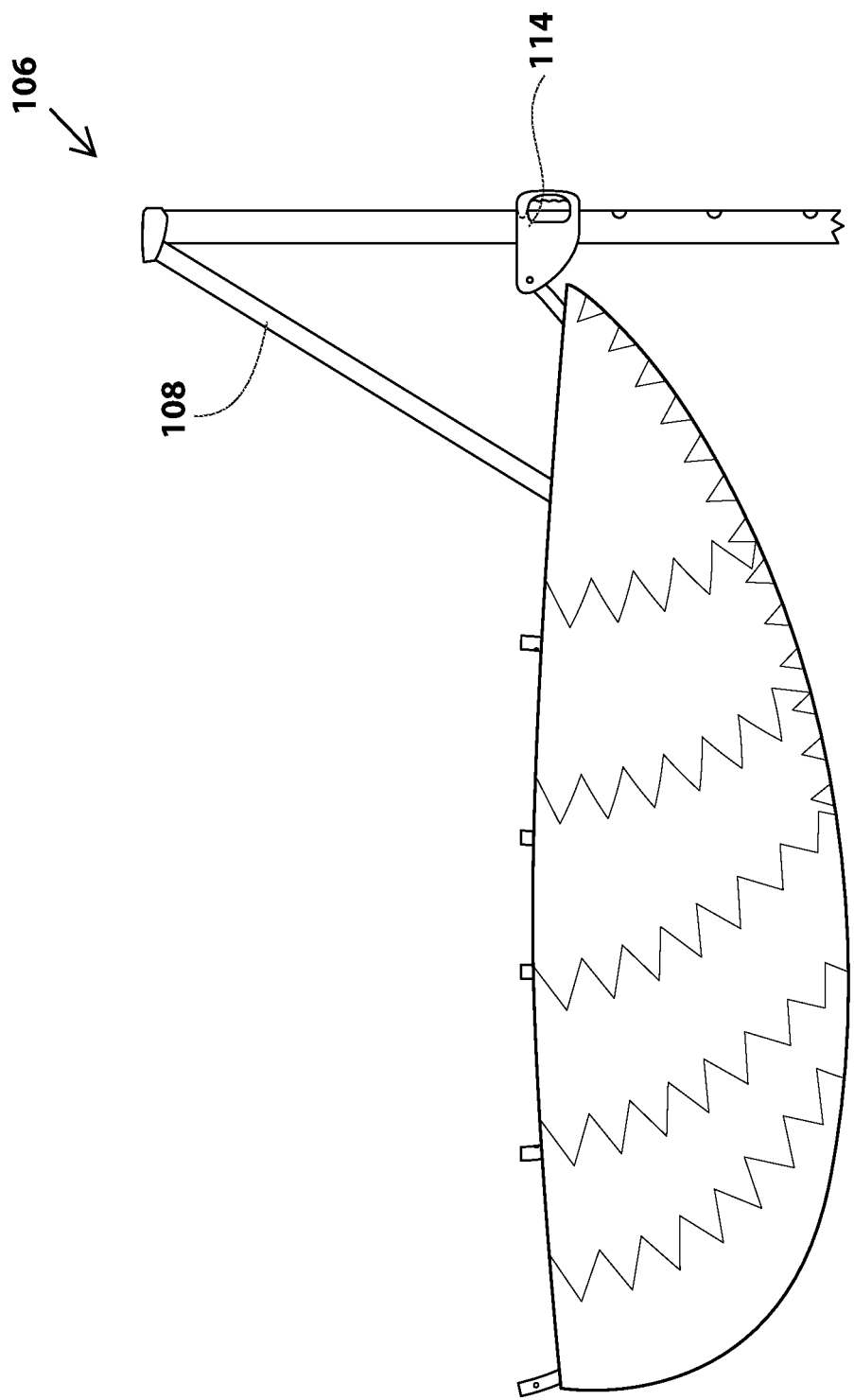
Figure 8C:
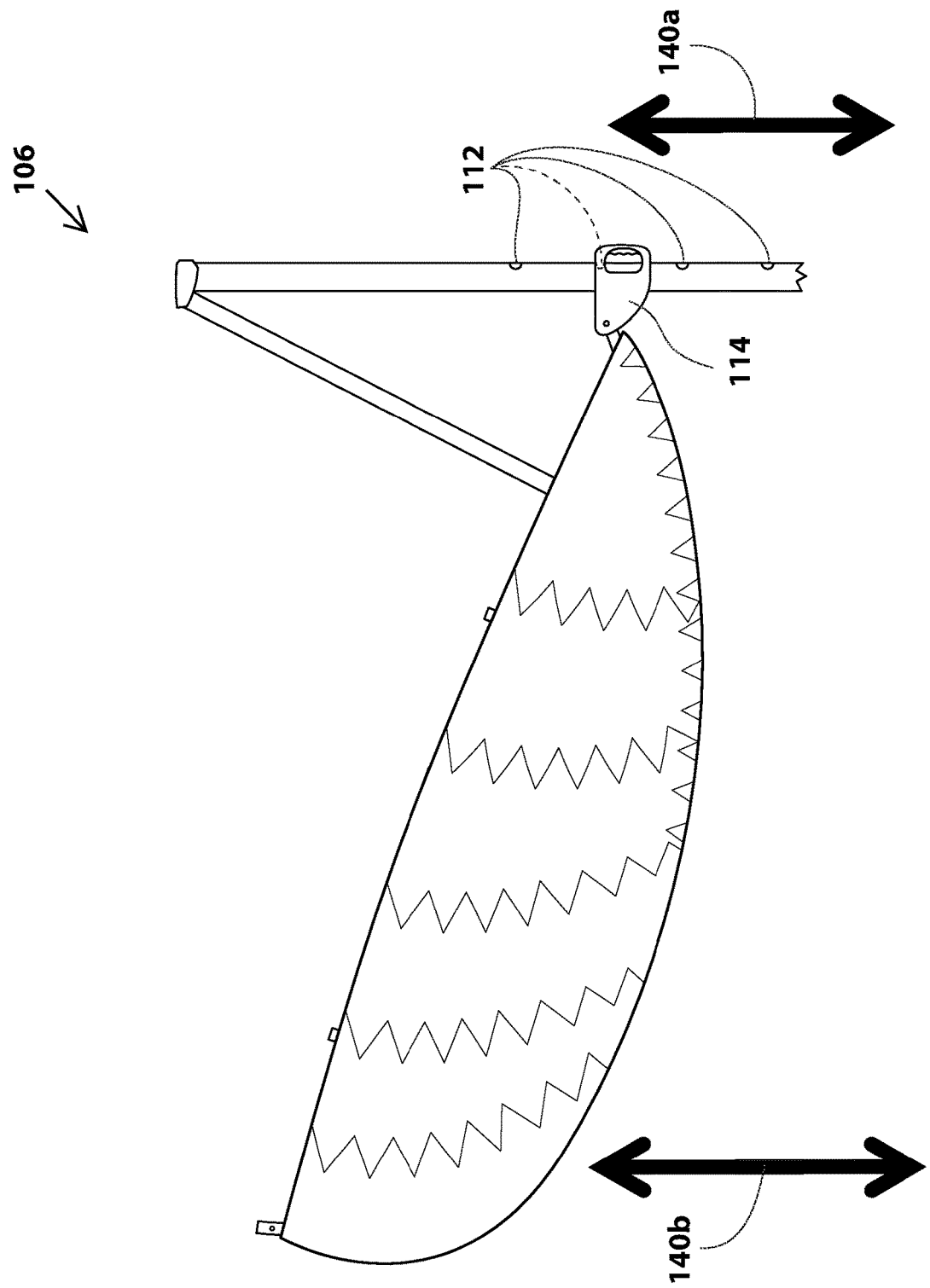
Figure 9B:
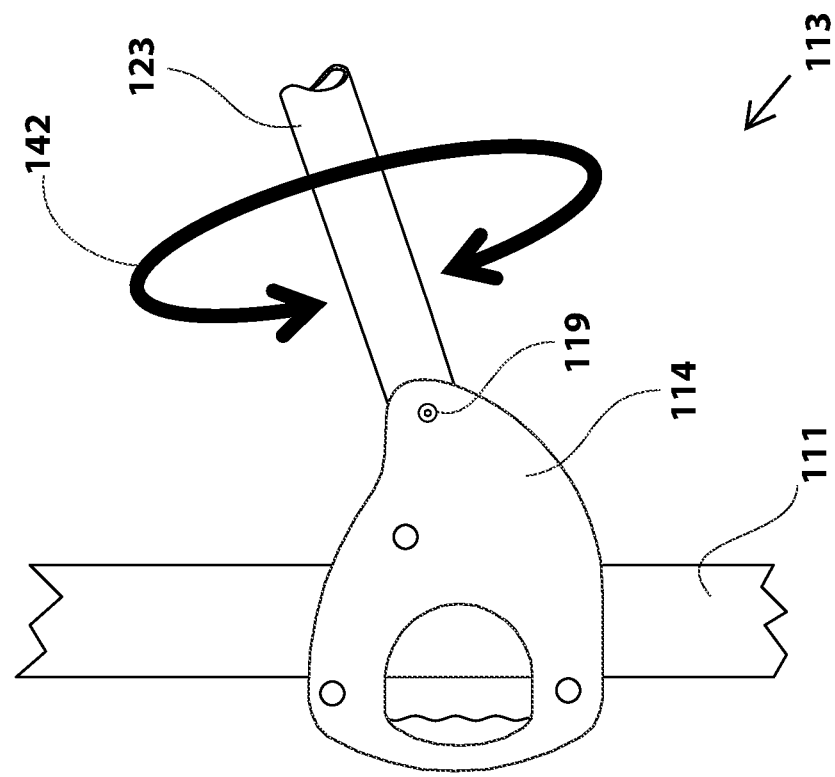
FIG. 9A and FIG. 9B illustrate side views of carapace-sliding-and-tilting multi-orienting snap-locking handle system 113, and specifically the side-to-side tilting functionality of hand-grip opening 118, respectively.
Figure 9A:
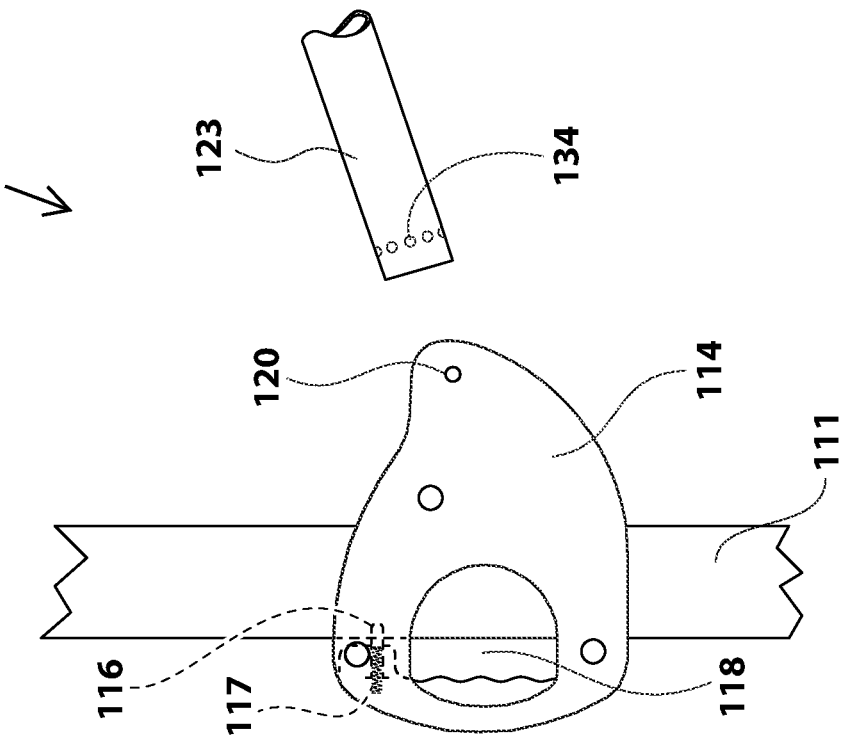
Figure 10C:
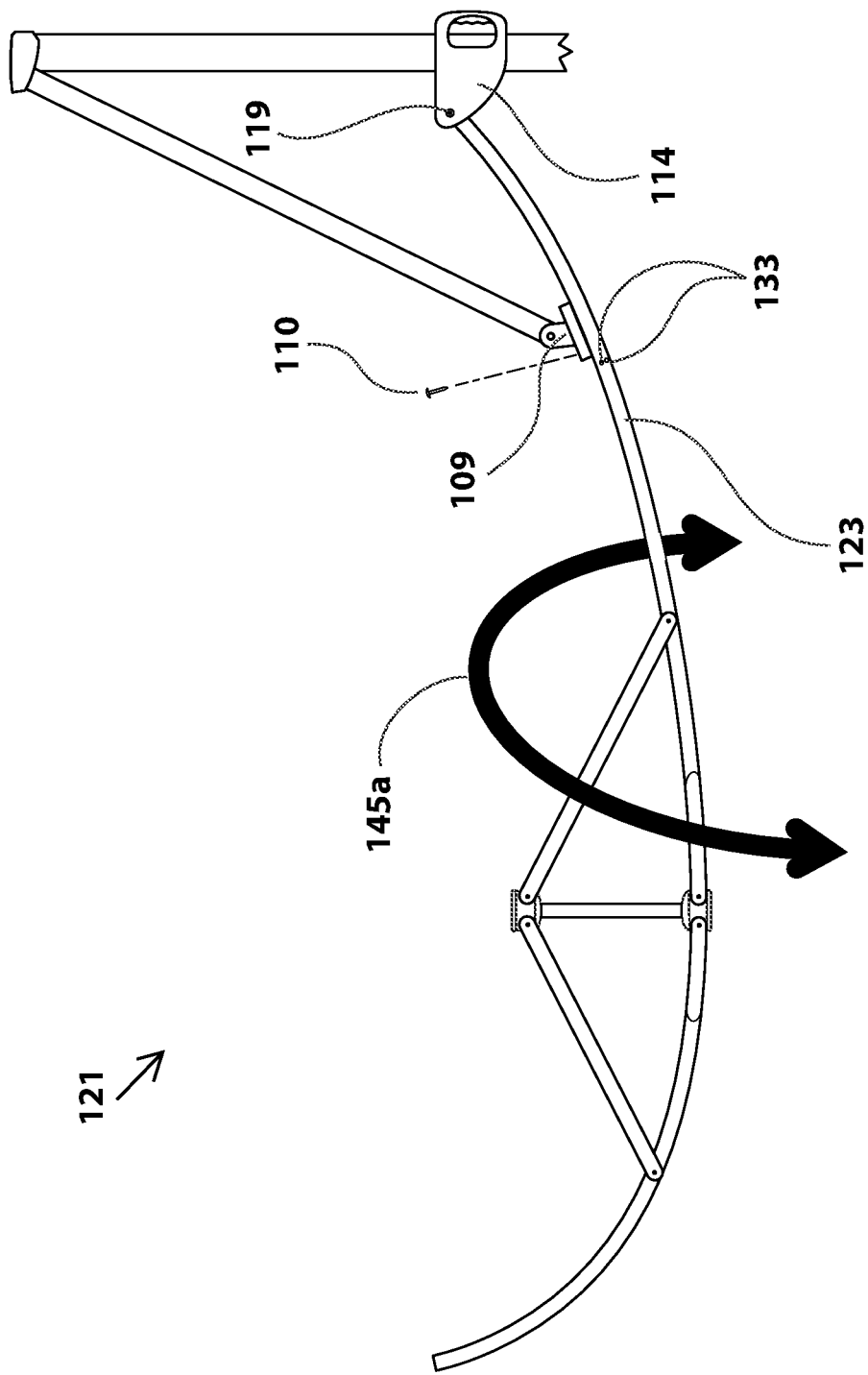
Figure 10D:
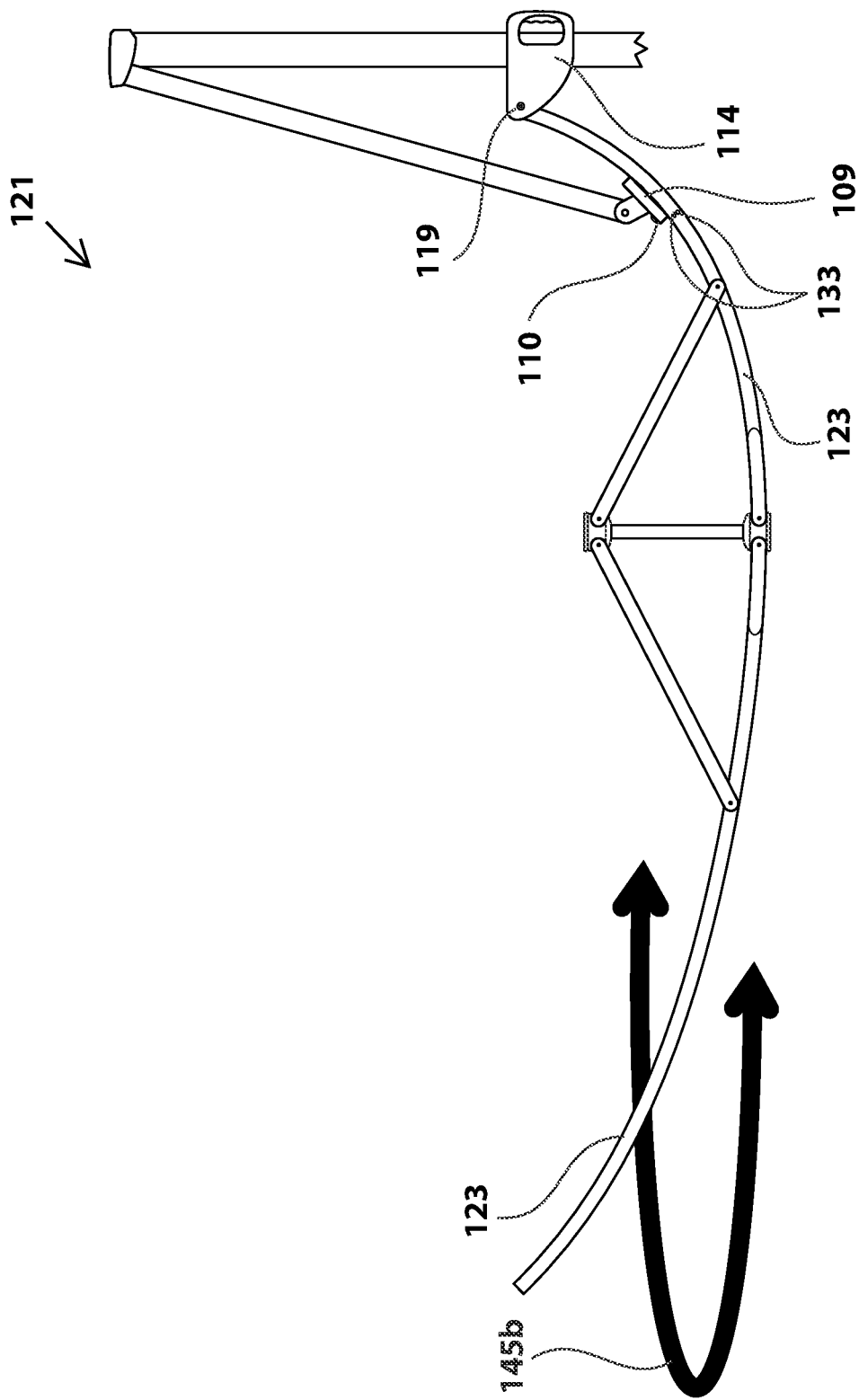
Figure 11:
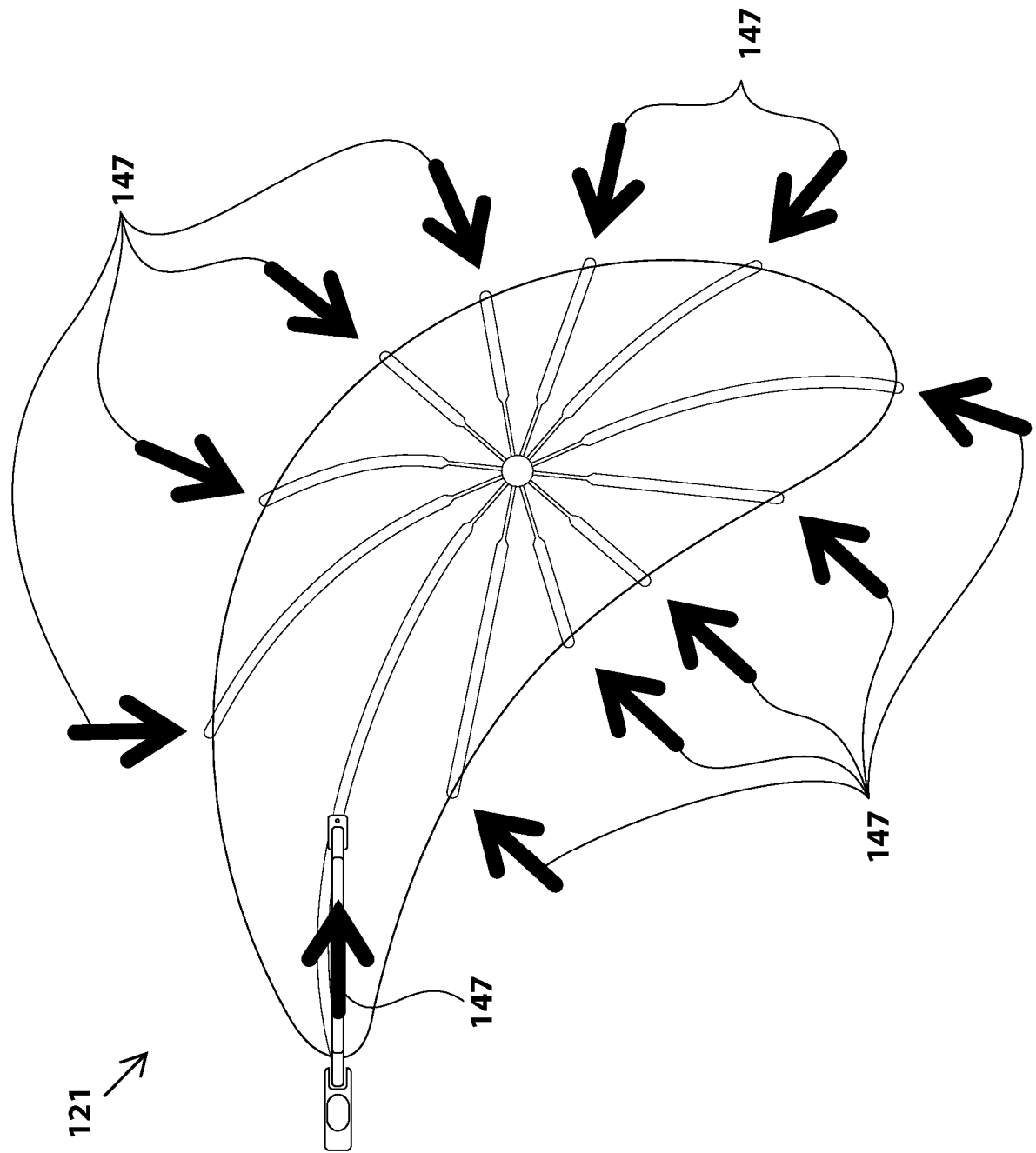
Figure 12A:
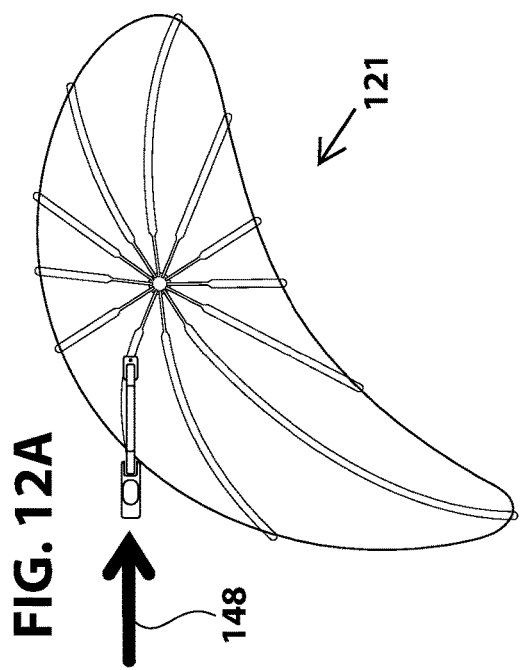
Figure 12C:
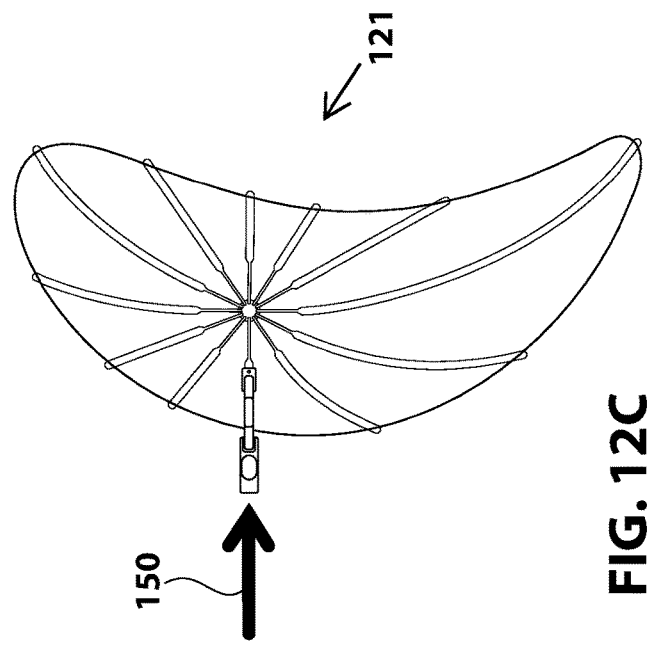
Figure 12B:
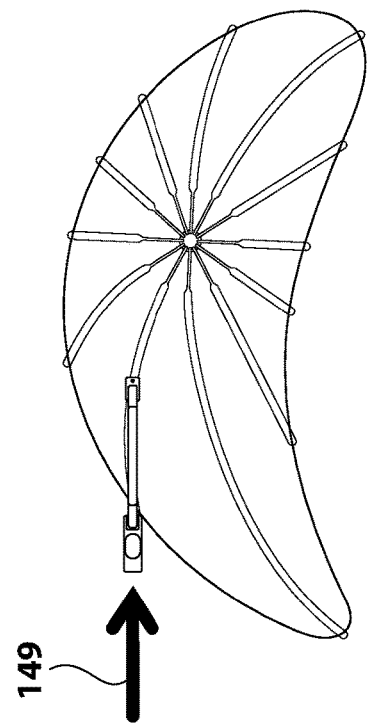

34) Multi-orientational-spline-attachment holes 134 is (or are respectively) for:
a) Providing means to insert multi-orientational-spline screws and wing-nuts 119, thereby securing interchangeable splines 123 to multi-orientational-spline holes 120
in the directions of arrows 143, 145a, 145b, 146a, 146b, 146c, 147, 148, 149, and 150
(see FIG. 9A, FIG. 10A, FIG. 11, FIG. 12A, FIG. 12B, and FIG. 12C);
b) Providing multiple holes around circumferences of interchangeable splines 123, to mount to multi-orientational-spline holes 120, thereby allowing to be selectively secured in any one of multiple vertical positions; and
c) Providing attachment for the suspending of three-hundred-and-sixty-degree-orientational spline-interchangeable carapace system 101 from carapace-tilting-and-multi-orienting snap-locking handle 114 (see FIG. 6, FIG. 7B, and FIG. 8B).

35) Carapace-perimeter-securing-screw holes 135 is (or are respectively) for:
Providing means to carapace-perimeter-securing screws 105 to interchangeable splines 123 (see FIG. 5 and FIG. 6).

36) Slide-lock buckle eyelet 136 is (or are respectively) for:
Detachably connecting to slide-lock buckle button 137.

37) Slide-lock buckle button 137 is (or are respectively) for:
Detachably connecting to slide-lock buckle eyelet 136.

38) Storage strap 138 is (or are respectively) for:
Attaching slide-lock buckle eyelet 136 to slide-lock buckle button 137.

Variation

Figure 17A:
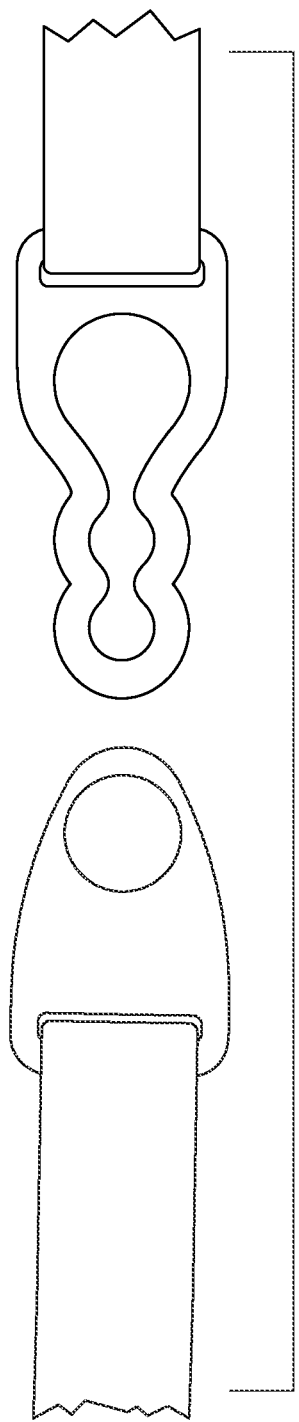
FIG. 17A and FIG. 17B illustrate top views of equivalent variations of slide-lock buckle eyelet 136, slide-lock buckle button 137, and storage strap 138, respectively.
Figure 17B:
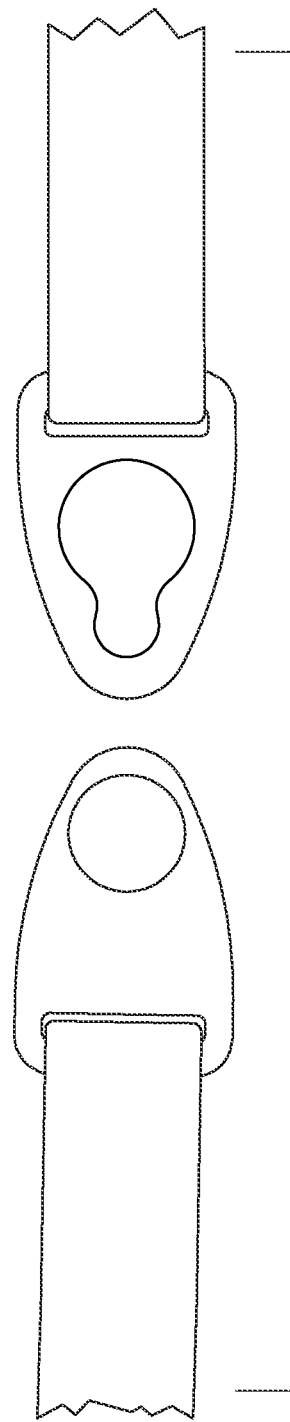

Any component of the five-device-in-one multi-function multi-orientation interchangeable reversible cantilever-stanchion carapace system can have any shape and size. Any component of the five-device-in-one multi-function multi-orientation interchangeable reversible cantilever-stanchion carapace system can be made of any material or any combination of any materials. Any component of the five-device-in-one multi-function multi-orientation interchangeable reversible cantilever-stanchion carapace system can be made of any flexible, semi-flexible, bendable, semi-bendable, rigid, or semi-rigid material(s). Any component of the five-device-in-one multi-function multi-orientation interchangable reversible cantilever-stanchion carapace system can be assembled together in any direction and angle. Any component of the five-device-in-one multi-function multi-orientation interchangable reversible cantilever-stanchion carapace system can be attached to any other component(s) of the five-device-in-one multi-function multi-orientation interchangable reversible cantilever-stanchion carapace system in any direction and angle. Any side of any component of the five-device-in-one multi-function multi-orientation interchangable reversible cantilever-stanchion carapace system can be attached to any side of any other component(s) of the five-device-in-one multi-function multi-orientation interchangable reversible cantilever-stanchion carapace system. For example, no-sew single-cut three-hundred-and-sixty-degree-orientational-spline-interchangeable carapace 102 can have a oval, rectangular, round, triangular, hexagon, concave, or other shape, or may have any number of holes, slits or stitches in any area of the fabric. For another example, FIG. 15A, FIG. 15B, FIG. 15C, FIG. 15D, FIG. 15E, FIG. 16A, FIG. 16B, FIG. 16C, FIG. 16D, FIG. 16E, FIG. 16F, FIG. 16G, FIG. 16H, FIG. 16I, FIG. 16J, and FIG. 16K depict equivalent variations of three-hundred-and-sixty-degree-orientational-spline-interchangeable carapace systems 101, respectively. For example, at least one first three-dimensional-contour-conforming carapace dome panel 103a and at least one second three-dimensional-contour-conforming carapace dome panel 103b can be attached to any side of interchangeable splines 123. For example, interchangeable splines 123 can be assembled right side up or upside own. For further examples, FIG. 17A and FIG. 17B illustrate top views of equivalent variations of slide-lock buckle eyelet 136 and slide-lock buckle button 137, respectively, and can have two or more locking segments, which can also be made from metal, plastic, wood, or any other material, or combinations of materials.

Method of Manufacturing and Using

A Five-Device-In-One Cantilever-Stanchion Carapace System

A method of manufacturing and using a five-device-in-one multi-function multi-orientation interchangable reversible cantilever-stanchion carapace system comprises the steps of:

sewing said at least one first three-dimensional-contour-conforming carapace dome panel 103a and said at least one second three-dimensional-contour-conforming carapace dome panel 103b together such that said at least one water-directing-and-ejecting ball-directing-and-ejecting fruit-directing-and-ejecting transverse seam 103c and said at least one water-directing-and-ejecting ball-directing-and-ejecting fruit-directing-and-ejecting cross-cutting seam 103d are formed therebetween
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts, for converging catched balls therein
to repeatedly change the direction of catched balls to decelerate the rolling speed of catched balls to reduce ball damages to avoid throwing away damaged balls,
for directing rain water therealong,
for directing harvested fruits therealong,
for directing harvested nuts therealong,
for directing game balls therealong,
for forming a collecting cistern to collect rain water to irrigate garden,
for forming a diverting gutter to collect rain water to discharge said rain water away from house balcony and foundation,
for forming a collecting device to collect harvested fruits to save labor and time,
for forming a collecting device to collect harvested nuts to save labor and time,
for forming a collecting device to collect game balls to save labor and time,
for forming a tonneau cover for a truck bed,
for forming a shade cover,
for forming a free-standing projector screen,
for forming a hitch-mountable projector screen, and
for forming a sports-ball blocking device;
attaching said at least one first three-dimensional-contour-conforming carapace dome panel 103a to said interchangeable splines 123
for converging rain water therein,
for converging harvested fruits therein,
for converging harvested nuts therein,
for converging catched balls therein,
for guiding rain water down along said carapace-supporting angled arm 108 and down along said multi-height-adjustable carapace stanchion 111,
for guiding fruits down along said carapace-supporting angled arm 108 and down along said multi-height-adjustable carapace stanchion 111,
for guiding nuts down along said carapace-supporting angled arm 108 and down along said multi-height-adjustable carapace stanchion 111,
for guiding balls down along said carapace-supporting angled arm 108 and down along said multi-height-adjustable carapace stanchion 111;
attaching said at least one second three-dimensional-contour-conforming carapace dome panel 103b to said interchangeable splines 123
for converging rain water therein,
for converging harvested fruits therein,
for converging harvested nuts therein,
for converging catched balls therein,
for guiding rain water down along said carapace-supporting angled arm 108 and down along said multi-height-adjustable carapace stanchion 111,
for guiding fruits down along said carapace-supporting angled arm 108 and down along said multi-height-adjustable carapace stanchion 111,
for guiding nuts down along said carapace-supporting angled arm 108 and down along said multi-height-adjustable carapace stanchion 111,
for guiding balls down along said carapace-supporting angled arm 108 and down along said multi-height-adjustable carapace stanchion 111;
attaching said at least one first outer edges of said at least one first three-dimensional-contour-conforming carapace dome panel 103a to said spline ends of said interchangeable splines 123, respectively;
attaching said at least one second outer edges said at least one second three-dimensional-contour-conforming carapace dome panel 103b to said spline ends of said interchangeable splines 123, respectively;
adjusting said carapace-supporting-arm angle of said carapace-supporting angled arm 108; and locking said carapace-tilting-and-multi-orienting snap-locking handle 114 to said multi-height-adjustable carapace stanchion 111.

Major Advantages of the Invention

The present invention substantially departs from the conventional concepts and methods of the prior art. In doing so, the present invention provides a method of manufacturing and using a five-device-in-one multi-function multi-orientation interchangeable reversible cantilever-stanchion carapace system (having three-hundred-and-sixty-degree-orientational spline-interchangeable carapace system, multi-height-adjustable and spline-supporting stanchion system, carapace-sliding-and-tilting multi-orienting snap-locking handle system, and multi-orientation interchangeable-spline system), having many unique and significant features, functions, and advantages, which overcome all the disadvantages of the prior art, as follows:

1) It is an object of the new invention to provide a method of manufacturing and using a five-device-in-one multi-function multi-orientation interchangeable reversible cantilever-stanchion carapace system, having
at least one water-directing ball-directing fruit-directing dome-bisecting transverse seam 103c.
Therefore, the method of manufacturing and using a five-device-in-one multi-function multi-orientation interchangeable reversible cantilever-stanchion carapace system:
a) Can converge rain water therein,
to repeatedly change the direction of rain water to decelerate the flowing speed of rain water to reduce water splash to avoid damaging vegetables
in the directions of arrows 156 and 157
(see FIG. 1B, FIG. 1C, FIG. 13A, FIG. 13B, and FIG. 13C);
b) Can converge harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and FIG. 14L);
c) Can converge harvested nuts therein,
to repeatedly change the direction of harvested nuts to decelerate the rolling speed of harvested nuts to reduce nut bruises to avoid throwing away nuts
in the direction of arrow 154
(see FIG. 14F and FIG. 14G);
d) Can converge catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);

e) Can direct collected water away from patios and balconies
to keep property and occupants dry
in the direction of arrow 158
(see FIG. 13E, FIG. 13F, FIG. 13G, and FIG. 13H);
f) Can distribute collected water onto crops when attached to the utility holes of a pickup truck
to keep crops irrigated
in the direction of arrow 156
(see FIG. 13A, FIG. 13B, FIG. 13C, and FIG. 13D);
g) Can direct collected fruit to a storage container
to easily gather harvested fruit
in the direction of arrow 153
(see FIG. 14H, FIG. 14I, FIG. 14J, FIGS. 14K, and 14L);
h) Can direct collected nuts to a storage container
to easily gather harvested nuts
in the direction of arrow 154
(see FIG. 14M);
i) Can direct collected whiffle balls to a storage container
to easily gather whiffle balls
in the direction of arrow 151
(see FIG. 14A, FIG. 14B, FIG. 14C, FIG. 14D, and FIG. 14E);
j) Can direct collected golf balls to a storage container
to easily gather golf balls
in the direction of arrow 152
(see FIGS. 14F and 14G); and
k) Can securely connect at least one first three-dimensional-contour-conforming carapace dome panel 103*a* to at least one second three-dimensional-contour-conforming carapace dome panel 103*b*
(see FIG. 7B).

2) It is an object of the new invention to provide a method of manufacturing and using a five-device-in-one multi-function multi-orientation interchangeable reversible cantilever-stanchion carapace system, having
at least one water-directing-and-ejecting ball-directing-and-ejecting fruit-directing-and-ejecting cross-cutting seam 103*d*.
Therefore, the method of manufacturing and using a five-device-in-one multi-function multi-orientation interchangeable reversible cantilever-stanchion carapace system:
a) Can converge rain water therein,
to repeatedly change the direction of rain water to decelerate the flowing speed of rain water to reduce water splash to avoid damaging vegetables
in the directions of arrows 156 and 157
(see FIG. 1B, FIG. 1C, FIG. 13A, FIG. 13B, and FIG. 13C);
b) Can converge harvested fruits therein,
to repeatedly change the direction of harvested fruits to decelerate the rolling speed of harvested fruits to reduce fruit bruises to avoid throwing away fruits
in the direction of arrow 153
(see FIG. 14H, FIG. 14I, FIG. 14J, FIG. 14K, and 14L);
c) Can converge harvested nuts therein,
to repeatedly change the direction of harvested nuts to decelerate the rolling speed of harvested nuts to reduce nut bruises to avoid throwing away nuts
in the direction of arrow 154
(see FIG. 14F and FIG. 14G);
d) Can converge catched balls therein,
to repeatedly change the direction of catched balls to decelerate the rolling speed of catched balls to reduce ball damages to avoid throwing away balls
in the directions of arrows 151 and 152
(see FIG. 14A, FIG. 14B, FIG. 14C, FIG. 14D, and FIG. 14E);
e) Can direct collected water away from patios and balconies
to keep property and occupants dry
in the direction of arrow 158
(see FIG. 13E, FIG. 13F, FIG. 13G, and FIG. 13H);
f) Can distribute collected water onto crops when attached to the utility holes of a pickup truck
to keep crops irrigated
in the direction of arrow 156
(see FIG. 13A, FIG. 13B, FIG. 13C, and FIG. 13D);
g) Can direct collected fruit to a storage container
to easily gather harvested fruit
in the direction of arrow 153
(see FIG. 14H, FIG. 14I, FIG. 14J, FIGS. 14K, and 14L);
h) Can direct collected nuts to a storage container
to easily gather harvested nuts
in the direction of arrow 154
(see FIG. 14M);
i) Can direct collected whiffle balls to a storage container
to easily gather whiffle balls
in the direction of arrow 151
(see FIGS. 13A and 13B);
j) Can direct collected golf balls to a storage container
to easily gather golf balls
in the direction of arrow 152
(see FIG. 14F and FIG. 14G); and
k) Can securely connect at least one first three-dimensional-contour-conforming carapace dome panel 103*a* to at least one second three-dimensional-contour-conforming carapace dome panel 103*b*
(see FIG. 7B).

3) It is an object of the new invention to provide a method of manufacturing and using a five-device-in-one multi-function multi-orientation interchangeable reversible cantilever-stanchion carapace system, having
three-hundred-and-sixty-degree-orientational-spline-interchangeable carapace 102.
Therefore, the method of manufacturing and using a five-device-in-one multi-function multi-orientation interchangeable reversible cantilever-stanchion carapace system:
a) Can cover the perimeter of three-hundred-and-sixty-degree-orientational interchangeable-spline system 121
in the direction of arrow 139
(see FIG. 5, FIG. 6, FIG. 7B, FIG. 7C, and FIG. 8A);

b) Can require a single cut only during manufacturing process, to save labor
(see FIG. 7B);
c) Can require a single cut only during manufacturing process, to save machinery and tooling cost;
d) Can require a single cut only during manufacturing process, to save time
(see FIG. 6 and FIG. 7B);
e) Can require no stitching during manufacturing process, to save labor
(see FIG. 6, and FIG. 7B);
f) Can require no stitching during manufacturing process, to save time.
g) Can provide means to tighten three-hundred-and-sixty-degree-orientational-spline-interchangeable carapace 102 on interchangeable splines 123 being attaching by carapace-perimeter-securing screws 105
in the direction of arrow 139
(see FIG. 5, FIG. 6, and FIG. 8A);
h) Can conform three-hundred-and-sixty-degree-orientational-spline-interchangeable carapace 102 to the shape of three-hundred-and-sixty-degree-orientational interchangeable-spline system 121; and
i) Can provide means to tighten three-hundred-and-sixty-degree-orientational-spline-interchangeable carapace 102 on interchangeable splines 123.

4) It is an object of the new invention to provide a method of manufacturing and using a five-device-in-one multi-function multi-orientation interchangeable reversible cantilever-stanchion carapace system, having three-hundred-and-sixty-degree-orientational-spline-interchangeable carapace 102.
Therefore, the method of manufacturing and using a five-device-in-one multi-function multi-orientation interchangeable reversible cantilever-stanchion carapace system:
  a) Can act as a cistern for irrigation
    (see FIG. 13D, FIG. 13I, and FIG. 13J);
  b) Can act as a water-diverting gutter
    (see FIG. 13E, FIG. 13F, FIG. 13G, and FIG. 14H);
  c) Can act as a falling-fruit-catching device
    (see FIG. 14H, FIG. 13I, FIG. 13J, FIG. 13K, and FIG. 13L);
  d) Can act as a falling-nut catching device
    (see FIG. 14M);
  e) Can act as a whiffle ball and/or badminton shuttlecock catching and/or collecting device
    (see FIG. 14A, FIG. 14B, FIG. 14C, FIG. 14D, and FIG. 14E);
  f) Can act as a golf-ball-catching, -blocking and/or -collecting device
    (see FIG. 14F and FIG. 14G);
  g) Can act as a free-standing projector screen
    (see FIG. 14O and FIG. 14P);
  h) Can act as a truck-bed tonneau cover when attached to a utility hole of a truck bed side to secure items within a truck bed
    (see FIG. 14T);
  i) Can act as a shade cover when attached to a utility hole of a truck bed side to provide shade to occupants
    (see FIG. 14N);
  j) Can act as a whiffle ball and/or badminton shuttlecock blocking and/or deflecting device
    (see FIG. 14Q and FIG. 14R); and
  k) Can act as a tow-hitch mountable projector screen
    (see FIG. 14S).

5) It is an object of the new invention to provide a method of manufacturing and using a five-device-in-one multi-function multi-orientation interchangeable reversible cantilever-stanchion carapace system, having
at least one first three-dimensional-contour-conforming carapace dome panel 103a. Therefore, the method of manufacturing and using a five-device-in-one multi-function multi-orientation interchangeable reversible cantilever-stanchion carapace system:
  a) Can cover the perimeter of three-hundred-and-sixty-degree-orientational interchangeable-spline system 121
    in the direction of arrow 139
    (see FIG. 5, FIG. 6, FIG. 7B, FIG. 7C, and FIG. 8A);
  b) Can require a single cut only during manufacturing process, to save labor
    (see FIG. 7B);
  c) Can require a single cut only during manufacturing process, to save machinery and tooling cost;
  d) Can require a single cut only during manufacturing process, to save time
    (see FIG. 6 and FIG. 7B);
  e) Can require no stitching during manufacturing process, to save labor
    (see FIG. 6, and FIG. 7B);
  f) Can require no stitching during manufacturing process, to save machinery and tooling cost
    (see FIG. 6, and FIG. 8A);
  g) Can require no stitching during manufacturing process, to save time;
  h) Can provide means to tighten three-hundred-and-sixty-degree-orientational-spline-interchangeable carapace 102 on interchangeable splines 123 being attaching by carapace-perimeter-securing screws 105
    in the direction of arrow 139
    (see FIG. 5, FIG. 6, and FIG. 8A);
  i) Can conform three-hundred-and-sixty-degree-orientational-spline-interchangeable carapace 102 to the shape of three-hundred-and-sixty-degree-orientational interchangeable-spline system 121; and
  j) Can provide means to tighten three-hundred-and-sixty-degree-orientational-spline-interchangeable carapace 102 on interchangeable splines 123.

6) It is an object of the new invention to provide a method of manufacturing and using a five-device-in-one multi-function multi-orientation interchangeable reversible cantilever-stanchion carapace system, having
at least one first three-dimensional-contour-conforming carapace dome panel 103a. Therefore, the method of manufacturing and using a five-device-in-one multi-function multi-orientation interchangeable reversible cantilever-stanchion carapace system:
  a) Can act as a cistern for irrigation
    (see FIG. 13D, FIG. 13I, and FIG. 13J);
  b) Can act as a water-diverting gutter
    (see FIG. 13E, FIG. 13F, FIG. 13G, and FIG. 14H);
  c) Can act as a falling-fruit-catching device
    (see FIG. 14H, FIG. 13I, FIG. 13J, FIG. 13K, and FIG. 13L);
  d) Can act as a falling-nut catching device
    (see FIG. 14M);

e) Can act as a whiffle ball and/or badminton shuttle-cock catching and/or collecting device
(see FIG. 14A, FIG. 14B, FIG. 14C, FIG. 14D, and FIG. 14E);
f) Can act as a golf-ball-catching, -blocking and/or -collecting device
(see FIG. 14F and FIG. 14G);
g) Can act as a free-standing projector screen
(see FIG. 14O and FIG. 14P);
h) Can act as a truck-bed tonneau cover when attached to a utility hole of a truck bed side to secure items within a truck bed
(see FIG. 14T);
i) Can act as a shade cover when attached to a utility hole of a truck bed side to provide shade to occupants
(see FIG. 14N);
j) Can act as a whiffle ball and/or badminton shuttle-cock blocking and/or deflecting device
(see FIG. 14Q and FIG. 14R); and
k) Can act as a tow-hitch mountable projector screen
(see FIG. 14S).

7) It is an object of the new invention to provide a method of manufacturing and using a five-device-in-one multi-function multi-orientation interchangeable reversible cantilever-stanchion carapace system, having
at least one second three-dimensional-contour-conforming carapace dome panel 103b. Therefore, the method of manufacturing and using a five-device-in-one multi-function multi-orientation interchangeable reversible cantilever-stanchion carapace system:
a) Can cover the perimeter of three-hundred-and-sixty-degree-orientational interchangeable-spline system 121
in the direction of arrow 139
(see FIG. 5, FIG. 6, FIG. 7B, FIG. 7C, and FIG. 8A);
b) Can require a single cut only during manufacturing process, to save labor
(see FIG. 7B);
c) Can require a single cut only during manufacturing process, to save machinery and tooling cost;
d) Can require a single cut only during manufacturing process, to save time
(see FIG. 6 and FIG. 7B);
e) Can require no stitching during manufacturing process, to save labor
(see FIG. 6, and FIG. 7B);
f) Can require no stitching during manufacturing process, to save machinery and tooling cost
(see FIG. 6, and FIG. 8A);
g) Can require no stitching during manufacturing process, to save time;
h) Can provide means to tighten three-hundred-and-sixty-degree-orientational-spline-interchangeable carapace 102 on interchangeable splines 123 being attaching by carapace-perimeter-securing screws 105
in the direction of arrow 139
(see FIG. 5, FIG. 6, and FIG. 8A);
i) Can conform three-hundred-and-sixty-degree-orientational-spline-interchangeable carapace 102 to the shape of three-hundred-and-sixty-degree-orientational interchangeable-spline system 121; and
j) Can provide means to tighten three-hundred-and-sixty-degree-orientational-spline-interchangeable carapace 102 on interchangeable splines 123.

8) It is an object of the new invention to provide a method of manufacturing and using a five-device-in-one multi-function multi-orientation interchangeable reversible cantilever-stanchion carapace system, having
at least one second three-dimensional-contour-conforming carapace dome panel 103b. Therefore, the method of manufacturing and using a five-device-in-one multi-function multi-orientation interchangeable reversible cantilever-stanchion carapace system:
a) Can act as a cistern for irrigation
(see FIG. 13D, FIG. 13I, and FIG. 13J);
b) Can act as a water-diverting gutter
(see FIG. 13E, FIG. 13F, FIG. 13G, and FIG. 14H);
c) Can act as a falling-fruit-catching device
(see FIG. 14H, FIG. 13I, FIG. 13J, FIG. 13K, and FIG. 13L);
d) Can act as a falling-nut catching device
(see FIG. 14M);
e) Can act as a whiffle ball and/or badminton shuttle-cock catching and/or collecting device
(see FIG. 14A, FIG. 14B, FIG. 14C, FIG. 14D, and FIG. 14E);
f) Can act as a golf-ball-catching, -blocking and/or -collecting device
(see FIG. 14F and FIG. 14G);
g) Can act as a free-standing projector screen
(see FIG. 14O and FIG. 14P);
h) Can act as a truck-bed tonneau cover when attached to a utility hole of a truck bed side to secure items within a truck bed
(see FIG. 14T);
i) Can act as a shade cover when attached to a utility hole of a truck bed side to provide shade to occupants
(see FIG. 14N);
j) Can act as a whiffle ball and/or badminton shuttle-cock blocking and/or deflecting device
(see FIG. 14Q and FIG. 14R); and
k) Can act as a tow-hitch mountable projector screen
(see FIG. 14S).

9) It is another object of the new invention to provide a method of manufacturing and using a five-device-in-one multi-function multi-orientation interchangeable reversible cantilever-stanchion carapace system, having
perimeter-contour-conforming carapace edge 104.
Therefore, the method of manufacturing and using a five-device-in-one multi-function multi-orientation interchangeable reversible cantilever-stanchion carapace system:
a) Can stretch at least one first three-dimensional-contour-conforming carapace dome panel 103a and at least one second three-dimensional-contour-conforming carapace dome panel 103b over three-hundred-and-sixty-degree-orientational interchangeable-spline system 121;
b) Can cover the perimeter of three-hundred-and-sixty-degree-orientational interchangeable-spline system 121
(see FIG. 6, FIG. 7B, FIG. 7C, and FIG. 8A);
c) Can conform three-hundred-and-sixty-degree-orientational-spline-interchangeable carapace 102 to the shape of three-hundred-and-sixty-degree-orientational interchangeable-spline system 121
(see FIG. 6); and
d) Can provide means to tighten three-hundred-and-sixty-degree-orientational-spline-interchangeable carapace 102 on interchangeable splines 123 being attaching by carapace-perimeter-securing screws 105
(see FIG. 5 and FIG. 6).

10) It is another object of the new invention to provide a method of manufacturing and using a five-device-in-one multi-function multi-orientation interchangeable reversible cantilever-stanchion carapace system, having
multi-orientational-spline holes 120.
Therefore, the method of manufacturing and using a five-device-in-one multi-function multi-orientation interchangeable reversible cantilever-stanchion carapace system:
a) Can provide means to insert multi-orientational-spline screw and wing-nut 119 to lock three-hundred-and-sixty-degree-orientational spline-interchangeable carapace system 101 into multiple positions of rotation
in the directions of arrows 142, 143, 144, 145*a*, 145*b*, 146*a*, 146*b*, and 146*c*
(see FIG. 9A, FIG. 9B, FIG. 10A, FIG. 10C, FIG. 10D, FIG. 10E, FIG. 10F, and FIG. 10G);
b) Can provide means to rotate three-hundred-and-sixty-degree-orientational spline-interchangeable carapace system 101 side to side
in the directions of arrows 144, 145*a*, 145*b*, 146*a*, 146*b*, and 146*c* (see FIG. 9A, FIG. 9B, FIG. 10A, FIG. 10B, FIG. 10C, FIG. 10D, FIG. 10E, FIG. 10F, and FIG. 10G);
c) Can provide means to lock three-hundred-and-sixty-degree-orientational spline-interchangeable carapace system 101 into multiple positions of rotation
in the directions of arrows 142, 143, 144, 146*a*, 146*b*, and 146*c* (see FIG. 9A, FIG. 9B, FIG. 10A, FIG. 10D, FIG. 10F, and FIG. 10G); and
d) Can provide means to hingedly secure multi-orientational-spline screw and wing-nut 119 to multi-orientational-spline holes 120.

11) It is a further object of the new invention to provide a method of manufacturing and using a five-device-in-one multi-function multi-orientation interchangeable reversible cantilever-stanchion carapace system, having
interchangeable splines 123.
Therefore, the method of manufacturing and using a five-device-in-one multi-function multi-orientation interchangeable reversible cantilever-stanchion carapace system:
a) Can provide support for the preferred shape of three-hundred-and-sixty-degree-orientational-spline-interchangeable carapace 102;
in the direction of arrow 139
(see FIG. 5, FIG. 6, FIG. 7B, FIG. 7C, and FIG. 8A);
b) Can provide means to collapse the deployed, large shape of three-hundred-and-sixty-degree-orientational spline-interchangeable carapace system 101 for storage
(see FIG. 7*b*, FIG. 7C, and FIG. 8A);
c) Can provide a form for a shape that is desirable for design and aesthetics of three-hundred-and-sixty-degree-orientational spline-interchangeable carapace system 101
(see FIG. 5, FIG. 6, FIG. 7B, FIG. 7C, and FIG. 8A);
d) Can provide structural means to support three-hundred-and-sixty-degree-orientational spline-interchangeable carapace system 101 from multiple positions along the outer perimeter;
e) Can provide structural means to tilt three-hundred-and-sixty-degree-orientational spline-interchangeable carapace system 101 in multiple degrees from side to side; and
in the directions of arrows 146*a*, 146*b*, and 146*c*
(see FIG. 10D, FIG. 10E, and FIG. 10F);
f) Can provide structural means to swing three-hundred-and-sixty-degree-orientational spline-interchangeable carapace system 101 in multiple degrees horizontally; and
in the direction of arrow 145*b*
(see FIG. 10D); and
g) Can provide structural means to support three-hundred-and-sixty-degree-orientational spline-interchangeable carapace system 101 from multiple positions along the outer perimeter.
in the directions of arrows 143, 146*a*, 146*b*, 146*c*, 147, 148, 149, and 150
(see FIG. 11, FIG. 12A, FIG. 12B, and FIG. 12C).

12) It is an even further object of the new invention to provide a method of manufacturing and using a five-device-in-one multi-function multi-orientation interchangeable reversible cantilever-stanchion carapace system, having
spline-actuating-and-supporting ribs 131.
Therefore, the method of manufacturing and using a five-device-in-one multi-function multi-orientation interchangeable reversible cantilever-stanchion carapace system:
a) Can support interchangeable splines 123
in the directions of arrows 143, 146*a*, 146*b*, 146*c*, 147, 148, 149, and 150
(see FIG. 9A, FIG. 10A, FIG. 11, FIG. 12A, FIG. 12B, and FIG. 12C);
b) Can provide means to actuate interchangeable splines 123 for deployment and contraction of three-hundred-and-sixty-degree-orientational interchangeable-spline system 121
in the directions of arrows 143, 146*a*, 147, 148, 149, and 150
(see FIG. 9A, FIG. 10A, FIG. 11C, and FIG. 11D);
c) Can provide means to form desirable aesthetic shapes of three-hundred-and-sixty-degree-orientational spline-interchangeable carapace system 101; and
d) Can provide geometry to deploy three-hundred-and-sixty-degree-orientational interchangeable-spline system 121 into an erect and locked position.

13) It is another object of the new invention to provide a method of manufacturing and using a five-device-in-one multi-function multi-orientation interchangeable reversible cantilever-stanchion carapace system, having
multi-spline-interchangeable-hanger-attachment holes 133.

Therefore, the method of manufacturing and using a five-device-in-one multi-function multi-orientation interchangeable reversible cantilever-stanchion carapace system:
   a) Can provide means to screw multi-orientation-spline-supporting hanger 109 to interchangeable splines 123;
   b) Can provide multiple holes around semi-circumferences of interchangeable splines 123 to mount multi-orientation-spline-supporting hanger 109 thereby allowing multi-orientation-spline-supporting hanger 109 to be selectively positioned in any of multiple positions
      in the directions of arrows 143, 145a, 145b, 146a, 146b, 146c, 147, 148, 149, and 150
      (see FIG. 9A, FIG. 10A, FIG. 11, FIG. 12A, FIG. 12B, and FIG. 12C);
   c) Can provide attachment for structural support to vertically tilt three-hundred-and-sixty-degree-orientational spline-interchangeable carapace system 101; and
   d) Can provide attachment for the suspending of no-sew single-cut three-hundred-and-sixty-degree-orientational spline-interchangeable carapace system 101 from multi-orientation-spline-supporting hanger 109.

14) It is yet another object of the new invention to provide a method of manufacturing and using a five-device-in-one multi-function multi-orientation interchangeable reversible cantilever-stanchion carapace system, having
multi-orientational-spline-attachment holes 134.

Therefore, the method of manufacturing and using a five-device-in-one multi-function multi-orientation interchangeable reversible cantilever-stanchion carapace system:
   a) Can provide means to insert multi-orientational-spline screws and wing-nuts 119, thereby securing interchangeable splines 123 to multi-orientational-spline holes 120
      in the directions of arrows 143, 145a, 145b, 146a, 146b, 146c, 147, 148, 149, and 150 (see FIG. 9A, FIG. 10A, FIG. 11, FIG. 12A, FIG. 12B, and FIG. 12C);
   b) Can provide multiple holes around circumferences of interchangeable splines 123, to mount to multi-orientational-spline holes 120, thereby allowing to be selectively secured in any one of multiple vertical positions; and
   c) Can provide attachment for the suspending of three-hundred-and-sixty-degree-orientational spline-interchangeable carapace system 101 from carapace-tilting-and-multi-orienting snap-locking handle 114
      (see FIG. 6, FIG. 7B, and FIG. 8B).

What is claimed is:
1. A method of manufacturing and using a five-device-in-one multi-function multi-orientation interchangable reversible cantilever-stanchion carapace system,
   providing said five-device-in-one multi-function multi-orientation interchangable reversible cantilever-stanchion carapace system,
   said five-device-in-one multi-function multi-orientation interchangable reversible cantilever-stanchion carapace system comprising:
      at least one first three-dimensional-contour-conforming carapace dome panel,
         having at least one first outer edge,
         said at least one first three-dimensional-contour-conforming carapace dome panel
            for acting as a cistern for irrigation,
            for acting as a water-diverting gutter,
            for acting as a falling-fruit-catching device,
            for acting as a falling-nut-catching device,
            for acting as a ball-or-badminton-shuttlecock-catching device,
            for acting as a ball-blocking device,
            for acting as a ball-deflecting device,
            for acting as a free-standing projector screen,
            for acting as a truck-bed tonneau cover when attached to a utility hole of a truck bed side
               to secure items within said truck bed,
            for acting as a shade cover when attached to a utility hole of a truck bed side
               to provide shade to occupants, and
            for acting as a tow-hitch-mountable projector screen;
      at least one second three-dimensional-contour-conforming carapace dome panel
         having at least one second outer edge,
         said at least one second three-dimensional-contour-conforming carapace dome panel sewn to said at least one first three-dimensional-contour-conforming carapace dome panel,
         said at least one second three-dimensional-contour-conforming carapace dome panel
            for acting as a cistern for irrigation,
            for acting as a water-diverting gutter,
            for acting as a falling-fruit-catching device,
            for acting as a falling-nut-catching device,
            for acting as a ball-or-badminton-shuttlecock-catching device,
            for acting as a ball-blocking device,
            for acting as a ball-deflecting device,
            for acting as a free-standing projector screen,
            for acting as a truck-bed tonneau cover when attached to a utility hole of a truck bed side
               to secure items within said truck bed,
            for acting as a shade cover when attached to a utility hole of a truck bed side
               to provide shade to occupants, and
            for acting as a tow-hitch-mountable projector screen;
      at least one water-directing-and-ejecting ball-directing-and-ejecting fruit-directing-and-ejecting transverse seam
         formed between said at least one first three-dimensional-contour-conforming carapace dome panel and said at least one second three-dimensional-contour-conforming carapace dome panel,
         said at least one water-directing-and-ejecting ball-directing fruit-directing dome-bisecting transverse seam
            for converging rain water therein,
               to repeatedly change the direction of rain water to decelerate the flowing speed of rain water to reduce water splash to avoid damaging irrigated vegetables,
            for converging harvested fruits therein,
               to repeatedly change the direction of harvested fruits to decelerate the rolling speed of harvested fruits to reduce fruit bruises to avoid throwing away bruised fruits, for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of catched balls to decelerate the rolling speed of catched balls to reduce ball damages to avoid throwing away damaged balls,
for directing collected water away from patios and balconies
to keep said patios and balconies dry,
for distributing collected water onto crops when attached to the utility holes
of a pickup truck
to keep said crops irrigated,
for directing harvested fruit to a storage container
to collect harvested fruit and
to save time and labor,
for directing harvested nuts to a storage container
to collect harvested nuts and
to save time and labor,
for directing catched balls to a storage container
to collect catched balls and
to save time and labor;
at least one water-directing-and-ejecting ball-directing-and-ejecting fruit-directing-and-ejecting cross-cutting seam
formed between said at least one first three-dimensional-contour-conforming carapace dome panel and said at least one second three-dimensional-contour-conforming carapace dome panel,
said at least one first three-dimensional-contour-conforming carapace dome panel
for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of catched balls to decelerate the rolling speed of catched balls to reduce ball damages to avoid throwing away damaged balls,
for directing collected water away from patios and balconies
to keep said patios and balconies dry,
for distributing collected water onto crops when attached to the utility holes
of a pickup truck
to keep said crops irrigated,
for directing harvested fruit to a storage container
to collect harvested fruit and
to save time and labor,
for directing harvested nuts to a storage container
to collect harvested nuts and
to save time and labor,
for directing catched balls to a storage container
to collect catched balls and
to save time and labor;
a carapace-supporting-arm intersector;
a carapace-supporting angled arm
having a carapace-supporting-arm angle,
said carapace-supporting angled arm
hingedly attached to said carapace-supporting-arm intersector;
a multi-height-adjustable carapace stanchion
attached to said carapace-supporting-arm intersector;
a carapace-tilting-and-multi-orienting snap-locking handle
lockably slid on said multi-height-adjustable carapace stanchion;
a plurality of interchangeable splines
having a plurality of spline ends,
said interchangeable splines hingedly attached to said carapace-supporting angled arm and to said carapace-tilting-and-multi-orienting snap-locking handle;
an upper hub
hingedly attached to said interchangeable splines,
a shuttle hub;
a center-support tube
attached to said upper hub and
slidably attached to said shuttle hub; and
a plurality of spline-actuating-and-supporting ribs
hingedly attached to interchangeable splines and to said shuttle hub,
said spline-actuating-and-supporting ribs
for supporting said interchangeable splines, and
for actuating said interchangeable splines
to deploy and to contract said interchangeable splines,
said method of manufacturing and using a multi-function multi-orientation interchangable reversible cantilever-stanchion carapace system comprising the steps of:
sewing said at least one first three-dimensional-contour-conforming carapace dome panel and said at least one second three-dimensional-contour-conforming carapace dome panel together
such that
said at least one water-directing-and-ejecting ball-directing-and-ejecting fruit-directing-and-ejecting transverse seam and said at least one water-directing-and-ejecting ball-directing-and-ejecting fruit-directing-and-ejecting cross-cutting seam are formed therebetween
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts, for converging catched balls therein
to repeatedly change the direction of catched balls
to decelerate the rolling speed of catched balls
to reduce ball damages to avoid throwing away damaged balls,
for directing rain water therealong,
for directing harvested fruits therealong,
for directing harvested nuts therealong,
for directing game balls therealong,
for forming a collecting cistern to collect rain water
to irrigate garden,
for forming a diverting gutter to collect rain water
to discharge said rain water away from house balcony and foundation,
for forming a collecting device to collect harvested fruits
to save labor and time,
for forming a collecting device to collect harvested nuts
to save labor and time,
for forming a collecting device to collect game balls
to save labor and time,
for forming a tonneau cover for a truck bed,
for forming a shade cover,
for forming a free-standing projector screen,
for forming a hitch-mountable projector screen, and
for forming a sports-ball blocking device;
attaching said at least one first three-dimensional-contour-conforming carapace dome panel to said interchangeable splines
for converging rain water therein,
for converging harvested fruits therein,
for converging harvested nuts therein,
for converging catched balls therein,
for guiding rain water down along said carapace-supporting angled arm and down along said multi-height-adjustable carapace stanchion,
for guiding fruits down along said carapace-supporting angled arm
and down along said multi-height-adjustable carapace stanchion,
for guiding nuts down along said carapace-supporting angled arm
and down along said multi-height-adjustable carapace stanchion,
for guiding balls down along said carapace-supporting angled arm
and down along said multi-height-adjustable carapace stanchion;
attaching said at least one second three-dimensional-contour-conforming carapace dome panel to said interchangeable splines
for converging rain water therein,
for converging harvested fruits therein,
for converging harvested nuts therein,
for converging catched balls therein,
for guiding rain water down along said carapace-supporting angled arm and down along said multi-height-adjustable carapace stanchion,
for guiding fruits down along said carapace-supporting angled arm
and down along said multi-height-adjustable carapace stanchion,
for guiding nuts down along said carapace-supporting angled arm
and down along said multi-height-adjustable carapace stanchion,
for guiding balls down along said carapace-supporting angled arm
and down along said multi-height-adjustable carapace stanchion;
attaching said at least one first outer edge of said at least one first three-dimensional-contour-conforming carapace dome panel to said spline ends of said interchangeable splines, respectively;
attaching said at least one second outer edge of said at least one second three-dimensional-contour-conforming carapace dome panel to said spline ends of said interchangeable splines, respectively;
adjusting said carapace-supporting-arm angle of said carapace-supporting angled arm; and
locking said carapace-tilting-and-multi-orienting snap-locking handle to said multi-height-adjustable carapace stanchion.

2. The method of manufacturing and using a five-device-in-one multi-function multi-orientation interchangable reversible cantilever-stanchion carapace system of claim 1,
further comprising:
a slide-lock buckle eyelet;
a slide-lock buckle button; and
a storage strap
attached to said slide-lock buckle eyelet and said slide-lock buckle button,
wherein
said slide-lock buckle eyelet
is for detachably connecting to said slide-lock buckle button,
said slide-lock buckle button
is for detachably connecting to said slide-lock buckle eyelet
said storage strap
is for attaching said slide-lock buckle eyelet to said slide-lock buckle button, and
is for bundling said at least one first three-dimensional-contour-conforming carapace dome panel and said at least one second three-dimensional-contour-conforming carapace dome panel to said carapace-supporting angled arm and said multi-height-adjustable carapace stanchion.

3. The method of manufacturing and using a five-device-in-one multi-function multi-orientation interchangable reversible cantilever-stanchion carapace system of claim 2,
wherein
said slide-lock buckle eyelet
is formed into a figure-eight shape.

4. The method of manufacturing and using a five-device-in-one multi-function multi-orientation interchangable reversible cantilever-stanchion carapace system of claim 2,
wherein
said slide-lock buckle eyelet
is made of plastic.

5. The method of manufacturing and using a five-device-in-one multi-function multi-orientation interchangable reversible cantilever-stanchion carapace system of claim 2,
wherein
said storage strap
is made of nylon or fabric material.

6. The method of manufacturing and using a five-device-in-one multi-function multi-orientation interchangable reversible cantilever-stanchion carapace system of claim 1,
wherein
said at least one first three-dimensional-contour-conforming carapace dome panel
is made of canvas, nylon, or fabric material.

7. The method of manufacturing and using a five-device-in-one multi-function multi-orientation interchangable reversible cantilever-stanchion carapace system of claim 1, wherein
said at least one second three-dimensional-contour-conforming carapace dome panel
is made of canvas, nylon, or fabric material.

8. The method of manufacturing and using a five-device-in-one multi-function multi-orientation interchangable reversible cantilever-stanchion carapace system of claim 1, wherein
said at least one water-directing-and-ejecting ball-directing-and-ejecting fruit-directing-and-ejecting transverse seam and
said at least one water-directing-and-ejecting ball-directing-and-ejecting fruit-directing-and-ejecting cross-cutting seam
each have a zigzag shape.

9. The method of manufacturing and using a five-device-in-one multi-function multi-orientation interchangable reversible cantilever-stanchion carapace system of claim 1, wherein
said interchangeable splines and said spline-actuating-and-supporting ribs
are each made of metal.

10. A method of manufacturing and using a five-device-in-one multi-function multi-orientation cantilever-stanchion carapace system,
providing said five-device-in-one multi-function multi-orientation cantilever-stanchion carapace system,
said five-device-in-one multi-function multi-orientation cantilever-stanchion carapace system comprising:
at least one first three-dimensional-contour-conforming carapace dome panel,
having at least one first outer edge,
said at least one first three-dimensional-contour-conforming carapace dome panel
for acting as a cistern for irrigation,
for acting as a water-diverting gutter,
for acting as a falling-fruit-catching device,
for acting as a falling-nut-catching device,
for acting as a ball-or-badminton-shuttlecock-catching device,
for acting as a ball-blocking device,
for acting as a ball-deflecting device,
for acting as a free-standing projector screen,
for acting as a truck-bed tonneau cover when attached to a utility hole of a truck bed side
to secure items within said truck bed,
for acting as a shade cover when attached to a utility hole of a truck bed side
to provide shade to occupants, and
for acting as a tow-hitch-mountable projector screen;
at least one second three-dimensional-contour-conforming carapace dome panel
having at least one second outer edge,
said at least one second three-dimensional-contour-conforming carapace dome panel sewn to said at least one first three-dimensional-contour-conforming carapace dome panel,
said at least one second three-dimensional-contour-conforming carapace dome panel
for acting as a cistern for irrigation,
for acting as a water-diverting gutter,
for acting as a falling-fruit-catching device,
for acting as a falling-nut-catching device,
for acting as a ball-or-badminton-shuttlecock-catching device,
for acting as a ball-blocking device,
for acting as a ball-deflecting device,
for acting as a free-standing projector screen,
for acting as a truck-bed tonneau cover when attached to a utility hole of a truck bed side
to secure items within said truck bed,
for acting as a shade cover when attached to a utility hole of a truck bed side
to provide shade to occupants, and
for acting as a tow-hitch-mountable projector screen;
at least one water-directing-and-ejecting ball-directing-and-ejecting fruit-directing-and-ejecting transverse seam
formed between said at least one first three-dimensional-contour-conforming carapace dome panel and said at least one second three-dimensional-contour-conforming carapace dome panel,
said at least one water-directing-and-ejecting ball-directing fruit-directing dome-bisecting transverse seam
for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of catched balls to decelerate the rolling speed of catched balls to reduce ball damages to avoid throwing away damaged balls,
for directing collected water away from patios and balconies
to keep said patios and balconies dry,
for distributing collected water onto crops when attached to the utility holes
of a pickup truck
to keep said crops irrigated,
for directing harvested fruit to a storage container
to collect harvested fruit and
to save time and labor,
for directing harvested nuts to a storage container
to collect harvested nuts and
to save time and labor,
for directing catched balls to a storage container
to collect catched balls and
to save time and labor;
at least one water-directing-and-ejecting ball-directing-and-ejecting fruit-directing-and-ejecting cross-cutting seam
formed between said at least one first three-dimensional-contour-conforming carapace dome panel and said at least one second three-dimensional-contour-conforming carapace dome panel,
said at least one first three-dimensional-contour-conforming carapace dome panel for converging rain water therein,
to repeatedly change the direction of rain water to decelerate the flowing speed of rain water to reduce water splash to avoid damaging irrigated vegetables,
for converging harvested fruits therein,
to repeatedly change the direction of harvested fruits to decelerate the rolling speed of harvested fruits to reduce fruit bruises to avoid throwing away bruised fruits,
for converging harvested nuts therein,
to repeatedly change the direction of harvested nuts to decelerate the rolling speed of harvested nuts to reduce nut bruises to avoid throwing away bruised nuts,
for converging catched balls therein,
to repeatedly change the direction of catched balls to decelerate the rolling speed of catched balls to reduce ball damages to avoid throwing away damaged balls,
for directing collected water away from patios and balconies
to keep said patios and balconies dry,
for distributing collected water onto crops when attached to the utility holes
of a pickup truck
to keep said crops irrigated,
for directing harvested fruit to a storage container
to collect harvested fruit and
to save time and labor,
for directing harvested nuts to a storage container
to collect harvested nuts and
to save time and labor,
for directing catched balls to a storage container
to collect catched balls and
to save time and labor;
a carapace-supporting angled arm
having a carapace-supporting-arm angle,
a carapace stanchion
hingedly attached to said carapace-supporting angled arm;
a carapace-tilting-and-multi-orienting snap-locking handle
lockably slid on said carapace stanchion;
a plurality of splines
having a plurality of spline ends,
said splines hingedly attached to said carapace-supporting
angled arm and to said carapace-tilting-and-multi-orienting snap-locking handle;
an upper hub
hingedly attached to said interchangeable splines,
a shuttle hub;
a center-support tube
attached to said upper hub and
slidably attached to said shuttle hub; and
a plurality of spline-actuating-and-supporting ribs
hingedly attached to said splines and to said shuttle hub,
said spline-actuating-and-supporting ribs
for supporting said splines, and
for actuating said splines
to deploy and to contract said splines,
said method of manufacturing and using a multi-function multi-orientation interchangable reversible cantilever-stanchion carapace system comprising the steps of:

sewing said at least one first three-dimensional-contour-conforming carapace dome panel and said at least one second three-dimensional-contour-conforming carapace dome panel together
such that
said at least one water-directing-and-ejecting ball-directing-and-ejecting fruit-directing-and-ejecting transverse seam and said at least one water-directing-and-ejecting ball-directing-and-ejecting fruit-directing-and-ejecting cross-cutting seam are formed therebetween
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts,
for converging catched balls therein
to repeatedly change the direction of catched balls to decelerate the rolling speed of catched balls to reduce ball damages to avoid throwing away damaged balls,
for directing rain water therealong,
for directing harvested fruits therealong,
for directing harvested nuts therealong,
for directing game balls therealong,
for forming a collecting cistern to collect rain water
to irrigate garden,
for forming a diverting gutter to collect rain water
to discharge said rain water away from house balcony and foundation,
for forming a collecting device to collect harvested fruits
to save labor and time,
for forming a collecting device to collect harvested nuts
to save labor and time,
for forming a collecting device to collect game balls
to save labor and time,
for forming a tonneau cover for a truck bed,
for forming a shade cover,
for forming a free-standing projector screen,
for forming a hitch-mountable projector screen, and
for forming a sports-ball blocking device;
attaching said at least one first three-dimensional-contour-conforming carapace dome panel to said interchangeable splines
for converging rain water therein,
for converging harvested fruits therein,
for converging harvested nuts therein,
for converging catched balls therein,
for guiding rain water down along said carapace-supporting angled arm and down along said multi-height-adjustable carapace stanchion,
for guiding fruits down along said carapace-supporting angled arm
and down along said multi-height-adjustable carapace stanchion, for guiding nuts down along said carapace-supporting angled arm
and down along said multi-height-adjustable carapace stanchion,
for guiding balls down along said carapace-supporting angled arm
and down along said multi-height-adjustable carapace stanchion;
attaching said at least one second three-dimensional-contour-conforming carapace dome panel to said interchangeable splines
for converging rain water therein,
for converging harvested fruits therein,
for converging harvested nuts therein,
for converging catched balls therein,
for guiding rain water down along said carapace-supporting angled arm and down along said multi-height-adjustable carapace stanchion,
for guiding fruits down along said carapace-supporting angled arm
and down along said multi-height-adjustable carapace stanchion,
for guiding nuts down along said carapace-supporting angled arm
and down along said multi-height-adjustable carapace stanchion,
for guiding balls down along said carapace-supporting angled arm
and down along said multi-height-adjustable carapace stanchion;
adjusting said carapace-supporting-arm angle of said carapace-supporting angled arm; and
locking said carapace-tilting-and-multi-orienting snap-locking handle to said carapace stanchion.

11. The method of manufacturing and using a five-device-in-one multi-function multi-orientation cantilever-stanchion carapace system of claim 10,
wherein
said carapace stanchion
is made of metal.

12. The method of manufacturing and using a five-device-in-one multi-function multi-orientation cantilever-stanchion carapace system of claim 10,
further comprising:
a slide-lock buckle eyelet;
a slide-lock buckle button; and
a storage strap
attached to said slide-lock buckle eyelet and said slide-lock buckle button,
wherein
said slide-lock buckle eyelet
is for detachably connecting to said slide-lock buckle button,
said slide-lock buckle button
is for detachably connecting to said slide-lock buckle eyelet
said storage strap
is for attaching said slide-lock buckle eyelet to said slide-lock buckle button, and
is for bundling said at least one first three-dimensional-contour-conforming carapace dome panel and said at least one second three-dimensional-contour-conforming carapace dome panel to said carapace-supporting angled arm and said multi-height-adjustable carapace stanchion.

13. The method of manufacturing and using a five-device-in-one multi-function multi-orientation cantilever-stanchion carapace system of claim 12,
wherein
said slide-lock buckle eyelet
is formed into a figure-eight shape.

14. The method of manufacturing and using a five-device-in-one multi-function multi-orientation cantilever-stanchion carapace system of claim 12,
wherein
said slide-lock buckle eyelet
is made of plastic.

15. The method of manufacturing and using a five-device-in-one multi-function multi-orientation cantilever-stanchion carapace system of claim 12,
wherein
said storage strap
is made of nylon or fabric material.

16. The method of manufacturing and using a five-device-in-one multi-function multi-orientation cantilever-stanchion carapace system of claim 10,
wherein
said at least one first three-dimensional-contour-conforming carapace dome panel
is made of canvas, nylon, or fabric material.

17. The method of manufacturing and using a five-device-in-one multi-function multi-orientation cantilever-stanchion carapace system of claim 10,
wherein
said at least one second three-dimensional-contour-conforming carapace dome panel
is made of canvas, nylon, or fabric material.

18. The method of manufacturing and using a five-device-in-one multi-function multi-orientation cantilever-stanchion carapace system of claim 10,
wherein
said at least one water-directing-and-ejecting ball-directing-and-ejecting fruit-directing-and-ejecting transverse seam and
said at least one water-directing-and-ejecting ball-directing-and-ejecting fruit-directing-and-ejecting cross-cutting seam
each have a zigzag shape.

19. A method of manufacturing and using a five-device-in-one multi-function multi-orientation cantilever-stanchion carapace system,
providing said five-device-in-one multi-function multi-orientation interchangable reversible cantilever-stanchion carapace system,
said five-device-in-one multi-function multi-orientation interchangable reversible cantilever-stanchion carapace system comprising:
at least one first three-dimensional-contour-conforming carapace dome panel,
having at least one first outer edge,
said at least one first three-dimensional-contour-conforming carapace dome panel
for acting as a cistern for irrigation,
for acting as a water-diverting gutter,
for acting as a falling-fruit-catching device,
for acting as a falling-nut-catching device,
for acting as a ball-or-badminton-shuttlecock-catching device,
for acting as a ball-blocking device,
for acting as a ball-deflecting device,
for acting as a free-standing projector screen, for acting as a truck-bed tonneau cover when
   attached to a utility hole of a truck bed side
   to secure items within said truck bed,
for acting as a shade cover when attached to a utility
   hole of a truck bed side
   to provide shade to occupants, and
for acting as a tow-hitch-mountable projector screen;
at least one second three-dimensional-contour-conforming carapace dome panel having at least one second outer edge,
   said at least one second three-dimensional-contour-conforming carapace dome panel sewn to said at least one first three-dimensional-contour-conforming carapace dome panel,
   said at least one second three-dimensional-contour-conforming carapace dome panel
      for acting as a cistern for irrigation,
      for acting as a water-diverting gutter,
      for acting as a falling-fruit-catching device,
      for acting as a falling-nut-catching device,
      for acting as a ball-or-badminton-shuttlecock-catching device,
      for acting as a ball-blocking device,
      for acting as a ball-deflecting device,
      for acting as a free-standing projector screen,
      for acting as a truck-bed tonneau cover when
         attached to a utility hole of a truck bed side
         to secure items within said truck bed,
      for acting as a shade cover when attached to a utility
         hole of a truck bed side
         to provide shade to occupants, and
      for acting as a tow-hitch-mountable projector screen;
at least one water-directing-and-ejecting ball-directing-and-ejecting fruit-directing-and-ejecting transverse seam
   formed between said at least one first three-dimensional-contour-conforming carapace dome panel and said at least one second three-dimensional-contour-conforming carapace dome panel,
   said at least one water-directing-and-ejecting ball-directing fruit-directing dome-bisecting transverse seam
      for converging rain water therein,
         to repeatedly change the direction of rain water to decelerate the flowing speed of rain water to reduce water splash to avoid damaging irrigated vegetables,
      for converging harvested fruits therein,
         to repeatedly change the direction of harvested fruits to decelerate the rolling speed of harvested fruits to reduce fruit bruises to avoid throwing away bruised fruits,
      for converging harvested nuts therein,
         to repeatedly change the direction of harvested nuts to decelerate the rolling speed of harvested nuts to reduce nut bruises to avoid throwing away bruised nuts,
      for converging catched balls therein,
         to repeatedly change the direction of catched balls to decelerate the rolling speed of catched balls to reduce ball damages to avoid throwing away damaged balls,
      for directing collected water away from patios and balconies
         to keep said patios and balconies dry,
      for distributing collected water onto crops when
         attached to the utility holes
         of a pickup truck
         to keep said crops irrigated,
      for directing harvested fruit to a storage container
         to collect harvested fruit and
         to save time and labor,
      for directing harvested nuts to a storage container
         to collect harvested nuts and
         to save time and labor,
      for directing catched balls to a storage container
         to collect catched balls and
         to save time and labor;
at least one water-directing-and-ejecting ball-directing-and-ejecting fruit-directing-and-ejecting cross-cutting seam
   formed between said at least one first three-dimensional-contour-conforming carapace dome panel and said at least one second three-dimensional-contour-conforming carapace dome panel,
   said at least one first three-dimensional-contour-conforming carapace dome panel
      for converging rain water therein,
         to repeatedly change the direction of rain water to decelerate the flowing speed of rain water to reduce water splash to avoid damaging irrigated vegetables,
      for converging harvested fruits therein,
         to repeatedly change the direction of harvested fruits to decelerate the rolling speed of harvested fruits to reduce fruit bruises to avoid throwing away bruised fruits,
      for converging harvested nuts therein,
         to repeatedly change the direction of harvested nuts to decelerate the rolling speed of harvested nuts to reduce nut bruises to avoid throwing away bruised nuts,
      for converging catched balls therein,
         to repeatedly change the direction of catched balls to decelerate the rolling speed of catched balls to reduce ball damages to avoid throwing away damaged balls,
      for directing collected water away from patios and balconies
         to keep said patios and balconies dry,
      for distributing collected water onto crops when
         attached to the utility holes
         of a pickup truck
         to keep said crops irrigated,
      for directing harvested fruit to a storage container
         to collect harvested fruit and
         to save time and labor,
      for directing harvested nuts to a storage container
         to collect harvested nuts and
         to save time and labor,
      for directing catched balls to a storage container
         to collect catched balls and
         to save time and labor;
a carapace-supporting angled arm
   having a carapace-supporting-arm angle,
a carapace stanchion
   hingedly attached to said carapace-supporting angled arm;
a carapace-tilting-and-multi-orienting snap-locking handle
   lockably slid on said carapace stanchion;

a plurality of splines
having a plurality of spline ends,
said splines hingedly attached to said carapace-supporting
angled arm and to said carapace-tilting-and-multi-orienting snap-locking handle;
an upper hub
hingedly attached to said interchangeable splines,
a shuttle hub;
a center-support tube
attached to said upper hub and
slidably attached to said shuttle hub; and
a plurality of spline-actuating-and-supporting ribs
hingedly attached to said splines and to said shuttle hub,
said spline-actuating-and-supporting ribs
for supporting said splines, and
for actuating said splines
to deploy and to contract said splines,
said method of manufacturing and using a multi-function multi-orientation interchangable reversible cantilever-stanchion carapace system comprising the steps of:
sewing said at least one first three-dimensional-contour-conforming carapace dome panel and said at least one second three-dimensional-contour-conforming carapace dome panel together
such that
said at least one water-directing-and-ejecting ball-directing-and-ejecting fruit-directing-and-ejecting transverse seam and said at least one water-directing-and-ejecting ball-directing-and-ejecting fruit-directing-and-ejecting cross-cutting seam are formed therebetween
for converging rain water therein
to repeatedly change the direction of rain water to decelerate the flowing speed of rain water to reduce water splash to avoid damaging irrigated vegetables,
for converging harvested fruits therein
to repeatedly change the direction of harvested fruits to decelerate the rolling speed of harvested fruits to reduce fruit bruises to avoid throwing away bruised fruits,
for converging harvested nuts therein
to repeatedly change the direction of harvested nuts to decelerate the rolling speed of harvested nuts to reduce nut bruises to avoid throwing away bruised nuts,
for converging catched balls therein
to repeatedly change the direction of catched balls to decelerate the rolling speed of catched balls to reduce ball damages to avoid throwing away damaged balls,
for directing rain water therealong,
for directing harvested fruits therealong,
for directing harvested nuts therealong,
for directing game balls therealong,
for forming a collecting cistern to collect rain water to irrigate garden,
for forming a diverting gutter to collect rain water to discharge said rain water away from house balcony and foundation,
for forming a collecting device to collect harvested fruits
to save labor and time,
for forming a collecting device to collect harvested nuts
to save labor and time,
for forming a collecting device to collect game balls to save labor and time,
for forming a tonneau cover for a truck bed,
for forming a shade cover,
for forming a free-standing projector screen,
for forming a hitch-mountable projector screen, and
for forming a sports-ball blocking device;
attaching said at least one first three-dimensional-contour-conforming carapace dome panel to said splines
for converging rain water therein,
for converging harvested fruits therein,
for converging harvested nuts therein,
for converging catched balls therein,
for guiding rain water down along said carapace-supporting angled arm and down along said multi-height-adjustable carapace stanchion,
for guiding fruits down along said carapace-supporting angled arm
and down along said multi-height-adjustable carapace stanchion,
for guiding nuts down along said carapace-supporting angled arm
and down along said multi-height-adjustable carapace stanchion,
for guiding balls down along said carapace-supporting angled arm
and down along said multi-height-adjustable carapace stanchion;
attaching said at least one second three-dimensional-contour-conforming carapace dome panel to said splines
for converging rain water therein,
for converging harvested fruits therein,
for converging harvested nuts therein,
for converging catched balls therein,
for guiding rain water down along said carapace-supporting angled arm and down along said multi-height-adjustable carapace stanchion,
for guiding fruits down along said carapace-supporting angled arm
and down along said multi-height-adjustable carapace stanchion,
for guiding nuts down along said carapace-supporting angled arm
and down along said multi-height-adjustable carapace stanchion,
for guiding balls down along said carapace-supporting angled arm
and down along said multi-height-adjustable carapace stanchion;
attaching said at least one first outer edge of said at least one first three-dimensional-contour-conforming carapace dome panel to said spline ends of said splines, respectively;
adjusting said carapace-supporting-arm angle of said carapace-supporting angled arm; and
locking said carapace-tilting-and-multi-orienting snap-locking handle to said carapace stanchion.

20. The method of manufacturing and using a five-device-in-one multi-function multi-orientation cantilever-stanchion carapace system of claim 19,
wherein
said carapace stanchion
is made of metal.

* * * * *